US008885936B2

(12) United States Patent
Webb et al.

(10) Patent No.: US 8,885,936 B2
(45) Date of Patent: Nov. 11, 2014

(54) AUTOMATED COLOR BALANCE TOOLS FOR EDITING IMAGES

(71) Applicant: Apple Inc., Cupertino, CA (US)

(72) Inventors: Russell Y. Webb, San Jose, CA (US); Garrett M. Johnson, San Francisco, CA (US); Francesc T. Terrades, Cupertino, CA (US); Steven D. Hordley, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 13/629,480

(22) Filed: Sep. 27, 2012

(65) Prior Publication Data

US 2013/0329993 A1 Dec. 12, 2013

Related U.S. Application Data

(60) Provisional application No. 61/657,795, filed on Jun. 10, 2012.

(51) Int. Cl.
*G06K 9/00* (2006.01)
*G06K 9/34* (2006.01)

(52) U.S. Cl.
USPC .......................................................... 382/167

(58) Field of Classification Search
USPC ......................... 382/118, 162, 164, 165, 167; 345/589–594; 358/501, 504, 515, 518, 358/520, 527; 348/222.1, 231.99
See application file for complete search history.

(56) References Cited

U.S. PATENT DOCUMENTS

| | | | | |
|---|---|---|---|---|
| 5,448,381 A * | 9/1995 | Bohan et al. | .................. | 358/527 |
| 6,301,442 B1 | 10/2001 | Uchida et al. | | |
| 6,594,388 B1 | 7/2003 | Gindele et al. | | |
| 6,879,339 B2 | 4/2005 | Ozawa | | |
| 6,940,545 B1 * | 9/2005 | Ray et al. | .................. | 348/222.1 |
| 7,450,753 B2 | 11/2008 | Hayaishi | | |
| 7,599,093 B2 * | 10/2009 | Kagaya | .......................... | 358/2.1 |
| 8,090,198 B2 | 1/2012 | Yoshii et al. | | |
| 8,170,337 B2 | 5/2012 | Miyazawa | | |
| 8,224,039 B2 * | 7/2012 | Ionita et al. | .................. | 382/118 |
| 8,319,856 B2 | 11/2012 | Ogawa | | |
| 2003/0235333 A1 | 12/2003 | Lin | | |
| 2013/0328906 A1 * | 12/2013 | Webb et al. | .................. | 345/590 |
| 2013/0329993 A1 * | 12/2013 | Webb et al. | .................. | 382/167 |
| 2013/0329994 A1 * | 12/2013 | Webb et al. | .................. | 382/167 |

OTHER PUBLICATIONS

Parulski, Ken, et al., "chapter twelve: Color image processing for digital cameras," Digital Color Imaging Handbook, Jan. 1, 2003, pp. 727-757, CRC Press LLC, USA.
Pratt, William K., "Image Enhancement," Digital Image Processing: PIKS Inside, Third Edition, Jan. 2001, pp. 243-296, John Wiley & Sons, Inc., New York, USA.

* cited by examiner

*Primary Examiner* — Amir Alavi
(74) *Attorney, Agent, or Firm* — Adeli LLP

(57) ABSTRACT

Some embodiments provide a method of automatically color balancing an image. The method receives a selection of a user interface (UI) item to automatically color balance the image using a color balance tool that includes several color balance modes. In response to the selection, the method analyzes the image based on a set of criteria. Based on the analysis, the method automatically selects a color balance mode from the several color balance modes of the color balance tool. Upon selecting the color balance mode, the method uses the color balance mode to automatically apply a set of color balance operations to the image.

25 Claims, 32 Drawing Sheets

AUTOMATED COLOR BALANCE TOOLS FOR EDITING IMAGES

This application claims the benefit of U.S. Provisional Patent Application 61/657,795, filed Jun. 10, 2012. U.S. Provisional Patent Application 61/657,795 is hereby incorporated by reference.

BACKGROUND

Many of the image editing applications available today provide a variety of different tools to edit images. Tools are usually provided to adjust an image's exposure, contrast, saturation, etc. In addition, some applications provide tools for applying effects to the image. Common effects include a black and white effect, a sepia effect, a sharpen effect, a blur effect, an emboss effect, etc.

A particular tool that image editing applications often provided is a color balance tool. Generally, a color balance tool applies a global color adjustment to an image. In many instances, the user uses the color balance tool when the image appears to have an unwanted illuminant such as a yellowish overall appearance from an incandescent light in the image, a colored appearance from light reflecting off a similar-colored wall, etc. Typically, a color balance tool allows the user to increase or decrease an amount of a color or set of colors in the image in order to remove the illuminant in the image so that the image appears similar to the actual subject and/or scene that was captured.

BRIEF SUMMARY

For an image editing application, some embodiments of the invention provide a novel color balance tool that provides several different modes for performing different color balance operations on an image. In some embodiments, the color balance tool includes a mode for performing color balance operations on an image based on skin tones identified in the image (also referred to as a skin tone color balance mode), a mode for performing color balance operations on the image based on a color cast identified in the image (also referred to as a gray color balance mode), and a mode for performing color balance operations on the image based on temperature and tint adjustments (also referred to as a temperature and tint mode).

The color balance tool of some embodiments allows a user to select one of the modes of the color balance tool to perform a color balance operation on the image. While in the selected mode, the color balance tool allows the user to select a different mode of the color balance tool to perform a different color balance operation on the image. In some embodiments, the color balance tool allows the user to switch among the several different modes of the color balance tool any number of different times to use different color balance operations to color balance the image.

In some embodiments, the color balance tool allows multiple different color balance operations to be applied to an image using the different modes of the color balance tool. For instance, a user might select a gray color balance mode to performing color balance operations on the image based on a color cast identified in the image and then select a skin tone mode to performing color balance operations on the image based on skin tones identified in the image.

In some embodiments, the image editing application allows a user to create multiple instances of the color balance tool in order to apply multiple color balance operations to an image. For each instance of the color balance tool, the user may select a mode of the color balance tool to use to apply color balance operations to the image. In some embodiments, the image editing application applies to the image color balance operations associated with the color balance tool instances on an instance-by-instance basis.

For one or more modes, the color balance tool of some embodiments provides a tool for applying color balance operations to a portion of an image. For instance, in some embodiments, the color balance tool provides a brush tool for a skin tone color balance mode and a gray color balance mode of the color balance tool. The color balance tool of such embodiments allows the user to apply color balance operations to different regions of an image using different modes of the color balance tool.

As mentioned above, the color balance tool of some embodiments includes several modes for applying color balance operations to an image. In some embodiments, the image editing application applies the color balance operations to the image using a wide gamut color space. The image editing application in some such embodiments converts the color space of the image to the wide gamut color space and performs color balance operations on the image in the wide gamut color space. When the image editing application has finished color balancing the image, the image editing application converts the image back to the image's original color space.

In some embodiments, as noted above, the color balance tool includes modes that color balance an image based on a determined color (e.g., the color of skin tone in an image, the color of a color cast in an image, etc.). The color balance tool of some embodiments includes a feature that allows a user to specify a color in an image to use as the basis for color balancing the image. For example, in some embodiments, the color balance tool includes a sampling tool for the user to specify the color of a set of pixels in the image as the basis for a skin tone color balance operation or a gray color balance operation.

The color balance tool of some embodiments includes an automatic color balance feature (also referred to as auto color balance). When the feature is selected for an image, the color balance tool analyzes the image and automatically selects one of the modes of the color balance tool to use to apply color balance operations to the image. In some embodiments, the color balance tool selects a particular mode based on whether faces are detected in the image, whether the image is formatted as a joint photographic experts group (JPEG), whether the image contains a large amount of color cast, etc. The color balance tool of some embodiments uses additional and/or different criteria to select a particular mode.

As mentioned above, the color balance tool of some embodiments includes a gray color balance mode for performing color balance operations on an image based on a color cast identified in the image. In some embodiments, the color balance tool utilizes a novel method for performing gray color balance. The method of some embodiments uses several different techniques to determine a color that represents a color cast in the image. In some embodiments, the method selects one of the determined colors and shifts the colors of pixels in the image to reduce the color in the image. The method shifts the colors of pixels with high luminance values more than the colors of pixels with low luminance values, in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For an image editing application, some embodiments of the invention provide a novel color balance tool that provides several different modes for performing different color balance operations on an image. In some embodiments, the color balance tool includes a mode for performing color balance operations on an image based on skin tones identified in the image, a mode for performing color balance operations on the image based on a color cast identified in the image, and a mode for performing color balance operations on the image based on temperature and tint adjustments.

The color balance tool of some embodiments allows a user to select one of the modes of the color balance tool to perform a color balance operation on the image. While in the selected mode, the color balance tool allows the user to select a different mode of the color balance tool to perform a different color balance operation on the image. In some embodiments, the color balance tool allows the user to switch among the several different modes of the color balance tool any number of different times to use the different color balance operations to color balance the image.

In some embodiments, a color balance operation (1) identifies in an image an undesirable tint of color that affects the entire image evenly (e.g., a color cast, an illuminant, etc.) and (2) modifies pixels in the image so that the undesirable tint in the image is reduced or removed. In other words, a color balance operation of some embodiments (1) identifies a particular color for a portion of an image and (2) shifts the color of pixels in the image in a manner such that the color of the portion of the image is modified to, or modified close to, the particular color.

Figure 1:
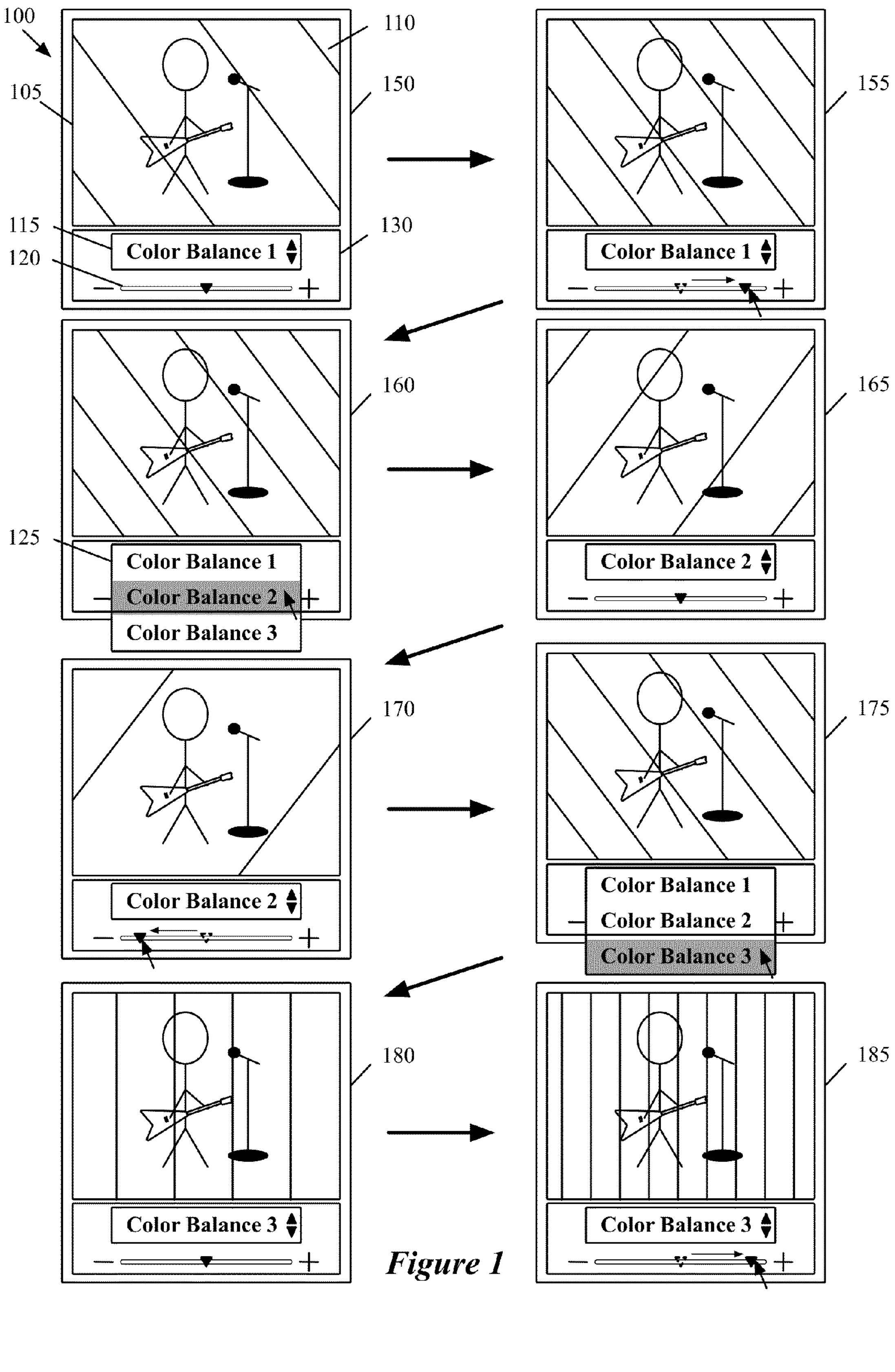
FIG. 1 conceptually illustrates an example of graphical user interface (GUI) of an image editing application of some embodiments that provides such a color balance tool.

FIG. 1 conceptually illustrates an example of graphical user interface (GUI) 100 of an image editing application of some embodiments that provides a color balance tool 130 having multiple different color balance modes. Specifically, FIG. 1 conceptually illustrates the GUI 100 at eight different stages 150-185 that shows switching among and using different modes of the color balance tool 130. Each of the stages 150-185 will be described in further detail below. The elements of the GUI 100 will be described first.

As shown, the GUI 100 includes an image display area 105, a selectable user interface (UI) control 115, and a slider control 120. The image display area 105 displays an image (image 110 in this example) that is being edited. The selectable UI control 115 (e.g., pop-up menu 115) is for displaying the active mode (i.e., the current selected mode) of the color balance tool 130. When the UI control 115 is displaying the active mode of the color balance tool 130 and the UI control 115 is selected, the UI control 115 displays a list of selectable UI items that represent the modes of the color balance tool 130. When the image editing application receives a selection of a selectable UI item in the displayed list of UI items, the image editing application causes the color balance tool 130 to switch to the mode that corresponds to the selected UI item.

The slider control 120 includes a sliding region and a slider that is movable along an axis of the sliding region to apply and/or adjust a color balance operation associated with the active mode of the color balance tool 130. In some embodiments, adjusting the slider along one direction of the axis of the sliding region causes the image editing application to adjust the color balance applied to the image towards warmer colors (e.g., red colors, orange colors, yellow colors, etc.) while adjusting the slider along the other direction of the axis of the sliding region causes the image editing application to adjust the color balance applied to the image towards cooler colors (e.g., blue colors, purple colors, green colors etc.). In other words, different positions of the slider along the sliding region correspond to different amounts of warmth or coolness used to adjust the color balance applied to the image. As indicated by the negative and positive signs at the ends of the slider control 120, adjusting the slider towards the right direction of the sliding region adjusts color balance applied to the image towards warmer colors and adjusting the slider towards the left direction of the sliding region adjusts the color balance applied to the image towards cooler colors.

An example operation of the color balance tool 130 will now be described by reference to the eight stages 150-185 illustrated in FIG. 1. The first stage 150 of the GUI 100 shows that Color Balance 1 has been selected as the active mode of the color balance tool 130. In this example, the image editing application applies a color balance operation to the image 110 using the Color Balance 1 mode of the color balance tool 130 when the image editing application receives the selection of the Color Balance 1 mode of the color balance tool 130 (e.g., a user has selected a UI item that represents the Color Balance 1 mode, the color balance tool 130 automatically selects the Color Balance 1 mode upon initialization of the image editing application, etc.). As shown, diagonal lines are displayed over the image 110 to indicate that the color balance operation has been applied to the image 110 using the Color Balance 1 mode of the color balance tool 130.

The second stage 155 of the GUI 100 shows the image 110 after an adjustment has been made to the color balance operation applied to the image 110 in the first stage 150. In this stage 155, a user has selected and moved the slider towards the right of the slider control 120 using a cursor (e.g., by clicking-and-holding a mouse button and dragging the mouse, tapping a touchpad and dragging across the touchpad, or touching the slider displayed on a touchscreen and dragging across the touchscreen) in order to adjust the color balance applied to the image 110 using the color balance 1 mode of the color balance tool 130 towards warmer colors. Additional diagonal lines are displayed over the image 110 in the second stage 155 to indicate that the adjustment of the color balance has been applied to the image 110.

In the third stage 160, the GUI 100 displays a list 125 (e.g., pop-up menu 125) that includes a set of selectable UI items that are each for selecting a mode of the color balance tool 130. In this example, the user has selected the UI control 115 using the cursor (e.g., by clicking a mouse button, tapping a touchpad, or touching a touchscreen) to invoke the display of the list 125. When the image editing application receives the selection of the UI control 115, the image editing application displays the list 125.

The third stage 160 also illustrates that a different mode of the color balance tool 130 is being selected. In particular, the third stage 160 illustrates that the user is selecting the UI item that corresponds to a Color Balance 2 mode of the color balance tool 130 using the cursor (e.g., by clicking a mouse button, tapping a touchpad, or touching a touchscreen), as indicated by a highlighting of the Color Balance 2 UI item.

The fourth stage 165 shows the GUI 100 after the selection of the Color Balance 2 mode of the color balance tool 130. In this example, when the image editing application receives the selection of the Color Balance 2 mode of the color balance tool 130 (e.g., a user has selected a UI item that represents the Color Balance 2 mode, the color balance tool 130 automatically selects the Color Balance 2 mode upon initialization of the image editing application, etc.), the image editing application (1) removes the color balance operation applied to the image 110 using the previous mode (Color Balance 1 mode in this example) of the color balance tool 130 and (2) applies a color balance operation to the image 110 using the newly selected mode (Color Balance 2 mode in this example) of the color balance tool 130. As illustrated in this stage 165, different diagonal lines are displayed over the image 110 to indicate that the color balance operation has been applied to the image 110 using the Color Balance 2 mode of the color balance tool 130.

The fifth stage 170 of the GUI 100 shows the image 110 after an adjustment has been made to the color balance operation applied to the image 110 in the fourth stage 165. In the fifth stage 170, the user has selected and moved the slider towards the left of the slider control 120 using the cursor (e.g., by clicking-and-holding a mouse button and dragging the mouse, tapping a touchpad and dragging across the touchpad, or touching the slider displayed on a touchscreen and dragging across the touchscreen) in order to adjust the color balance applied to the image 110 using the color balance 2 mode of the color balance tool 130 towards cooler colors. Fewer diagonal lines are displayed over the image 110 in the fifth stage 170 to indicate that adjustment to the color balance has been applied to the image 110.

In the sixth stage 175, the GUI 100 displays the list 125. In this example, the user has selected the UI control 115 using the cursor (e.g., by clicking a mouse button, tapping a touchpad, or touching a touchscreen) to invoke the display of the list 125. When the image editing application receives the selection of the UI control 115, the image editing application displays the list 125.

Additionally, the sixth stage 175 illustrates that a different mode of the color balance tool 130 is being selected. The sixth stage 175 shows that the user is selecting the UI item that corresponds to a Color Balance 3 mode of the color balance tool 130 using the cursor (e.g., by clicking a mouse button, tapping a touchpad, or touching a touchscreen), as indicated by a highlighting of the Color Balance 3 UI item.

The seventh stage 180 shows the GUI 100 after the selection of the Color Balance 3 mode of the color balance tool 130. In this example, when the image editing application receives the selection of the Color Balance 3 mode of the color balance tool 130 (e.g., a user has selected a UI item that represents the Color Balance 3 mode, the color balance tool 130 automatically selects the Color Balance 3 mode upon initialization of the image editing application, etc.), the image editing application (1) removes the color balance operation applied to the image 110 using the previous mode (Color Balance 2 mode in this example) of the color balance tool 130 and (2) applies a color balance operation to the image 110 using the newly selected mode (Color Balance 3 mode in this example) of the color balance tool 130. As illustrated in the seventh stage 180, vertical lines are displayed over the image 110 to indicate that the color balance operation has been applied to the image 110 using the Color Balance 3 mode of the color balance tool 130.

The eighth stage 185 of the GUI 100 shows the image 110 after an adjustment has been made to the color balance operation applied to the image 110 in the seventh stage 180. In the eighth stage 185, the user has selected and moved the slider towards the right of the slider control 120 using the cursor (e.g., by clicking-and-holding a mouse button and dragging the mouse, tapping a touchpad and dragging across the touchpad, or touching the slider displayed on a touchscreen and dragging across the touchscreen) in order to adjust the color balance applied to the image 110 using the color balance 3 mode of the color balance tool 130 towards warmer colors. Additional vertical lines are displayed over the image 110 in the eighth stage 185 to indicate that the increase of the amount of color balance has been applied to the image 110.

As noted above, the color balance tool of some embodiments includes several different selectable color balance modes for applying different color balance operations to an image. In some embodiments, the color balance tool includes an automatic color balance feature that automatically selects one of the color balance modes for the color balance tool to use to apply color balance operations to the image.

Figure 2:
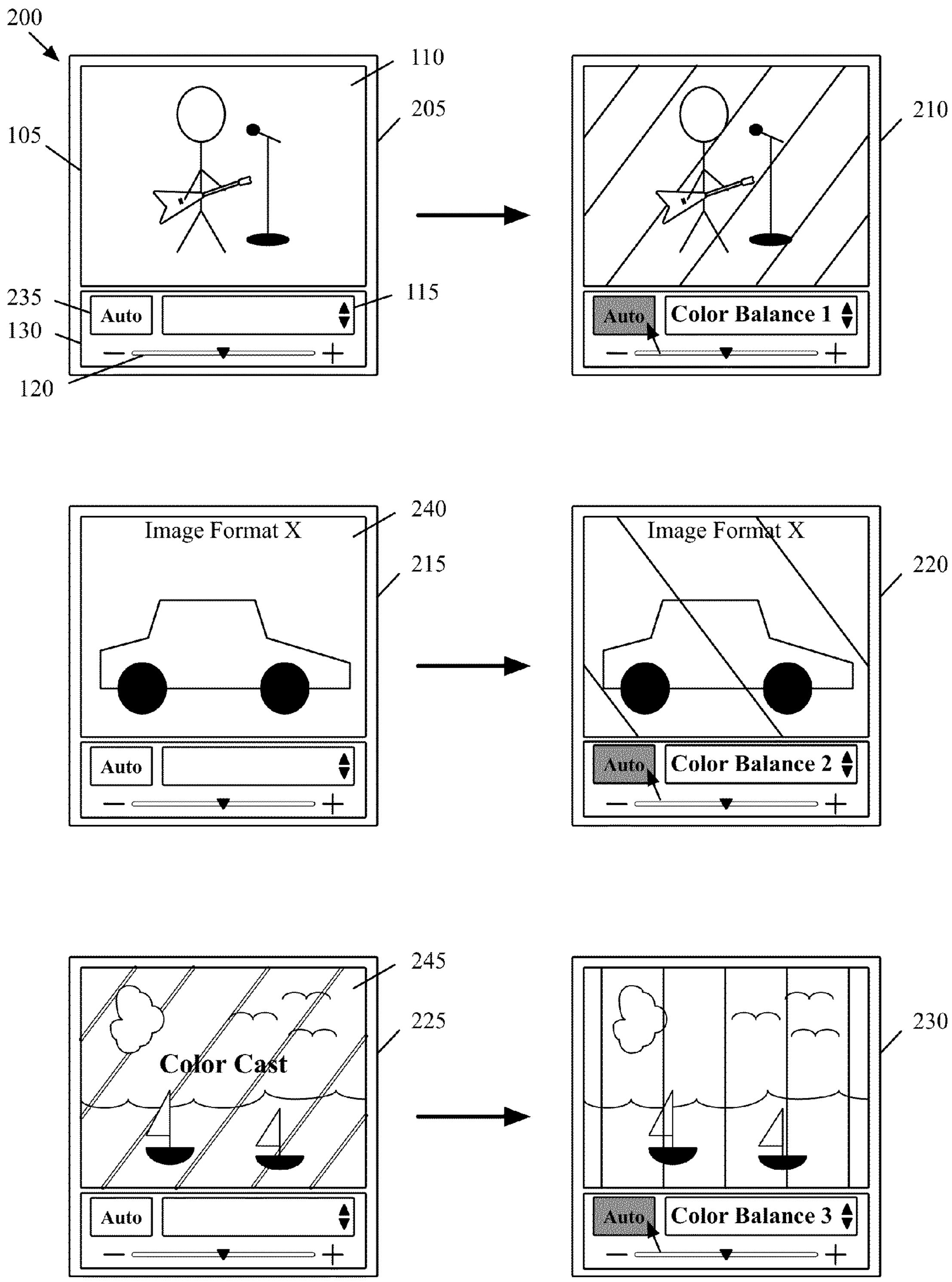
FIG. 2 conceptually illustrates a color balance tool of some embodiments that includes an automatic color balance feature.

FIG. 2 conceptually illustrates the color balance tool 130 of some embodiments that includes an automatic color balance feature. In particular, FIG. 2 illustrates a GUI 200 at six different stages 205-230 that show three different auto color balance operations. The first and second stages 205-210 illustrate an example of automatically selecting a mode for the color balance tool 130 when a face is detected in an image, the third and fourth stages 215-220 illustrate an example of automatically selecting a mode for the color balance tool 130 when the image is formatted according to a particular format, and the fifth and sixth stages 225-230 illustrate an example of automatically selecting a mode for the color balance tool 130 when an image contains a large amount of color cast in the image. The GUI 200 is similar to the GUI 100 described above by reference to FIG. 1. The color balance tool 130 shown in FIG. 2 also includes a selectable UI item 235 for initiating an automatic color balance operation.

The first stage 205 illustrates the GUI 200 displaying the image 110 of a musician playing a guitar in the image display area 105. Additionally, the first stage 205 shows that the UI item 235 has not been selected and a color balance mode has not been selected for the color balance tool 130, as indicated by the GUI 200 displaying a blank in the UI control 115.

The second stage 210 shows that a user has selected the UI item 235 using a cursor (e.g., by clicking a mouse button, tapping a touchpad, or touching a touchscreen) to initiate an auto color balance operation on the image 110. The selection of the UI item 235 is indicated by a highlighting of the UI item 235.

The image editing application of different embodiments uses different criteria to automatically select a mode for the color balance tool. Examples of criteria include whether a face is detected in the image, whether the image is formatted according to a particular format, whether an amount of a determined color cast in the image is within defined threshold amount, etc. The image editing application uses additional and/or different criteria in some embodiments.

The second stage 210 illustrates an example of automatically selecting a mode for the color balance tool 130 when a face is detected in the image and applying a color balance operation to the image using the selected mode. As shown, the Color Balance 1 mode of the color balance tool 130 is automatically selected as the mode for the color balance tool 130. When the image editing application receives the selection of the UI item 235, the image editing application automatically (1) detects the image 110 contains a face, (2) selects the Color Balance 1 mode for the color balance tool 130, and (3) applies a color balance operation using the Color Balance 1 mode. As shown, the GUI 200 displays diagonal lines to indicate that the color balance operation has been performed on the image 110 using the Color Balance 2 mode of the color balance tool 130.

In the next example, the third stage 215 illustrates the GUI 200 displaying an image 240 of a car in the image display area 105. In this example, the image 240 is formatted according to an image format X, as indicated in the image display area 105. The third stage 215 also shows that the UI item 235 has not been selected and a color balance mode has not been selected for the color balance tool 130, as indicated by the GUI 200 displaying a blank in the UI control 115.

The fourth stage 220 illustrates that the user has selected the UI item 235 using the cursor (e.g., by clicking a mouse button, tapping a touchpad, or touching a touchscreen) to initiate an auto color balance operation on the image 240. A shown, the selection of the UI item 235 is indicated by a highlighting of the UI item 235.

The example shown in the fourth stage 220 illustrates automatically selecting a mode of the color balance tool 130 when an image is formatted according to a particular format and applying a color balance operation to the image using the selected mode. The fourth stage 220 illustrates the Color Balance 2 mode of the color balance tool 130 automatically selected as the mode for the color balance tool 130. When the image editing application receives the selection of the UI item 235, the image editing application automatically (1) determines that the image 240 is formatted according the image format X, (2) selects the Color Balance 2 mode for the color balance tool 130, and (3) applies a color balance operation using the Color Balance 2 mode. The fourth stage 220 illustrates the GUI 200 displaying different diagonal lines to indicate that the color balance operation has been performed on the image 240 using the Color Balance 2 mode of the color balance tool 130.

In the last example of FIG. 2, the fifth stage 225 illustrates the GUI 200 displaying an image 245 of a boats sailing in the ocean in the image display area 105. For this example, the image 245 contains a color cast, as indicated by hollow diagonal lines displayed over the image 245 in the image display area 105. In addition, the fifth stage 225 illustrates that the UI item 235 has not been selected and a color balance mode has not been selected for the color balance tool 130, as indicated by the GUI 200 displaying a blank in the UI control 115.

The sixth stage 230 shows that the user has selected the UI item 235 using the cursor (e.g., by clicking a mouse button, tapping a touchpad, or touching a touchscreen) to initiate an auto color balance operation on the image 245. A shown, the selection of the UI item 235 is indicated by a highlighting of the UI item 235.

The sixth stage 230 illustrates an example of automatically selecting a mode of the color balance tool 130 when an image contains a large amount of color cast and applying a color balance operation to the image using the selected mode. As shown in the sixth stage 230, the Color Balance 3 mode of the color balance tool 130 is automatically selected as the mode for the color balance tool 130. When the image editing application receives the selection of the UI item 235, the image editing application automatically (1) determines that the image 245 includes a large amount of color cast in the image, (2) selects the Color Balance 3 mode for the color balance tool 130, and (3) applies a color balance operation using the Color Balance 3 mode. The sixth stage 230 illustrates the GUI 200 displaying vertical lines to indicate that the color balance operation has been performed on the image 245 using the Color Balance 3 mode of the color balance tool 130.

While FIG. 2 shows examples of an auto color balance feature of some embodiments initiated when a mode has not been selected for the color balance tool, one of ordinary skill in the art will realize that the auto color balance feature may be initiated when one of the modes of the color balance tool (e.g., the Color Balance 1 mode, the Color Balance 2 mode, the Color Balance 3 mode, etc.) has been selected. In addition, the examples illustrate automatically selecting a particular mode of the color balance tool when particular criteria are met. One of ordinary skill in the art will understand that the image editing application of some embodiments may use any number of different criteria to determine to select any one of the modes of the color balance tool when criteria is met.

Figure 3:
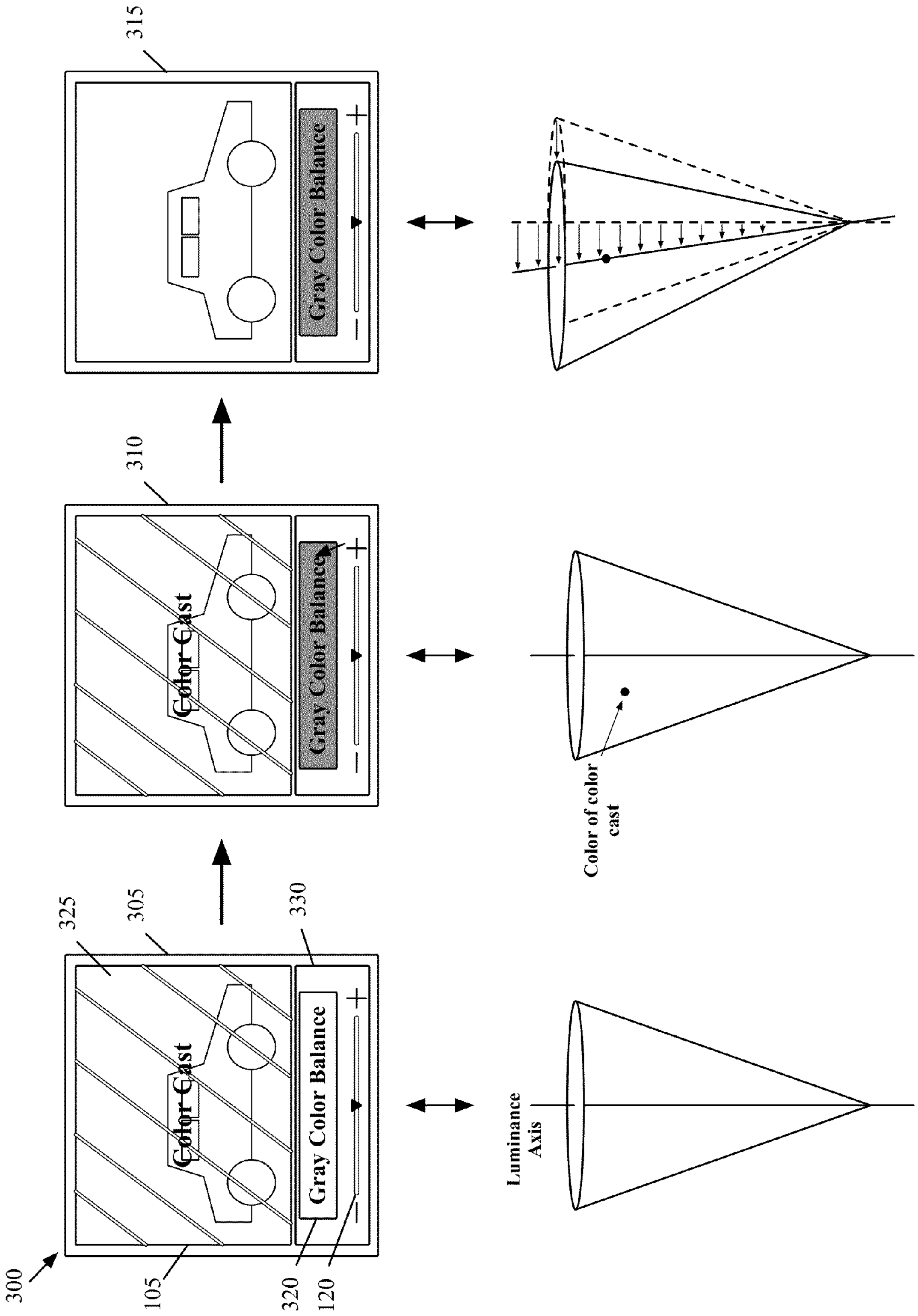
FIG. 3 conceptually illustrates a color balance tool of some embodiments for performing a gray color balance operation.

FIG. 3 conceptually illustrates a color balance tool 330 of some embodiments for performing a gray color balance operation. Specifically, FIG. 3 illustrates a GUI 300 at three different stages 305-315 of a gray color balance operation. The GUI 300 is similar to the GUI 100 described above by reference to FIG. 1 but the GUI 300 includes a color balance tool 330 instead of the color balance tool 130. As shown, the color balance tool 330 includes a selectable UI item 320 and the slider control 120. The selectable UI item 320 is for invoking a gray color balance operation on an image displayed in the image display area 105 (image 325 in this example).

The first stage 305 illustrates the GUI 300 displaying an image 325 of a car in the image display area 105. As shown, the image 325 contains a color cast, which is indicated by hollow diagonal lines displayed over the image 325. In the first stage 305, the UI item 320 has not been selected.

In addition, the first stage 305 illustrates a conceptual representation of color values (e.g., pixel values) of the image 325 in a color space in which the image editing application of some embodiments operates. In some embodiments, the image editing application converts the color values of the image 325 to such a color space. The image editing application of different embodiments operates on the color values of image 325 using different color spaces. For instance, the image editing application of some embodiments utilizes a color space that has a luminance component and two chrominance components (e.g., YCC, YCbCr, YIQ, etc.). In some embodiments, the image editing application uses other color spaces.

The second stage 310 of the GUI 300 shows that a user has selected the UI item 320 using a cursor (e.g., by clicking a mouse button, tapping a touchpad, or touching a touchscreen) in order to invoke a gray color balance operation on the image 325. The selection of the UI item 320 is indicated by a highlighting of the UI item 320.

When the image editing application receives the selection of the UI item 320, the image editing application determines the color of the color cast in the image 325. In some embodiments, the image editing application uses any number of different techniques for determining the color of the color cast in the image 325. Examples of techniques include techniques based on the gray world hypothesis, techniques based on the gray edge hypothesis, any technique for estimating an illuminant in an image, etc. As shown, the second stage 310 shows a region in the color space (a point in this example) that represents the color of the determined color cast in the image 325.

The third stage 315 illustrates the GUI 300 after the completion of the gray color balance operation. As shown at the third stage 315, the color cast in the image 325 has been removed from the image 325, as indicated by the hollow diagonal lines no longer displayed over the image 325 in the image display area 105. In some embodiments, the image editing application removes the color cast from the image 325 by subtracting the color of the color cast from the pixels in the image 325. The image editing application of some such embodiments subtracts a larger amount of the color from pixels with high luminance values and a lesser amount of the color for pixels with low luminance values.

Additionally, the third stage 315 shows the conceptual representation of color values of the image 325 in the color space once the image editing application completes the gray color balance operation on the image 325. In particular, the third stage 315 illustrates the conceptual effects of the gray color balance operation on the representation of the color values of the image 325 in the color space.

The effect of the gray color balance operation on the image 325 is conceptually illustrated by a horizontal shifting of the color space representation of the colors of the image 325 such that the color values in the color space that represent the color cast in the image shifts to or near a neutral color (e.g., a white color, a gray color, or a black color). As mentioned above, in some embodiments, the image editing application subtracts a larger amount of the color of the color cast from pixels with high luminance values and a lesser amount of the color of the color cast for pixels with low luminance values. As indicated by the various arrows in the color space, pixels that are higher along the luminance axis are shifted a greater amount and pixels that are lower along the luminance axis are shifted a lesser amount.

While the conceptual representations are shown as contiguous cones, one of ordinary skill in the art will recognize that the pixel values of an image are actually a set of discrete pixel values that may occupy an arbitrary set of points in a color space. The subtraction of the color of the color cast by the image editing application of some embodiments is performed on each pixel value separately. In some embodiments, the pixel values of a particular pixel are the color values assigned to the pixel in a particular color space (e.g., a luminance value and two chrominance values).

The examples and embodiments described in this application illustrate a color balance tool with a particular set of color balance modes (e.g., a skin tone mode, a gray color balance mode, and a temperature and tint color balance mode). One of ordinary skill in the art will recognize that the color balance tool in these examples and embodiments may include any number of additional and/or different color balance modes without departing from the spirit of the invention.

Several more detailed embodiments of the invention are described in the sections below. Section I conceptually describes details of an example color balance tool that has multiple color balance modes. Next, Section II conceptually describes details of an automatic color balance feature of a color balance tool of some embodiments. Next, Section III describes details of a gray color balance technique according to some embodiments of the invention. Section IV describes additional features of a color balance tool of some embodiments. Next, Section V describes an example image editing and organizing application of some embodiments. Finally, Section VI describes an electronic system that implements some embodiments of the invention.

I. Exemplary Multi-Mode Color Balance Tool

As mentioned above, the image editing application of some embodiments provides a color balance tool that includes several different color balance modes that are each for color balancing an image using a different technique. For instance, the color balance tool of some embodiments includes a skin tone color balance mode for color balancing an image based on skin tones in the image, a gray color balance mode for color balancing the image based on gray colors, and a temperature and tint color balance mode for color balancing the image based on temperature and tint values of the image.

A. Skin Tone Color Balance Mode

Figure 4:
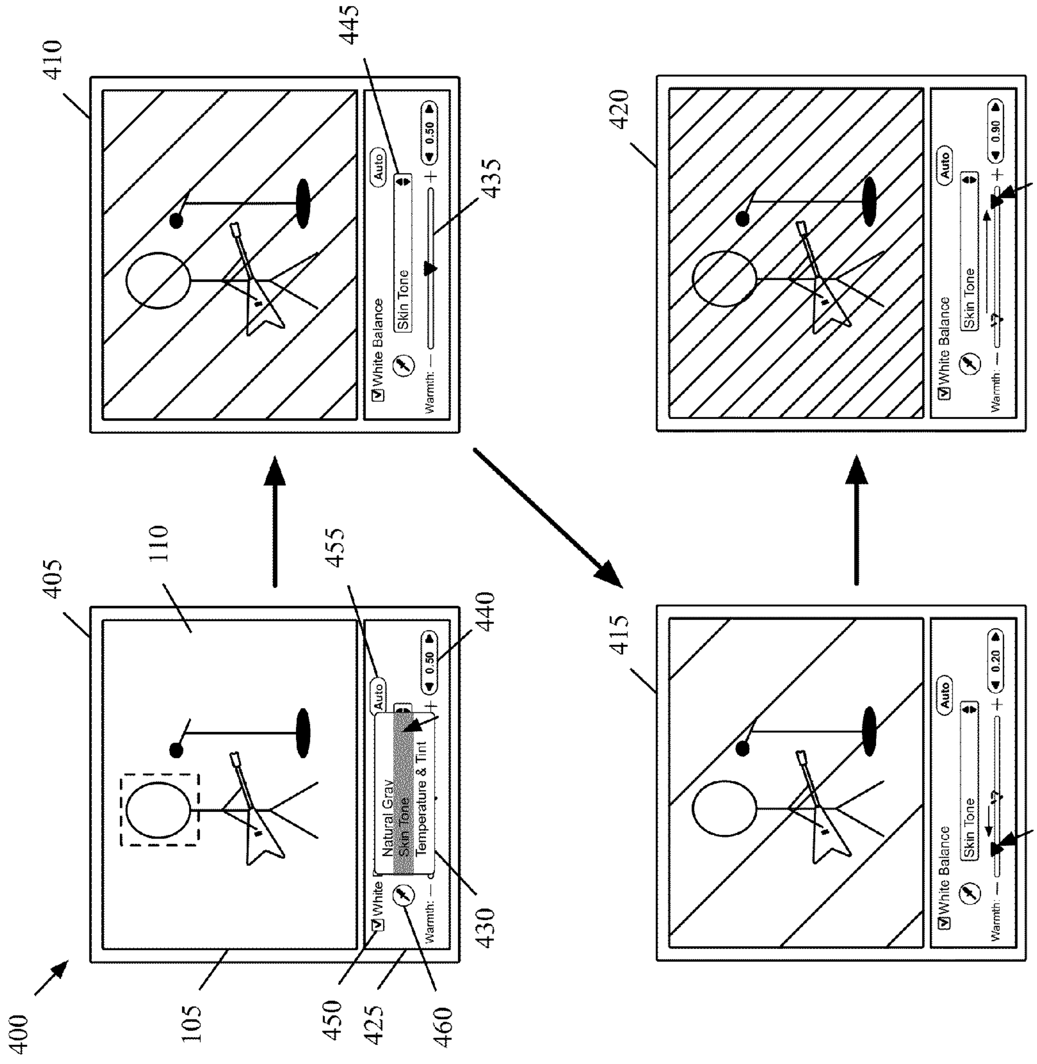
FIG. 4 conceptually illustrates a skin tone color balance mode of a color balance tool of some embodiments.

FIG. 4 conceptually illustrates a skin tone color balance mode of a color balance tool 425 of some embodiments. In particular, FIG. 4 illustrates a GUI 400 at four different stages 405-420 of the color balance tool's skin tone color balance mode. As shown, the GUI 400 includes the image display area 105 and the color balance tool 425.

The color balance tool 425 includes a slider control 435, selectable UI controls 440 and 445, selectable UI items 450-460, and several other UI controls. The selectable UI item 455 is for invoking an automatic color balance operation on the image being edited (the image 110 in this example). Details of the automatic color balance feature will be described below in Section II. The selectable UI item 460 is for activating a manual feature for a color balance mode (e.g., a skin tone color balance mode, a gray color balance mode, etc.) of the color balance tool 425. Details of the manual feature will be described below in Section IV.

The selectable UI item 450 (e.g., checkbox 450) is for activating and deactivating the color balance tool. When the UI item 450 is unchecked (e.g., the color balance tool 425 is disabled) and the image editing application receives a selection (e.g., through a click of a mouse button, a tap of a touchpad, or a touch of a touchscreen) of the UI item 450, the image editing application activates the color balance tool 425. In some embodiments, the image editing application automatically selects a default color balance mode (e.g., a skin tone color balance mode, a gray color balance mode, a temperature and tint color balance mode, etc.) when the image editing application receives input for activating the color balance tool. The image editing application of some such embodiments also automatically applies a default color balance operation using the automatically selected color balance mode of the color balance tool. When the UI item 450 is checked (e.g., the color balance tool 425 is enabled) and the image editing application receives a selection (e.g., through a click of a mouse button, a tap of a touchpad, or a touch of a touchscreen) of the UI item 450, the image editing application deactivates the color balance tool 425.

The slider control 435 is similar to the slider control 120 described above by reference to FIG. 1. That is, the slider control 435 includes a sliding region and a slider that is movable along an axis of the sliding region to apply and/or adjust a color balance operation associated with the active mode of the color balance tool 425. In this example, adjusting the slider towards the right along the axis of the sliding region causes the image editing application to adjust the color balance applied to the image towards warmer colors (e.g., red colors, orange colors, etc.) as indicated by the positive sign at the right end of the slider control 435. Adjusting the slider towards the left along the axis of the sliding region causes the image editing application to adjust the color balance applied to the image towards cooler colors (e.g., blue colors, purple colors, etc.) as indicated by the negative sign at the left end of the slider control 435.

The selectable UI control 445 is similar to the selectable UI control 115 described above by reference to FIG. 1. In other words, the selectable UI control 445 is for displaying the selected mode of the color balance tool 425. When the UI control 445 is displaying the selected mode of the color balance tool 425 and the UI control 445 is selected, the image editing application displays a list 430 (e.g., pop-up menu 430) that includes a set of selectable UI items that represent the modes of the color balance tool 425. When the image editing application receives a selection of a selectable UI item in the displayed list of UI items, the image editing application causes the color balance tool 425 to switch to the mode that corresponds to the selected UI item.

The selectable UI control 440 is for displaying the value associated with the position of the slider along the sliding region of the slider control 435. The UI control 440 is also for adjusting the slider in defined amounts (e.g., 0.01, 0.02, 0.05, etc.) along the sliding region of the slider control 435. As shown, the UI control 440 includes a set of selectable UI items (e.g., a left arrow button and a right arrow button) for decreasing and increasing the value associated with the slider. When the image editing application receives a selection of one of the selectable UI items of the UI control 440, the image editing application (1) adjusts the value associated with the slider, (2) displays the adjusted value through the UI control 440, and (3) moves the slider to the position along the sliding region of the slider control 435 that corresponds to the adjusted value. In some embodiments, the portion of the selectable UI control 440 for displaying the value associated with the position of the slider is also an editable UI control (e.g., an editable text field) for receiving numerical input that specifies the value associated with the slider.

The first stage 405 of the GUI 400 illustrates a selection of a color balance mode of the color balance tool 425. As shown, a user is selecting the UI item in the list 430 of UI items that represents the skin tone color balance mode of the color balance tool 425 using a cursor (e.g., by clicking a mouse button, tapping a touchpad, or touching a touchscreen) in order to select the skin tone color balance mode.

In this example, when the image editing application receives the selection of the UI item that represents the skin tone color balance mode, the image editing application automatically performs a skin tone color balance operation on the image 110 and presents the UI controls (the slider control 435 and the selectable UI control 440 in this example) for the skin tone color balance mode of the color balance tool 425. In some embodiments, when the image editing application automatically performs a skin tone color balance operation on the image 110, the image editing application also automatically adjusts the skin tone color balance operation towards cooler or warmer colors. The image editing application of some embodiments does not automatically perform a skin tone color balance operation on the image 110 when the image editing application receives the selection of the UI item that represents the skin tone color balance mode.

The image editing application of some embodiments performs the skin tone color balance operation on the image 110 by (1) detecting a face in the image 110, as indicated by a dashed box around the face of the musician in the image 110, and (2) modifying colors of pixels in the image 110 such that the colors of the detected face in the image 110 shift towards a defined skin tone color. In some embodiments, when the image editing application does not detect a face in the image 1010 upon receiving the selection of the UI item that represents the skin tone color balance mode, the image editing application does not perform an automatic the skin tone color balance operation on the image 1010.

The second stage 410 shows the GUI 400 after the image editing application has received the selection of the skin tone color balance mode of the color balance tool 425 and has automatically performed the skin tone color balance operation on the image 110. The results of the skin tone color balance operation are indicated by diagonal lines displayed over the image 110. Also, the image editing application is displaying (1) the slider control 435 and the UI control 440 for the skin tone color balance mode and (2) a label in the selectable UI control 445 that indicates that the skin tone color balance mode is the active mode of the color balance tool 425.

As shown in the second stage 410, the image editing application has positioned the slider at or near the center of the sliding region of the slider control 435 after the image editing application performed the skin tone color balance operation on the image 110. In some embodiments, the image editing application positions the slider along the sliding region based on the skin tone color balance operation. For instance, if the skin tone color balance operation results in the pixels in the image shifting towards blue and/or purple colors, the image editing application positions the slider towards the left side of the sliding region in order to provide a greater range of adjustment to the image towards warmer colors. Similarly, if the skin tone color balance operation results in the pixels in the image shifting towards red and/or orange colors, the image editing application positions the slider towards the right side of the sliding region in order to provide a greater range of adjustment to the image towards cooler colors.

The third stage 415 of the GUI 400 shows the image 110 after an adjustment has been made to the color balance operation applied to the image 110 in the second stage 410. In the third stage 415, the user has selected and moved the slider towards the left of the slider control 435 using the cursor (e.g., by clicking-and-holding a mouse button and dragging the mouse, tapping a touchpad and dragging across the touchpad, or touching the slider displayed on a touchscreen and dragging across the touchscreen) in order to adjust the color balance applied to the image 110 towards cooler colors. Fewer diagonal lines are displayed over the image 110 in the third stage 415 to indicate this adjustment.

In the fourth stage 420, the GUI 400 shows that another adjustment has been made to the color balance operation applied to the image 110 in the third stage 415. As shown, the user has selected and moved the slider towards the right of the slider control 435 using the cursor (e.g., by clicking-and-holding a mouse button and dragging the mouse, tapping a touchpad and dragging across the touchpad, or touching the slider displayed on a touchscreen and dragging across the touchscreen) in order to adjust the color balance applied to the image 110 towards warmer colors. Additional diagonal lines displayed over the image 110 in the fourth stage 420 are used to indicate the adjustment.

Figure 5:
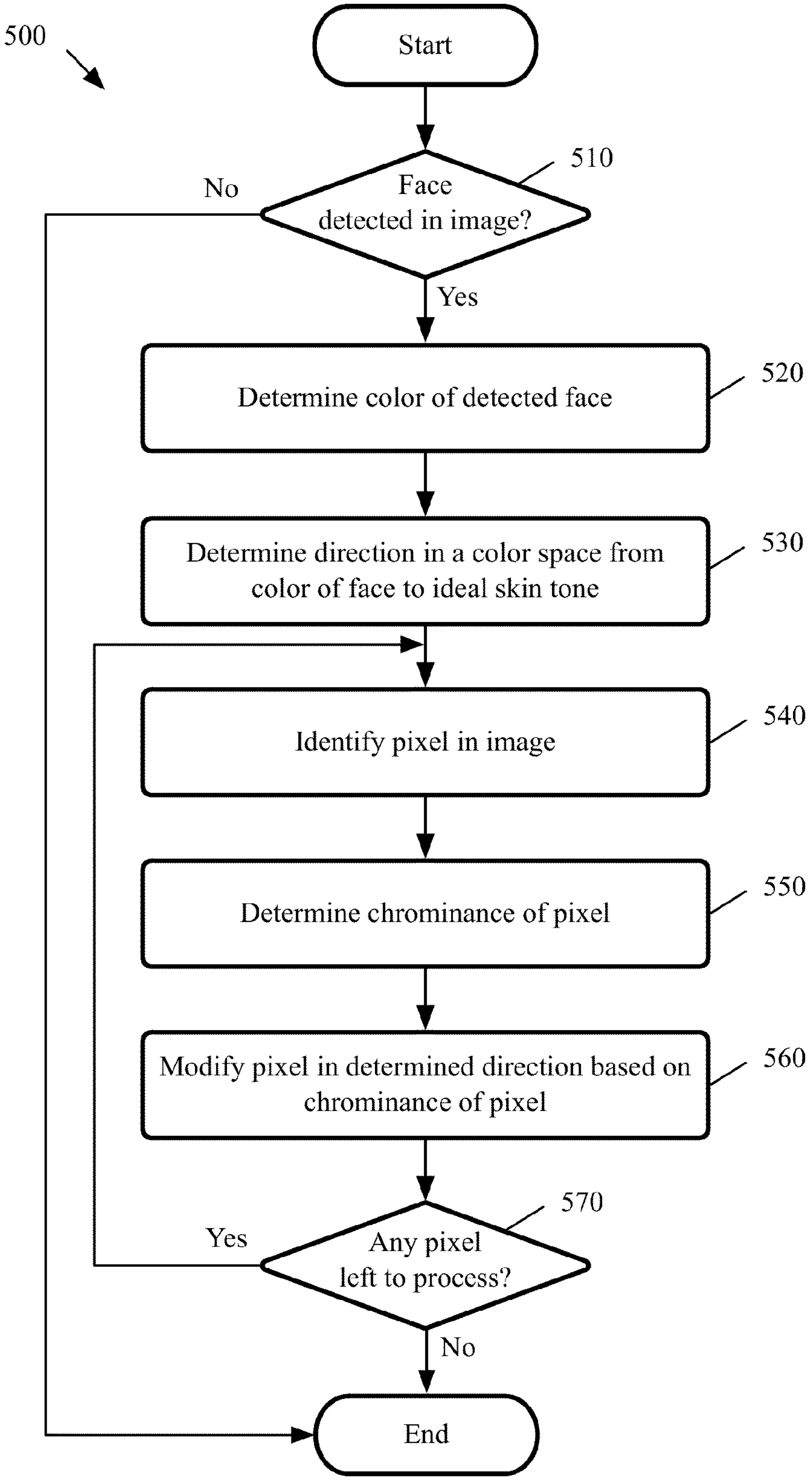
FIG. 5 conceptually illustrates a process of some embodiments for performing a skin tone color balance operation on an image.

FIG. 5 conceptually illustrates a process 500 of some embodiments for performing a skin tone color balance operation on an image. In some embodiments, the image editing application illustrated above and below by reference to FIGS. 4, 9, 11, 12, 17, 28, and 30 performs the process 500 when the image editing application receives a selection of a skin tone color balance mode as the active mode of a color balance tool.

The process 500 starts by determining (at 510) whether a face is detected in the image being edited. The process 500 of different embodiments uses different techniques to detect a face in the image. Examples of techniques includes binary pattern-classification, color segmentation, shape detection, Viola-Jones object detection, etc., or any combination of different techniques.

When the process determines that a face is not detected in the image, the process 500 ends. Otherwise, the process determines (at 520) the color of the detected face in the image. In different embodiments, the process 500 uses different ways to determine the color of the detected face. For instance, the process 500 averages the color values of the pixels of the face in the image in order to determine the color of the detected face. In some embodiments, the process 500 averages the color values of a specific region of the detected face (e.g., the upper portion, the lower portion, the middle portion, the edge that outlines face, etc.). Other methods of determining the color of the detected face are possible in some embodiments.

Next, the process 500 determines (at 530) a direction in a color space (e.g., YCC color space, YIQ color space, YCbCr color space, etc.) from a set of color values that represent the color of the face to a set of color values that represent an ideal skin tone. In some embodiments, the ideal skin tone is defined as a static set of color values in the color space that represents the ideal skin tone. In some embodiments, the ideal skin tone is a dynamic set of color values determined based on the determined color of the detected face in the image.

The process 500 then identifies (at 540) a pixel in the image to modify. After identifying a pixel in the image, the process 500 determines (at 550) the chrominance values of the pixel. The process 500 of some embodiments determines the chrominance values of the pixel by converting the pixel's values to a luminance and dual-chrominance color space and identifying the values of the pixel's chrominance components in the color space.

After determining the color values of the identified pixel, the process 500 modifies (at 560) the set of color values that represents the pixel in the color space in the determined direction in the color space based on the chrominance values of the pixel. For example, in some embodiments, the process 500 modifies pixels with high chrominance component values a large amount in the determined direction in the color space and modifies pixels with low chrominance component values a small amount in the determined direction in the color space. That is, the process 500 modifies high-saturated pixels (e.g., colorful pixels) in the image more than low-saturated pixels (e.g., neutral pixels). In some embodiments, the process 500 does not modify neutral colored pixels (e.g., black pixels, gray pixels, white pixels, etc.).

Finally, the process 500 determines (at 520) whether any pixel in the image is left to process. When the process 500 determines that there is a pixel in the image left to process, the process 500 returns to 540 to continue processing any remaining pixels in the image. Otherwise, the process 500 ends.

While the process described above by reference to FIG. 5 detects a face in an image in order to color balance the image, one of ordinary skill in the art will understand that the process of some embodiments may detect more than one face in the image. In some such embodiments, the process uses multiple faces to color balance the image. For instance, the process of some embodiments determines the color of each detected face and averages the colors of the faces. In some embodiments, the process uses the most neutral-colored face in the image to color balance the image while in other embodiments the process uses the least neutral-colored face in the image to color balance the image. The process uses additional and/or different techniques to determine the color to use to color balance the image based on multiple faces detected in the image, in some embodiments.

In addition, FIG. 5 describes a process that is performed when a skin tone color balance mode is selected as the active mode of a color balance tool. In some embodiments, a similar process is performed when a skin tone color balance operation applied to an image is adjusted (e.g., by using the slider control 435) towards warmer or cooler colors. The process of some such embodiments performs the same operations described above by reference to FIG. 5 except in operation 530, the process adjusts the color of the ideal skin tone towards warmer or cooler colors and then determines a direction in a color space from a determined color of a detected face in the image to the adjusted color of the ideal skin tone. Details of a skin tone color balance of some embodiments are provided in United States patent application entitled "Image Content-Based Color Balancing", with Ser. No. 13/152,206, now issued as U.S. Pat. No. 8,565,523. This application is herein incorporated by reference.

B. Gray Color Balance Mode

Figure 6:
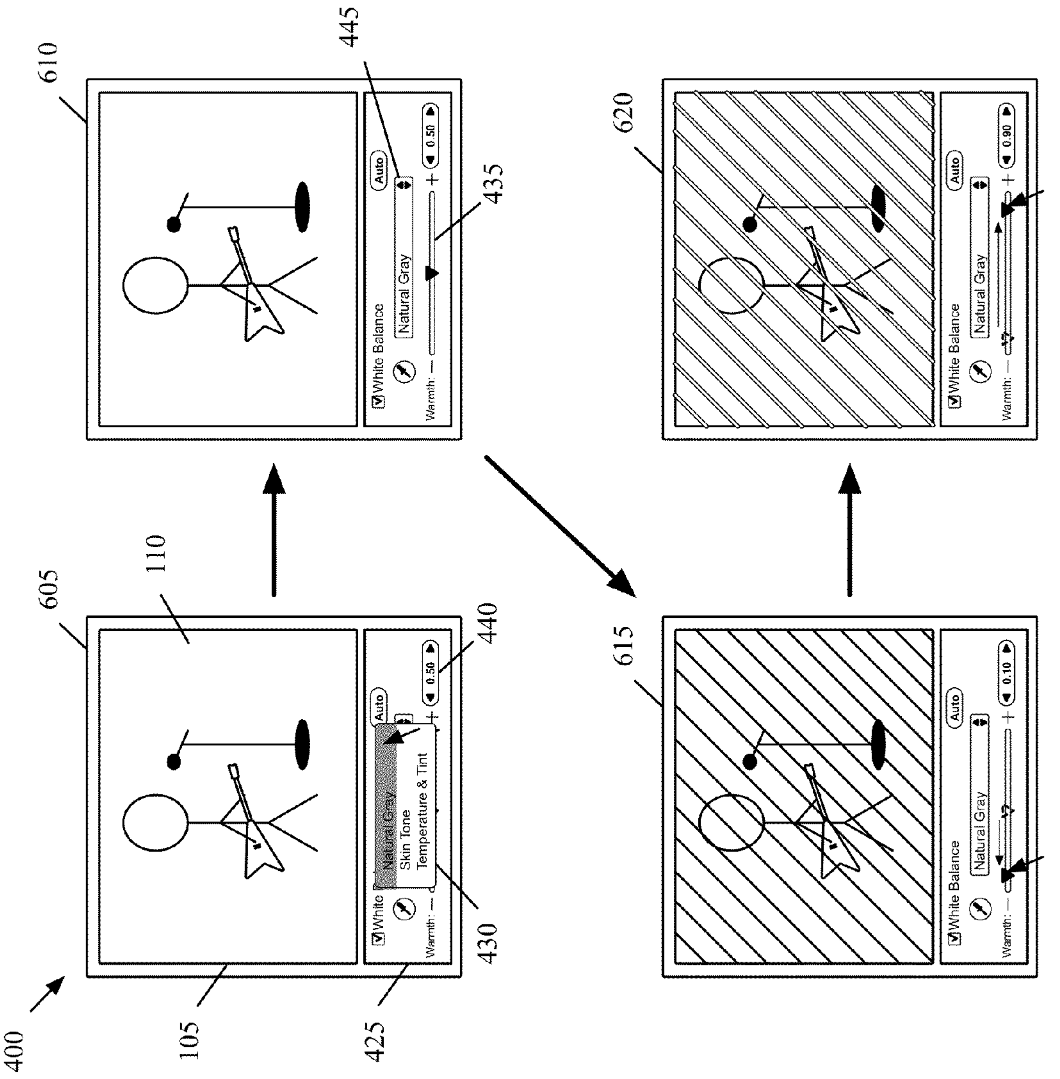
FIG. 6 conceptually illustrates a gray color balance mode of a color balance tool of some embodiments.

FIG. 6 conceptually illustrates a gray color balance mode of a color balance tool 425 of some embodiments. Specifically, FIG. 6 illustrates the GUI 400 at four different stages 605-620 of the color balance tool's gray color balance mode. The first stage 605 of the GUI 400 shows a selection of a color balance mode of the color balance tool 425. As shown in the first stage 605, a user is selecting the UI item in the list 430 of UI items that represents the gray color balance mode of the color balance tool 425 using a cursor (e.g., by clicking a mouse button, tapping a touchpad, or touching a touchscreen) in order to select the gray color balance mode.

In this example, when the image editing application receives the selection of the UI item that represents the gray color balance mode, the image editing application automatically presents the UI controls (the slider control 435 and the selectable UI control 440 in this example) for the gray color balance mode of the color balance tool 425. In addition, the image editing application does not automatically perform a gray color balance operation on the image 110 when the image editing application receives the selection of the UI item that represents the gray color balance mode.

However, the image editing application of some embodiments automatically performs a gray color balance operation on the image 110 when the image editing application receives the selection of the UI item that represents the gray color balance mode. The image editing application of some embodiments performs the gray color balance operation on the image 110 by performing the process 2200 described below by reference to FIG. 22. In some embodiments, when the image editing application automatically performs a gray color balance operation on the image 110, the image editing application also automatically adjusts the gray color balance operation towards cooler or warmer colors.

The second stage 610 illustrates the GUI 400 after the image editing application has received the selection of the gray color balance mode of the color balance tool 425. As shown, a gray color balance operation has not been applied to the image 110. Additionally, the image editing application is displaying (1) the slider control 435 and the UI control 440 for the gray color balance mode and (2) a label in the selectable UI control 445 that indicates that the gray color balance mode is the active mode of the color balance tool 425.

The third stage 615 of the GUI 400 shows the image 110 after a gray color balance operation has been applied to the image 110. In the third stage 615, the user has selected and moved the slider towards the left of the slider control 435 using the cursor (e.g., by clicking-and-holding a mouse button and dragging the mouse, tapping a touchpad and dragging across the touchpad, or touching the slider displayed on a touchscreen and dragging across the touchscreen) in order to apply a gray color balance operation to the image 110 that adjusts the colors of the image towards cooler colors. In this example, diagonal lines are displayed over the image 110 to indicate that the gray color balance operation has been applied to the image 110.

In the fourth stage 620, the GUI 400 shows that an adjustment been made to the color balance operation applied to the image 110 in the third stage 611. As shown, the user has selected and moved the slider towards the right of the slider control 435 using the cursor (e.g., by clicking-and-holding a mouse button and dragging the mouse, tapping a touchpad and dragging across the touchpad, or touching the slider displayed on a touchscreen and dragging across the touchscreen) in order to apply a gray color balance operation to the image 110 that adjusts the colors of the image towards warmer colors. Hollow diagonal lines are displayed over the image 110 in the fourth stage 620 to indicate that the gray color balance operation has been applied to the image 110.

Figure 7:
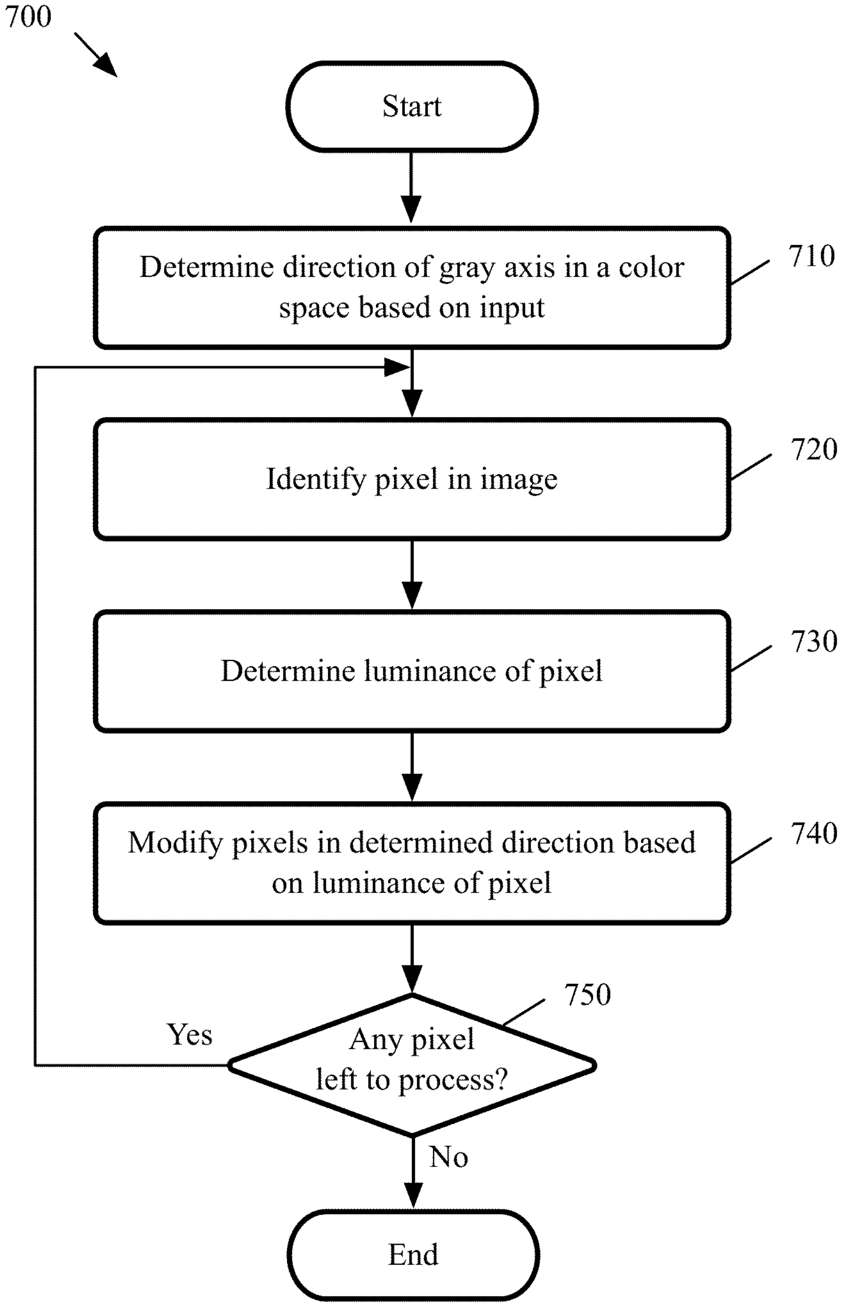
FIG. 7 conceptually illustrates a process of some embodiments for performing a gray color balance operation on an image.

FIG. 7 conceptually illustrates a process 700 of some embodiments for performing a gray color balance operation on an image. In some embodiments, the image editing application illustrated above and below by reference to FIGS. 6, 9, 11, 12, 17-20, and 26 performs the process 700 when the image editing application receives an input to perform a gray color balance operation (e.g., by adjusting slider of the slider control 435, by selecting a UI item of the selectable UI control 440, by pressing a key, a series of keys, or a combination of keys on a keyboard).

The process 700 begins by determining (at 710) a direction of a gray axis (e.g., a luminance axis) in a color space (e.g., YCC color space, YIQ color space, YCbCr color space, etc.) based on received input to perform a gray color balance operation. In some embodiments, the input specifies shifting the gray axis towards cooler colors or warmer colors (e.g., by adjusting the slider of the slider control 435).

Next, the process 700 then identifies (at 720) a pixel in the image to modify. Once a pixel in the image is identified, the process 700 determines (at 730) the luminance value of the pixel. The process 700 of some embodiments determines the luminance value of the pixel by converting the pixel's values to a luminance and dual-chrominance color space and identifying the values of the pixel's luminance component in the color space.

The process 700 then modifies (at 740) the color values that represent the pixel in the color space in the determined direction in the color space based on the luminance value of the pixel. For example, in some embodiments, the process 700 modifies pixels with high luminance component values a large amount in the determined direction in the color space and modifies pixels with low luminance component values a small amount in the determined direction in the color space. That is, the process 700 modifies dark pixels (e.g., shadows and darks) in the image less than medium pixels (e.g., midtones) and modifies medium pixels less than bright pixels (e.g., highlights).

Finally, the process 700 determines (at 750) whether any pixel in the image is left to process. When the process 700 determines that there is a pixel in the image left to process, the process 700 returns to 720 to continue processing any remaining pixels in the image. Otherwise, the process 700 ends.

While the process described above by reference to FIG. 5 detects a face in an image in order to color balance the image, one of ordinary skill in the art will understand that the process of some embodiments may detect more than one face in the image. In some such embodiments, the process uses multiple faces to color balance the image. For instance, the process of some embodiments determines the color of each detected face and averages the colors of the faces. In some embodiments, the process uses the most neutral-colored face in the image to color balance the image while in other embodiments the process uses the least neutral-colored face in the image to color balance the image. The process uses additional and/or different techniques to determine the color to use to color balance the image based on multiple faces detected in the image, in some embodiments.

C. Temperature and Tint Color Balance Mode

Figure 8:
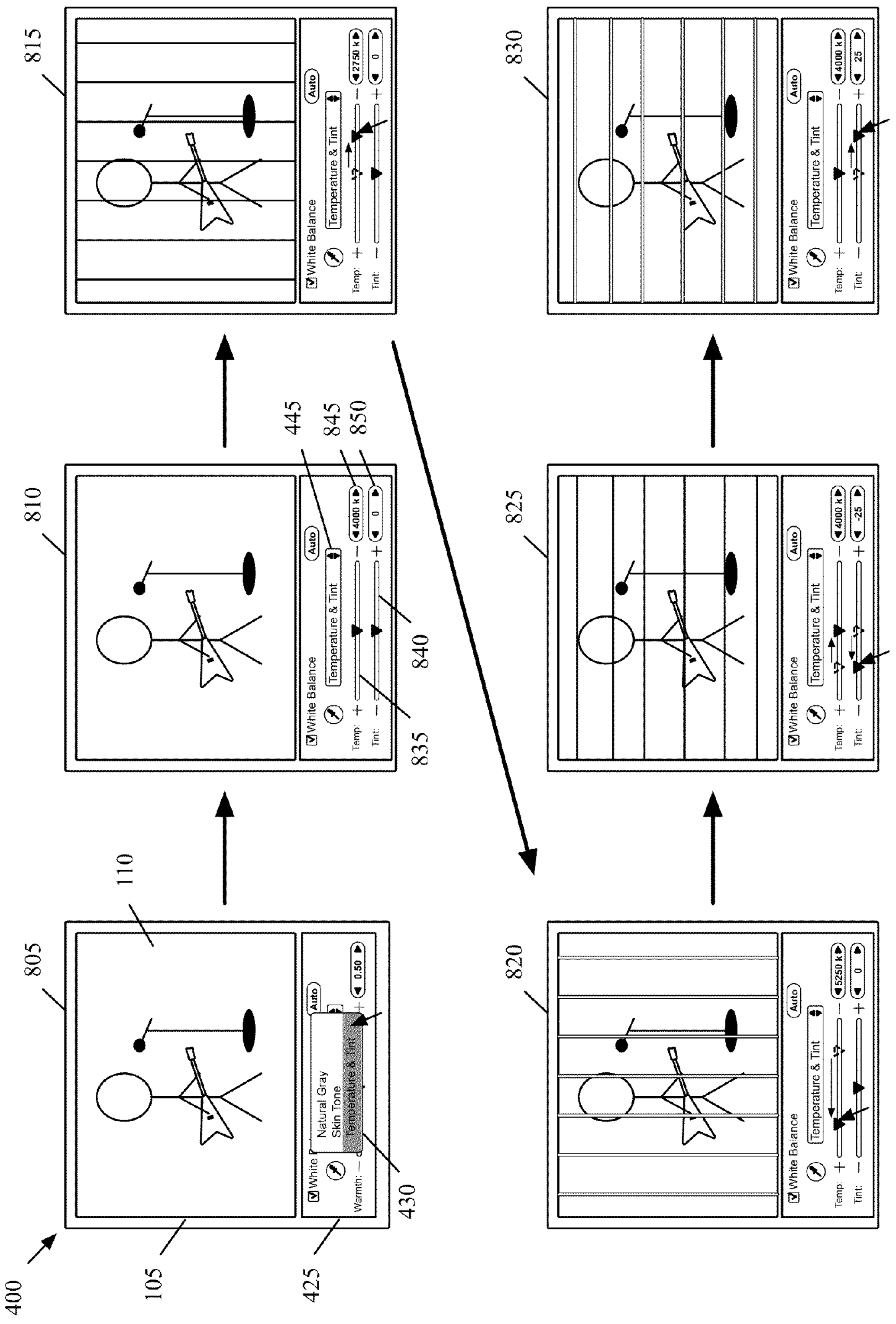
FIG. 8 conceptually illustrates a temperature and tint color balance mode of a color balance tool of some embodiments.

FIG. 8 conceptually illustrates a temperature and tint color balance mode of the color balance tool 425 of some embodiments. In particular, FIG. 8 illustrates the GUI 400 at six different stages 805-830 that show several temperature and tint color balance operations.

The first stage 805 of the GUI 400 illustrates a selection of a color balance mode of the color balance tool 425. In particular, the first stage 805 shows that a user is selecting the UI item in the list 430 of UI items that represents the temperature and tint color balance mode of the color balance tool 425 using a cursor (e.g., by clicking a mouse button, tapping a touchpad, or touching a touchscreen) in order to select the temperature and tint color balance mode. In some embodiments, when the image editing application receives the selection of the UI item that represents the temperature and tint color balance mode, the image editing application automatically presents the UI controls (the slider controls 835 and 840 and the selectable UI controls 845 and 850 in this example) for the temperature and tint color balance mode of the color balance tool 425.

The second stage 810 illustrates the GUI 400 after the image editing application has received the selection of the temperature and tint color balance mode of the color balance tool 425. As shown in the second stage 810, the image editing application is displaying (1) the slider controls 835 and 840 and selectable UI controls 845 and 850 for the temperature and tint color balance mode and (2) a label in the selectable UI control 445 that indicates that the temperature and tint color balance mode is the active mode of the color balance tool 425.

The slider controls 835 840 are similar to the slider control 120 described above by reference to FIG. 1. Each of the slider controls 835 840 includes a sliding region and a slider that is movable along an axis of the sliding region to apply and/or adjust a color balance operation associated with the active mode of the color balance tool 425. In this example, adjusting the slider of the slider control 835 towards the right along the axis of the sliding region causes the image editing application to decrease the temperature of the image and adjust the colors of the image towards orange colors. Adjusting the slider of the slider control 835 towards the left along the axis of the sliding region causes the image editing application to increase the temperature of the image and adjust the colors of the image towards blue colors.

In addition, adjusting the slider of the slider control 840 towards the right along the axis of the sliding region causes the image editing application to increase the tint of the image and adjust the colors of the image towards green colors. Adjusting the slider of the slider control 840 towards the left along the axis of the sliding region causes the image editing application to decrease the tint of the image and adjust the colors of the image towards magenta colors.

The selectable UI control 845 is for displaying the value associated with the position of the slider along the sliding region of the slider control 835. The UI control 845 is also for adjusting the slider in defined amounts (e.g., 5 K, 50 K, 100K, etc.) along the sliding region of the slider control 835. As shown, the UI control 845 includes a set of selectable UI items (e.g., a left arrow button and a right arrow button) for increasing and decreasing the value associated with the slider. When the image editing application receives a selection of one of the selectable UI items of the UI control 845, the image editing application (1) adjusts the value associated with the slider, (2) displays the adjusted value through the UI control 845, and (3) moves the slider to the position along the sliding region of the slider control 835 that corresponds to the adjusted value.

The selectable UI control 850 is for displaying the value associated with the position of the slider along the sliding region of the slider control 840. In addition, the UI control 850 is for adjusting the slider in defined amounts (e.g., 1, 2, 5, etc.) along the sliding region of the slider control 840. As shown, the UI control 850 includes a set of selectable UI items (e.g., a left arrow button and a right arrow button) for decreasing and increasing the value associated with the slider. When the image editing application receives a selection of one of the selectable UI items of the UI control 850, the image editing application (1) adjusts the value associated with the slider, (2) displays the adjusted value through the UI control 850, and (3) moves the slider to the position along the sliding region of the slider control 840 that corresponds to the adjusted value.

As illustrated in the second stage 810, a temperature and tint color balance operation has not been applied to the image 110. However, in some embodiments, when the image editing application receives the selection of the UI item in the list 430 of UI items that represents the temperature and tint color balance mode, the image editing application performs a temperature color balance operation and/or a tint color balance operation on the image 110 based on values provided from a particular source. For instance, in some embodiments, the temperature and tint values are provided from the image 110's metadata. An example of such metadata includes the image 110's EXIF data recorded by an image capture device (e.g., a digital camera, a smartphone, etc.) that was used to capture the image 110. As another example of a source of temperature and tint values, in some embodiments, a user manually provides the temperature and tint values based on readings from a color metering device used at or near the time the image 110 was captured. Additionally, the image editing application of some such embodiments uses the provided temperature and tint values to set the positions of the slider control 35 and 840 and display the values in the UI controls 845 and 850.

In some embodiments, the image editing application performs a temperature and/or tint color balance operation on an image by identifying a color to remove from the image and using the following equation to calculate new color values for the pixels in the image:

$$\begin{bmatrix} R' \\ G' \\ B' \end{bmatrix} = \begin{bmatrix} \frac{1}{R_W} & 0 & 0 \\ 0 & \frac{1}{G_W} & 0 \\ 0 & 0 & \frac{1}{B_W} \end{bmatrix} \times \begin{bmatrix} R \\ G \\ B \end{bmatrix}$$

where R, G, and B are the color values of a pixel before the temperature and/or tint color balance operation has been applied; $R_w$, $G_w$, and $B_w$ are the color values of the color to remove from the image; and R', G', and B' are color values of the pixel after the temperature and/or tint color balance operation has been applied. The image editing application of some embodiments converts the color space of the image to an RGB color space (e.g., a Bradford RGB color space) before using the above equation to performing a temperature and/or tint color balance operation on the image.

The third stage 815 of the GUI 400 shows the image 110 after a temperature color balance operation has been applied to the image 110. At the this stage 815, the user has selected and moved the slider towards the right of the slider control 835 using the cursor (e.g., by clicking-and-holding a mouse button and dragging the mouse, tapping a touchpad and dragging across the touchpad, or touching the slider displayed on a touchscreen and dragging across the touchscreen) in order to apply a temperature color balance operation to the image 110 for decreasing the temperature of the image 110 (e.g., shifting the color of the image 110 towards orange colors). In this example, diagonal lines are displayed over the image 110 to indicate the decreased temperature of the image 110.

In the fourth stage 820, the GUI 400 shows that an adjustment has been made to the temperature of the image 110 illustrated in the third stage 815. As shown, the user has selected and moved the slider towards the right of the slider control 835 using the cursor (e.g., by clicking-and-holding a mouse button and dragging the mouse, tapping a touchpad and dragging across the touchpad, or touching the slider displayed on a touchscreen and dragging across the touchscreen) in order to apply a temperature color balance operation to the image 110 for increasing the temperature of the image 110 (e.g., shifting the color of the image 110 towards blue colors). Hollow diagonal lines are displayed over the image 110 in the fourth stage 820 to indicate the increased temperature of the image 110.

The fifth stage 825 of the GUI 400 illustrates the image 110 after the temperature of the image has been adjusted back to the temperature illustrated in the second stage 810. At this stage 825, the user has selected and moved the slider towards the right of the slider control 835 using the cursor (e.g., by clicking-and-holding a mouse button and dragging the mouse, tapping a touchpad and dragging across the touchpad, or touching the slider displayed on a touchscreen and dragging across the touchscreen) in order to apply a temperature color balance operation to the image 110 for decreasing the temperature of the image 110 (e.g., shifting the color of the image 110 towards orange colors) back to that illustrated in the second stage 810. No diagonal lines are displayed over the image 110 in the fifth stage 825 to indicate that the temperature of the image 110 is the same as that shown in the second stage 110.

In addition, the fifth stage 825 of the GUI 400 shows the image 110 after a tint color balance operation has been applied to the image 110. As shown, the user has selected and moved the slider towards the left of the slider control 840 using the cursor (e.g., by clicking-and-holding a mouse button and dragging the mouse, tapping a touchpad and dragging across the touchpad, or touching the slider displayed on a touchscreen and dragging across the touchscreen) in order to apply a tint color balance operation to the image 110 for decreasing the tint of the image 110 (e.g., shifting the color of the image 110 towards green colors). In this example, horizontal lines are displayed over the image 110 to indicate the decreased tint of the image 110.

The sixth stage 830 of the GUI 400 illustrates that an adjustment has been made to the tint of the image 110 illustrated in the fifth stage 825. As shown, the user has selected and moved the slider towards the right of the slider control 840 using the cursor (e.g., by clicking-and-holding a mouse button and dragging the mouse, tapping a touchpad and dragging across the touchpad, or touching the slider displayed on a touchscreen and dragging across the touchscreen) in order to apply a tint color balance operation to the image 110 for increasing the tint of the image 110 (e.g., shifting the color of the image 110 towards magenta colors). Hollow horizontal lines are displayed over the image 110 at this stage 830 to indicate the increased tint of the image 110.

D. Multiple Color Balance Operations

Many of the figures described above illustrate applying a single color balance operation to an image and/or adjusting the single color balance operation that is applied to the image. The image editing application of some embodiments allow a user to apply several color balance operations to an image to better color balance the image or produce a pleasing appearance of the image.

Figure 9:
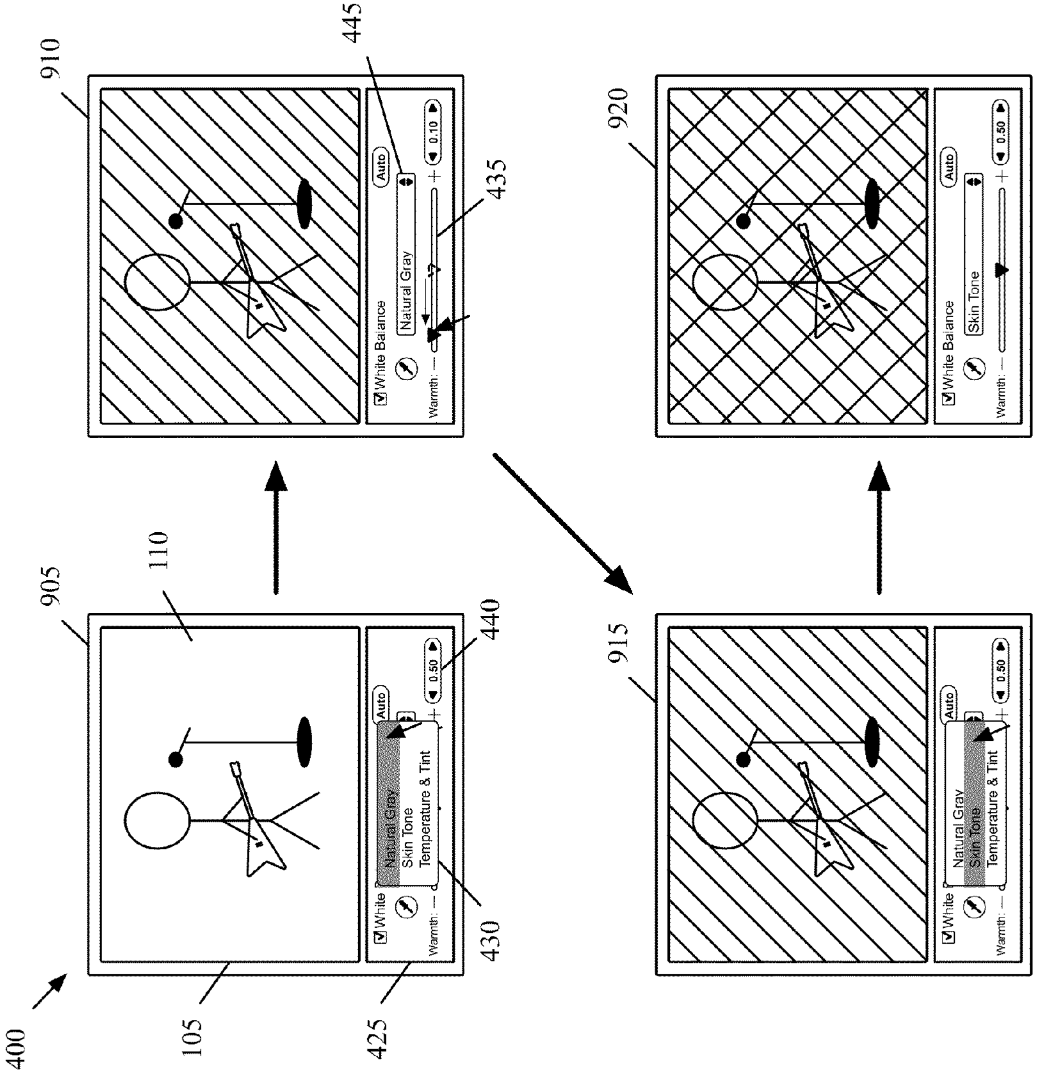
FIG. 9 conceptually illustrates an example of applying different color balance operations to an image using different color balance modes of a color balance tool of some embodiments.

FIG. 9 conceptually illustrates an example of applying different color balance operations on an image using different color balance modes of a color balance tool of some embodiments. In particular, FIG. 9 illustrates the GUI 400 at four different stages 905-920 that show several color balance operations applied to the image 110.

The first stage 905 of the GUI 400 illustrates a selection of a color balance mode of the color balance tool 425. As shown, a user is selecting the UI item in the list 430 of UI items that represents the gray color balance mode of the color balance tool 425 using a cursor (e.g., by clicking a mouse button, tapping a touchpad, or touching a touchscreen) in order to select the gray color balance mode. In some embodiments, when the image editing application receives the selection of the UI item that represents the gray color balance mode, the image editing application automatically presents the UI controls (the slider control 435 and the selectable UI control 440 in this example) for the gray color balance mode of the color balance tool 425.

The second stage 910 illustrates the GUI 400 after the image editing application has received the selection of the gray color balance mode of the color balance tool 425. In addition, the image editing application is displaying at this stage 910 (1) the slider control 435 and the UI control 440 for the gray color balance mode and (2) a label in the selectable UI control 445 that indicates that the gray color balance mode is the active mode of the color balance tool 425.

The second stage 910 of the GUI 400 also shows the image 110 after a gray color balance operation has been applied to the image 110. As shown, the user has selected and moved the slider towards the left of the slider control 435 using the cursor (e.g., by clicking-and-holding a mouse button and dragging the mouse, tapping a touchpad and dragging across the touchpad, or touching the slider displayed on a touch-screen and dragging across the touchscreen) in order to apply a gray color balance operation to the image 110 that adjusts the colors of the image towards cooler colors. In some embodiments, the image editing application applies the gray color balance operation by performing the process 700 described above by reference to FIG. 8 or the process 2200 described below by reference to FIG. 22. In this example, diagonal lines are displayed over the image 110 to indicate that the gray color balance operation has been applied to the image 110.

The third stage 915 of the GUI 400 illustrates a selection of another color balance mode of the color balance tool 425. At this stage 915, the user is selecting the UI item in the list 430 of UI items that represents the skin tone color balance mode of the color balance tool 425 using a cursor (e.g., by clicking a mouse button, tapping a touchpad, or touching a touch-screen) in order to select the skin tone color balance mode.

In this example, when the image editing application receives the selection of the UI item that represents the skin tone color balance mode, the image editing application automatically performs a skin tone color balance operation on the image 110 and presents the UI controls (the slider control 435 and the selectable UI control 440 in this example) for the skin tone color balance mode of the color balance tool 425. As described above, in some embodiments, the image editing application performs the skin tone color balance operation on the image 110 by (1) detecting a face in the image 110 and (2) modifying colors of pixels in the image 110 such that the colors of the detected face in the image 110 shift towards a defined skin tone color.

The fourth stage 920 shows the GUI 400 after the image editing application has received the selection of the skin tone color balance mode of the color balance tool 425 and has automatically performed a skin tone color balance operation on the image 110. In some embodiments, the image editing application applies the skin tone color balance operation by performing the process 500 described above by reference to FIG. 5. As explained above, the process 500 of some embodiments modifies high-saturated pixels (e.g., colorful pixels) in the image more than low-saturated pixels (e.g., neutral pixels) and does not modify neutral colored pixels (e.g., black pixels, gray pixels, white pixels, etc.). Thus, applying this particular order of color balance operations (i.e., a gray color balance operation followed by a skin tone color balance operation) to the image 110 allows multiple color balance operations to be applied to the image while maintaining some or all of the effects of each of the color balance operations that are applied to the image 110. In other words, the gray color balance operation shifts pixels in the image 110 towards gray and the skin tone color balance operation color balances the image 110 based on skin tones in the image without affecting the pixels that were shifted towards gray as a result of the gray color balance operation.

For this example, different diagonal lines are displayed over the image 110 to indicate that the skin tone color balance operation has been applied to the image 110. At this stage 920, both sets of diagonal lines are displayed over the image 110 to indicate that the gray color balance operation and the skin tone color balance operation have been applied to the image 110.

FIG. 9 illustrates one example of applying two color balance operations to an image using two different color balance modes of a color balance tool. One of ordinary skill in the art will realize that any number of additional and/or other color balance operations may be applied to the image. For instance, a user may subsequently apply a temperature and/or tint color balance operation to the image after the fourth stage 920.

Figure 10:
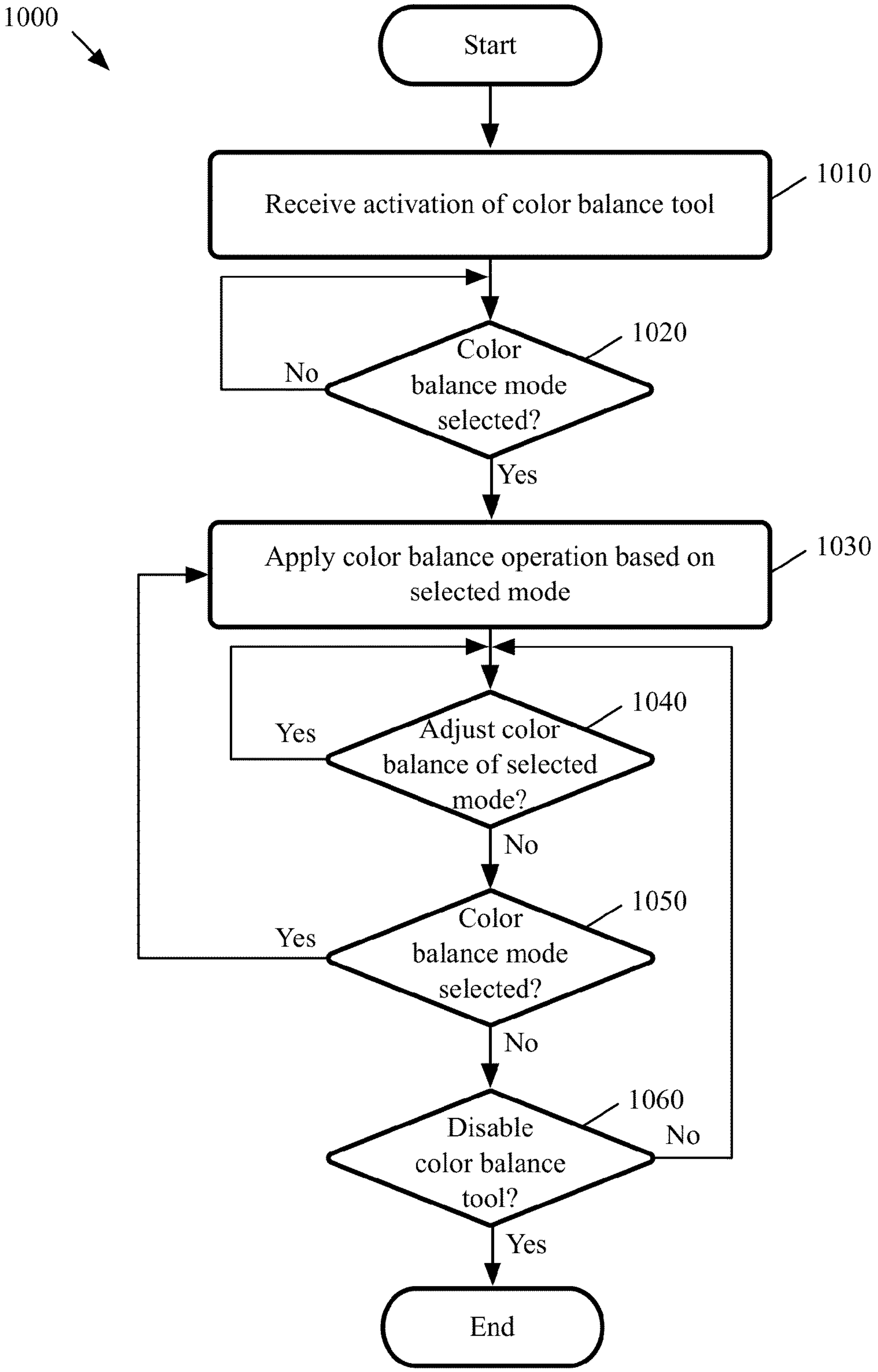
FIG. 10 conceptually illustrates a process of some embodiments for applying different color balance operations to an image using different color balance modes of a color balance tool.

FIG. 10 conceptually illustrates a process 1000 of some embodiments for applying different color balance operations to an image using different color balance modes of a color balance tool. In some embodiments, an image editing application that provides a color balance tool described above by reference to FIGS. 1, 4, 6, 8, 9, 17-20, 26, 28, and 30 performs the process 1000.

The process 1000 starts by receiving (at 1010) input for activating the color balance tool. The input may be received through any number of different ways. For instance, the process 1000 of some embodiments receives the input through a selection of a UI item (e.g., by clicking a mouse button, tapping a touchpad, or touching a touchscreen), a hotkey, a keystroke, a series of keystrokes, a combination of keystrokes, or any other appropriate method to provide input for activating the color balance tool.

Next, the process 1000 determines (at 1020) whether a color balance mode is selected for the color balance tool. In some embodiments, a color balance mode is selected in a similar manner as that described above by reference to FIGS. 1, 4, 6, 8, and 9. Additional and/or other ways to select a color balance mode for the color balance tool include using a hotkey, a keystroke, a series of keystrokes, a combination of keystrokes, an option selected from a pop-up menu or pull-down menu, or any other appropriate method to select a color balance mode for the color balance tool. As noted above, in some embodiments, the process 1000 automatically selects a default color balance mode (e.g., a skin tone color balance mode, a gray color balance mode, a temperature and tint color balance mode, etc.) when the process 1000 receives input for activating the color balance tool.

When the process 1000 determines that a color balance mode is not selected for the color balance tool, the process 1000 returns to 1020 to continue checking for a selection of a color balance mode. When the process 1000 determines that a color balance mode is selected for the color balance tool, the process 1000 applies (at 1030) a color balance operation to the image based on the selected color balance mode. For example, when a skin tone color balance mode is selected, the process 1000 of some embodiments automatically performs a skin tone color balance on the image by (1) detecting a face in the image and (2) modifying colors of pixels in the image such that the colors of the detected face in the image shift towards a defined skin tone color. As another example, in some embodiments, the process 1000 applies a temperature and/or tint color balance operation on the image when a temperature and tint color balance mode is selected and temperature and/or tint values are available to the process 1000 (e.g., values included in image's metadata values from color meter readings provided by a user). For some color balance modes (e.g., a gray color balance mode), the process 1000 of some embodiments does not apply a color balance operation to the image when such a color balance mode is selected.

After applying a color balance operation based on the selected mode, the process 1000 determines (at 1040) whether an adjustment to the color balance operation is received. In some embodiments, an adjustment to the color balance operation is provided in a similar manner as that described above by reference to FIGS. 1, 4, 6, 8, and 9. Additional and/or other ways to provide an adjustment to the color balance operation include using a hotkey, a keystroke, a series of keystrokes, a combination of keystrokes, an option selected from a pop-up menu or pull-down menu, or any other appropriate method to adjust the color balance operation. In some embodiments, the process 1000 adjusts the color balance operation by using the selected color balance mode to perform a color balance operation on the image based on input for adjusting the color balance operation. When the process 1000 determines that an adjustment to the color balance operation is received, the process 1000 applies the adjusted color balance operation to the image and proceeds to 1040 to continue checking for input. Otherwise, the process 1000 continues to 1050.

At 1050, the process determines whether a different color balance mode for the color balance tool is selected. In some embodiments, a different color balance mode for the color balance tool is selected in a similar manner as that described above by reference to FIGS. 1, 4, 6, 8, and 9. Additional and/or other ways to select a different color balance mode for the color balance tool include using a hotkey, a keystroke, a series of keystrokes, a combination of keystrokes, an option selected from a pop-up menu or pull-down menu, or any other appropriate method to select a mode for the color balance tool. When the process 1000 determines that a different color balance mode is selected, the process 1000 returns to 1030 to apply a color balance operation on the image using the selected mode. When the process 1000 determines that a different color balance mode is not selected, the process 1000 continues to 1060.

The process 1000 then determines (at 1060) whether the color balance tool is disabled. The color balance tool may be disabled through any number of different ways. For example, in some embodiments, the color balance tool is disabled based on a selection of a UI item (e.g., by clicking a mouse button, tapping a touchpad, or touching a touchscreen), a hotkey, a keystroke, a series of keystrokes, a combination of keystrokes, or any other appropriate method to provide input for deactivating the color balance tool. When the process 1000 determines that the color balance tool is not disabled, the process 1000 returns to 1040 to continue processing input for the color balance tool. Otherwise, the process 1000 ends.

The above-described FIGS. 9 and 10 illustrate using different color balance modes of a color balance tool to apply different color balance operations to an image. The image editing application of some embodiments allows a user to use different color balance modes of a color balance tool to apply different color balance operations to an image. In some embodiments, the image editing application does not aggregate (e.g., stack) color balance operations specified using different color balance modes. Instead, the image editing application of some such embodiments only applies the color balance operations specified using the most recently used color balance mode (e.g., the active color balance mode) of the color balance tool.

Figure 11:
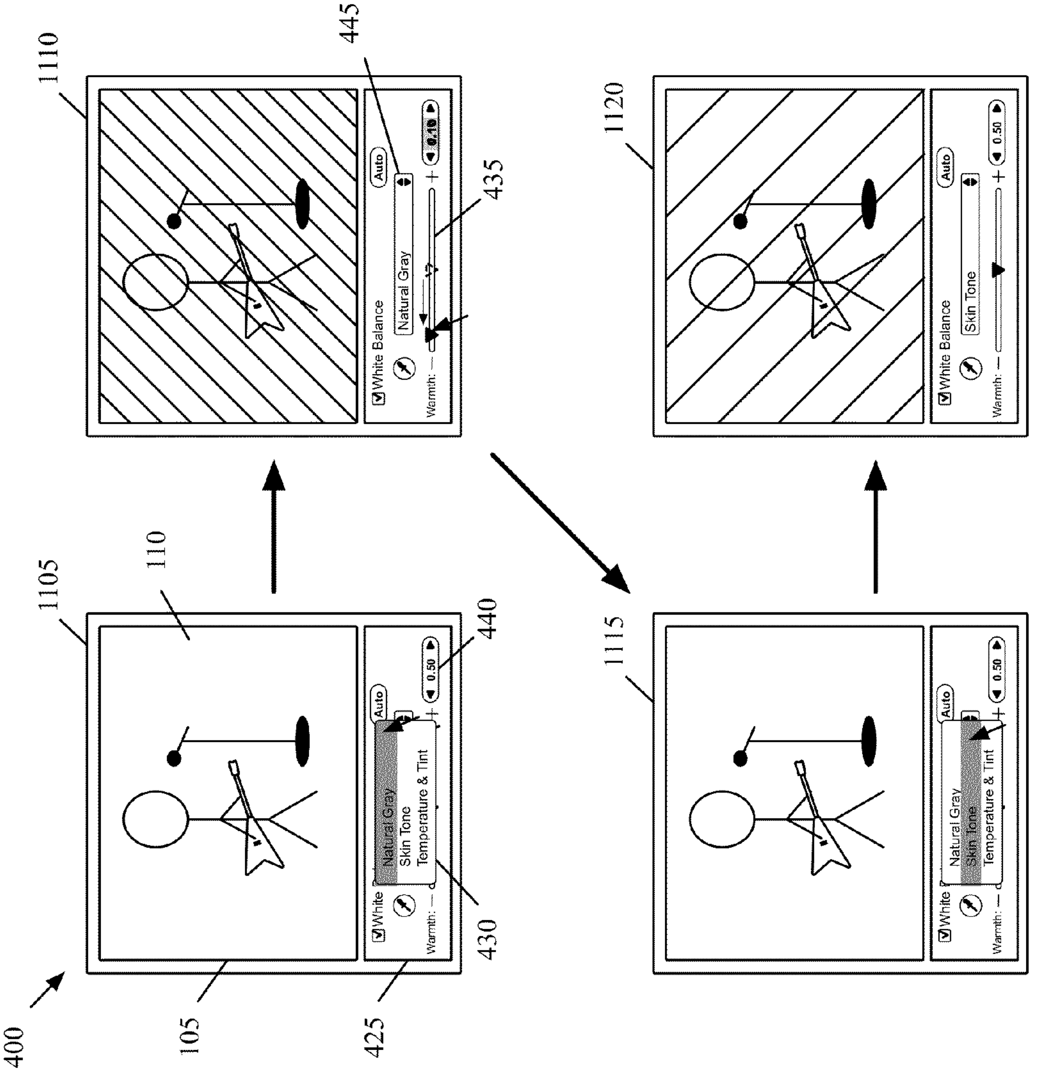
FIG. 11 conceptually illustrates applying different color balance operations to an image using different color balance modes of a color balance tool of some embodiments.

FIG. 11 conceptually illustrates applying different color balance operations to an image using different color balance modes of a color balance tool of some embodiments. In particular, FIG. 11 illustrates the GUI 400 at four different stages 1105-1120 that show several color balance operations (1) that are specified using several different color balance modes of the color balance tool 425 and (2) that are separately applied to the image 110.

The first and second stages 1105 and 1110 are similar to the first and second stages 905 and 910, which are described above by reference to FIG. 9. That is, the first stage 1105 of the GUI 400 shows a user selecting the gray color balance mode of the color balance tool 425 and the second stage 1110 shows the image 110 after a gray color balance operation has been applied to the image 110.

The third stage 1115 is similar to the third stage 915 that is described above by reference to FIG. 9 except the image editing application removes the color balance operation applied to the image 110 in the second stage 1110 when the image editing application receives the selection of the skin tone color balance mode of the color balance tool 425. As shown in this stage 1115, the diagonal lines shown in the second stage 1110 are no longer displayed over the image 110 in order to indicate that the gray color balance operation has been removed from the image 110.

In this example, when the image editing application receives the selection of the UI item that represents the skin tone color balance mode, the image editing application automatically performs a skin tone color balance operation on the image 110 and presents the UI controls (the slider control 435 and the selectable UI control 440 in this example) for the skin tone color balance mode of the color balance tool 425. As noted above, in some embodiments, the image editing application performs the skin tone color balance operation on the image 110 by (1) detecting a face in the image 110 and (2) modifying colors of pixels in the image 110 such that the colors of the detected face in the image 110 shift towards a defined skin tone color.

The fourth stage 1120 illustrates the GUI 400 after the image editing application has received the selection of the skin tone color balance mode of the color balance tool 425 and has automatically performed a skin tone color balance operation on the image 110. For this example, different diagonal lines are displayed over the image 110 to indicate that the skin tone color balance operation has been applied to the image 110. Since the image editing application removed the gray color balance operation when the skin tone color balance mode was selected in the third stage 1115, the fourth stage 1120 only display over the image 110 the diagonal lines that indicate that the skin tone color balance operations has been applied to the image 110.

FIG. 11 illustrates one example of switching from one color balance mode to another color balance mode of a color balance tool and applying to an image only the color balance operations associated with the most recently (e.g., the active color balance mode) selected color balance mode of the color balance tool. One of ordinary skill in the art will understand that a user may switch to any color balance mode of the color balance tool any number of different times and the image editing application of some embodiments will apply to the image the color balance operations specified using only the most recently selected color balance mode.

The above-described FIGS. 9 and 10 illustrates a single color balance tool for applying multiple color balance operations to an image. In some embodiments, the image editing application provides multiple instances of a color balance tool in order to apply multiple color balance operations to an image.

Figure 12:
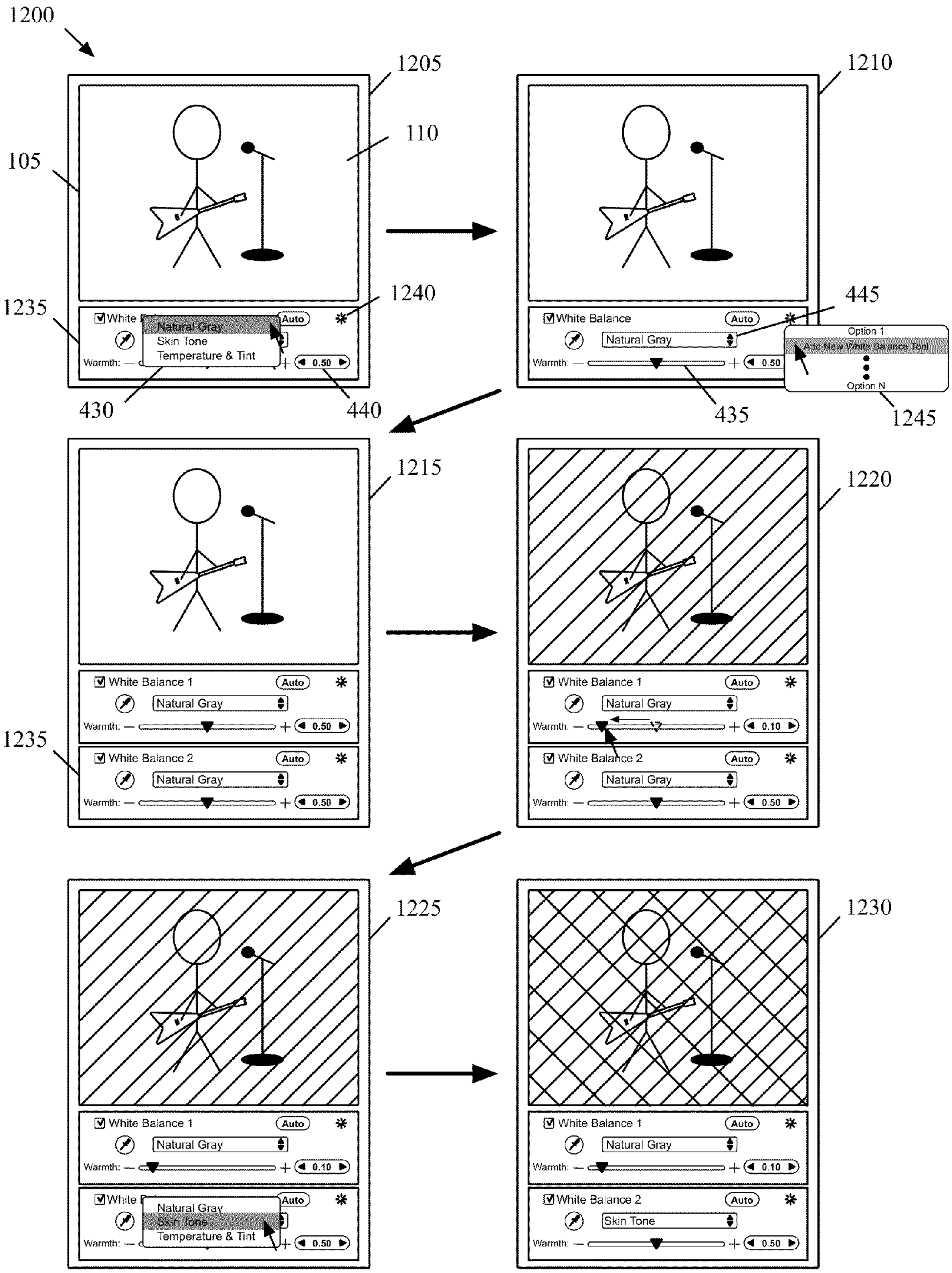
FIG. 12 conceptually illustrates applying multiple color balance operations to an image using color balance modes of different instances of a color balance tool of some embodiments.

FIG. 12 conceptually illustrates applying multiple color balance operations to an image using color balance modes of different instances of a color balance tool of some embodiments. Specifically, FIG. 12 illustrates a GUI 1200 at six different stages 1205-1230 that show applying multiple color balance operations to the image 110. The GUI 1200 is similar to the GUI 400 described above by reference to FIG. 4 except the GUI 1200 includes an instance of a color balance tool 1235 instead of the color balance tool 425. The color balance tool 1235 is similar to the color balance tool 425 described above by reference to FIG. 4, but the color balance tool 1235 also includes a selectable UI item 1240 for displaying a list 1245 (e.g., pop-up menu 1245) that includes N selectable UI items for selecting N options. In particular, the Add New White Balance Tool option is for adding an instance of the color balance tool 1235.

The first stage 1205 of the GUI 1200 illustrates a selection of a color balance mode of the color balance tool 1235. As shown in the first stage 1205, a user is selecting the UI item in the list 430 of UI items that represents the gray color balance mode of the color balance tool 1235 using a cursor (e.g., by clicking a mouse button, tapping a touchpad, or touching a touchscreen) in order to select the gray color balance mode. In some embodiments, when the image editing application receives the selection of the UI item that represents the gray color balance mode, the image editing application automatically presents the UI controls (the slider control 435 and the selectable UI control 440 in this example) for the gray color balance mode of the color balance tool 1235.

The second stage 1210 shows the GUI 1200 after the image editing application has received the selection of the gray color balance mode of the color balance tool 1235. As shown, a gray color balance operation has not been applied to the image 110. Additionally, the image editing application is displaying (1) the slider control 435 and the UI control 440 for the gray color balance mode and (2) a label in the selectable UI control 445 that indicates that the gray color balance mode is the active mode of the color balance tool 1235.

In addition, the second stage 1210 illustrates the GUI 1200 the user has selected the UI item 1240 using the cursor (e.g., by clicking a mouse button, tapping a touchpad, or touching a touchscreen) in order to display the list 1245. When the image editing application receives the selection of the UI item 1240, the image editing application displays the list 1245. The second stage 1210 of the GUI 1200 also illustrates that the user is selecting an option (the Add New White Balance Tool in this example) in the list 1245 to add a second instance of the color balance tool 1235.

The third stage 1215 illustrates the GUI 1200 after another instance of the color balance tool 1235 has been added. As shown, the GUI 1200 is displaying two instances of the color balance tool 1235. In some embodiments, the image editing application automatically selects a default color balance mode (e.g., a skin tone color balance mode, a gray color balance mode, a temperature and tint color balance mode, etc.) when the image editing application creates and adds an instance of the color balance tool 1235. In this example, the image editing application automatically selects the gray color balance mode as the default mode for the second instance of the color balance tool 1235.

The fourth stage 1220 of the GUI 1200 shows the image 110 after a gray color balance operation has been applied to the image 110. In the fourth stage 1220, the user has selected and moved the slider towards the left of the slider control 435 of the first instance of the color balance tool 1235 using the cursor (e.g., by clicking-and-holding a mouse button and dragging the mouse, tapping a touchpad and dragging across the touchpad, or touching the slider displayed on a touchscreen and dragging across the touchscreen) in order to apply a gray color balance operation to the image 110 that adjusts the colors of the image towards cooler colors. In some embodiments, the image editing application applies the gray color balance operation by performing the process 700 described above by reference to FIG. 8 or the process 2200 described below by reference to FIG. 22. In this example, diagonal lines are displayed over the image 110 to indicate that the gray color balance operation has been applied to the image 110.

The fifth stage 1225 of the GUI 1200 illustrates a selection of a color balance mode of the second instance of the color balance tool 1235. As shown, the user is selecting the UI item in the list 430 of UI items that represents the skin tone color balance mode of the second instance of the color balance tool 1235 using the cursor (e.g., by clicking a mouse button, tapping a touchpad, or touching a touchscreen) in order to select the skin tone color balance mode.

In this example, when the image editing application receives the selection of the UI item that represents the skin tone color balance mode, the image editing application automatically performs a skin tone color balance operation on the image 110 and presents the UI controls (the slider control 435 and the selectable UI control 440 in this example) for the skin tone color balance mode of the second instance of the color balance tool 1235. As mentioned above, the image editing application of some embodiments performs the skin tone color balance operation on the image 110 by (1) detecting a face in the image 110, as indicated by a dashed box around the face of the musician in the image 110, and (2) modifying colors of pixels in the image 110 such that the colors of the detected face in the image 110 shift towards a defined skin tone color.

The sixth stage 1230 illustrates the GUI 1200 after the image editing application has received the selection of the skin tone color balance mode of the second instance of the color balance tool 1235 and has automatically performed the skin tone color balance operation on the image 110. As explained above, the process 500 of some embodiments modifies high-saturated pixels (e.g., colorful pixels) in the image more than low-saturated pixels (e.g., neutral pixels) and does not modify neutral colored pixels (e.g., black pixels, gray pixels, white pixels, etc.). Thus, applying this particular order of color balance operations (i.e., a gray color balance operation followed by a skin tone color balance operation) to the image 110 allows multiple color balance operations to be applied to the image while maintaining some or all of the effects of each of the color balance operations that are applied to the image 110. In other words, the gray color balance operation shifts pixels in the image 110 towards gray and the skin tone color balance operation color balances the image 110 based on skin tones in the image without affecting the pixels that were shifted towards gray as a result of the gray color balance operation.

In this example, different diagonal lines are displayed over the image 110 to indicate that the skin tone color balance operation has been applied to the image 110. As shown in the sixth stage 1230, both sets of diagonal lines are displayed over the image 110 to indicate that the gray color balance operation of the first instance of the color balance tool 1235 and the skin tone color balance operation of the second instance of the color balance tool 1235 have been applied to the image 110.

Figure 13:
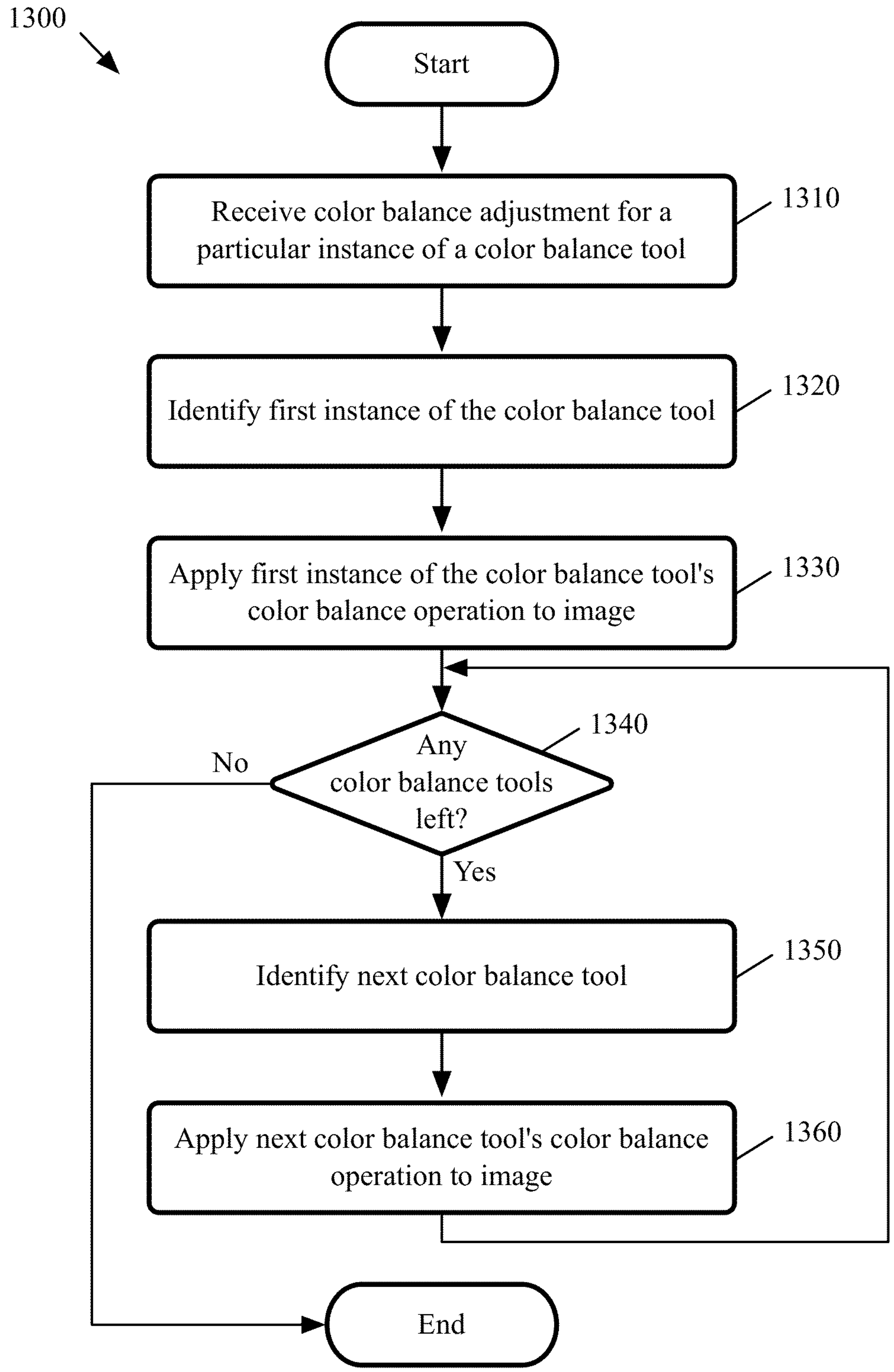
FIG. 13 conceptually illustrates a process of some embodiments for applying different color balance operations to an image using different color balance modes of different instances of a color balance tool.

FIG. 13 conceptually illustrates a process 1300 of some embodiments for applying different color balance operations to an image using color balance modes of different instances of a color balance tool. The image editing application of some embodiments that provides multiple instances of a color balance tool, such as the image editing application described above by reference to FIG. 12, performs the process 1300 to apply multiple color balance operations of the multiple instances of the color balance tool to an image.

The process 1300 begins by receiving (at 1310) a color balance adjustment to a particular instance of the color balance tool. In some embodiments, the process 1300 receives the color balance adjustment through an adjustment of a UI control (e.g., the slider control 435, 835, or 840, the selectable UI control 440, 845, or 850). Additional and/or other methods of receiving the color balance adjustment are possible. For instance, the process 1300 of some embodiments receives the color balance adjustment through a hotkey, a keystroke, a series of keystrokes, a combination of keystrokes, an option selected from a pop-up menu or pull-down menu, or any other appropriate method to adjust an instance of the color balance tool. In some instances, the received color balance adjustment is an initial color balance operation determined by the image editing application (e.g., an automatic color balance operation determined by the image editing application upon a selection of a skin tone color balance mode of an instance of the color balance tool). When the process 1300 receives the color balance adjustment, the process 1300 associates the adjustment with the corresponding instance of the color balance tool.

Next, the process 1300 identifies (at 1320) a first instance of the color balance tool. In some embodiments, the process 1300 applies the color balance operations of the instances of the color balance tool according to a defined order. For example, the order that the color balance operations are applied is defined as the order that the instances of color balance tools appear in a GUI (e.g., from top to bottom or bottom to top in the GUI 1200). In some embodiments, the each instance of the color balance tool is assigned a unique identifier and the order that the color balance operations are applied is defined based on the numerical ordering of the identifiers (e.g., lowest to highest, highest to lowest, etc.)

The process 1300 of some embodiments applies a portion of the instances' color balance operations. For example, in some embodiments, the process 1300 identifies the first instance of the color balance tool as the instance of the color balance tool that received the color balance adjustment and starts applying the first instance's color balance operation on a version of the image with the color balance operations of all the instances that are ordered before the first instance. The process 1300 of some such embodiments continues processing any remaining instances that follow the first instance according to the defined order.

The process 1300 then applies (at 1330) the first instance of the color balance tool's color balance operation to the image. After applying the color balance operation of the first instance of the color balance tool, the process 1300 determines (at 1340) whether any instance of the color balance tool is left to process. When the process 1300 determines that there is no instance of the color balance tool left to process, the process 1300 ends. Otherwise, the process 1300 proceeds to 1350 to continue processing any remaining instances of the color balance tool.

At 1350, the process 1300 identifies the next instance of the color balance tool to process. After identifying the next instance of the color balance tool, the process 1300 applies (at 1360) the color balance operation of the identified instance of the color balance tool to the image. The process 1300 then returns to 1340 to determine whether there is any instance of the color balance tool left to process.

As described above, FIGS. 9 and 12 illustrate examples of successively applying multiple color balance operations to an image such that subsequent color balance operations maintain some or all of the effects of previous color balance operations. Specifically, FIGS. 9 and 12 show a gray color balance operation applied to an image followed by a skin tone color balance operation that is applied to the image in a way that maintains the effects of the previous gray color balance operation. One of ordinary skill in the art will realize that other combinations of multiple color balance operations may be applied to an image so that subsequent color balance operations maintain some or all of the effects of previous color balance operations. For example, in some embodiments, a skin tone color balance operation is applied to an image after a temperature and tint color balance operation in such a way that maintains the effects of the previous temperature and tint color balance operation.

E. Wide Gamut Color Space

Many of the figures described above and below illustrate applying a color balance operation to an image. In some embodiments, the image editing application operates on images in a wide gamut color space to color balance the images.

Figure 14:
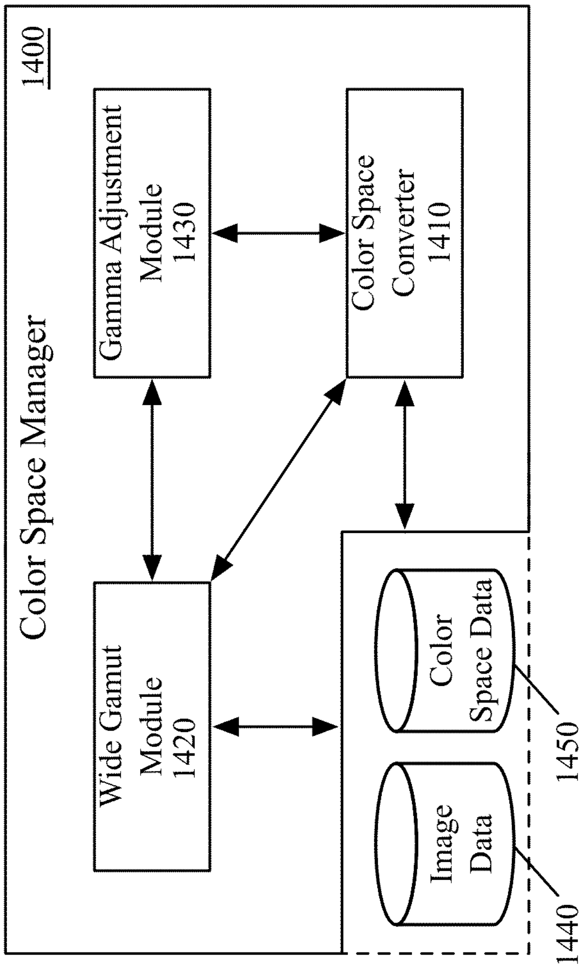
FIG. 14 conceptually illustrates a software architecture of a color space manager of some embodiments that color balances images in a wide gamut color space.

FIG. 14 conceptually illustrates a software architecture of a color space manager 1400 of some embodiments that color balances images in a wide gamut color space. In some embodiments, the color space manager 1400 is a stand-alone application or is integrated into another application (e.g., an image editing application), while in other embodiments the color space manager 1400 might be implemented within an operating system. Furthermore, in some embodiments, the color space manager 1400 is provided as part of a server-based solution. In some such embodiments, the color space manager 1400 is provided via a thin client. That is, the color space manager 1400 runs on a server while a user interacts with the color space manager 1400 via a separate machine remote from the server. In other such embodiments, the color space manager 1400 is provided via a thick client. That is, the color space manager 1400 is distributed from the server to the client machine and runs on the client machine.

As shown in FIG. 14, the color space manager 1400 includes a color space converter 1410, a wide gamut module 1420, and a gamma adjustment module 1430. The color space manager 1400 also includes image data storage 1440 and color space data storage 1450.

The image data storage 1440 stores image data (e.g., RAW image files, JPEG image files, versions of images represented in different color spaces, thumbnail versions of images, edited versions of images, etc.) that a user views, edits, and organizes with an image editing application that includes the color space manager 1400. The color space data storage 1450 stores definitions of different color spaces (e.g., sRGB, wide gamut RGB, ProPhoto, YUV, YCbCr, YIQ, HSV, HSL, etc.) and other information related to the color spaces (e.g., a list of operations for converting images into a color space for color balancing). In some embodiments, the image data storage 1440 and the color space data storage 1450 are stored in one physical storage while, in some embodiments, the data storages are stored in separate physical storages. Still, in some embodiments, one or both of the storages 1440 and 1450 are implemented across multiple physical storages.

The color space converter 1410 handles the conversion of images among different color spaces. Specifically, the color space converter 1410 uses image data from the image data storage 1440 and definitions of color spaces in the color space data storage 1450 to convert color values of pixels in an image from a first color space to color values in a second color space (e.g., from an sRGB color space to a wide gamut RGB color space and vice versa, from a wide gamut RGB color space to a YCC color space and vice versa, etc.).

Before and/or after converting an image from a first color space to a second color space, the color space converter 1410, in some instances, passes the image to other modules (e.g., the wide gamut module 1420, the gamma adjustment module 1430) to process the image. For example, in some embodiments, images are stored in the image data storage 1440 in an sRGB format. In some such embodiments, an image that is captured in a RAW file format is converted to an sRGB color space for storage in the image data storage 1440. In many cases, the color gamut of the RAW format is greater than the color gamut of the sRGB color space. In order to preserve colors that exceed the color gamut of the sRGB color space (e.g., colors less than 0 and/or greater than 1 in the sRGB color space), the color space converter 1410 converts the image from the sRGB color space to a wide gamut RGB color space (e.g., by passing the image to the wide gamut module 1420).

Once the color space converter 1410 has completed converting an image to a color space for color balancing, the color space converter 141 of some embodiments stores the image in the image data storage 1440. In some embodiments, the color space converter 141 sends the image to the image editing application for color balancing. After the image has been color balanced, the color space converter 1410 receives the image from the image editing application or from the image data storage 1440 and converts the image to another color space. For instance, the color space converter 1440 converts the image to the color space in which the image was stored (e.g., an sRGB color space) when the color space converter 1410 retrieved the image from the image data storage 1440.

The wide gamut module 1420 is responsible for converting the color space of images to and from wider gamut color spaces. In some embodiments, a wide gamut color space is a color space that has a wider range of values than a color space from which the wide gamut module 1420 converts. For instance, when the wide gamut module 1420 converts from an sRGB image, a wide gamut RGB color space and a ProPhoto color space are both examples of a wide gamut color spaces because the wide gamut RGB color space and the ProPhoto color spaces each have greater ranges of values than the sRGB color space.

When the wide gamut module 1420 receives requests from the color space converter 1410 to convert images to a wide gamut color space, the wide gamut module 1420 uses color space definitions in color space data storage 1450 to perform wide gamut conversions. In some embodiments, the wide gamut module 1420 converts an image by applying transforms (e.g., 3×3 transform) to the image. After converting the image to a wide gamut color space, the wide gamut module 1420 sends the image to the color space converter 1410 or the gamma adjustment module 1420 for gamma adjustments.

The gamma adjustment module 1430 applies a gamma adjustment to images. In some embodiments, a gamma adjustment is a nonlinear operation used to modify luminance values of images. A gamma adjustment in some embodiments is defined by the following equation:

$$V_{out}=AV_{in}^{\gamma}$$

where A is a constant, the input and output values are nonnegative real numbers, and γ is a positive real number. In some embodiments, the constant A is defined as 1.

Figure 15:
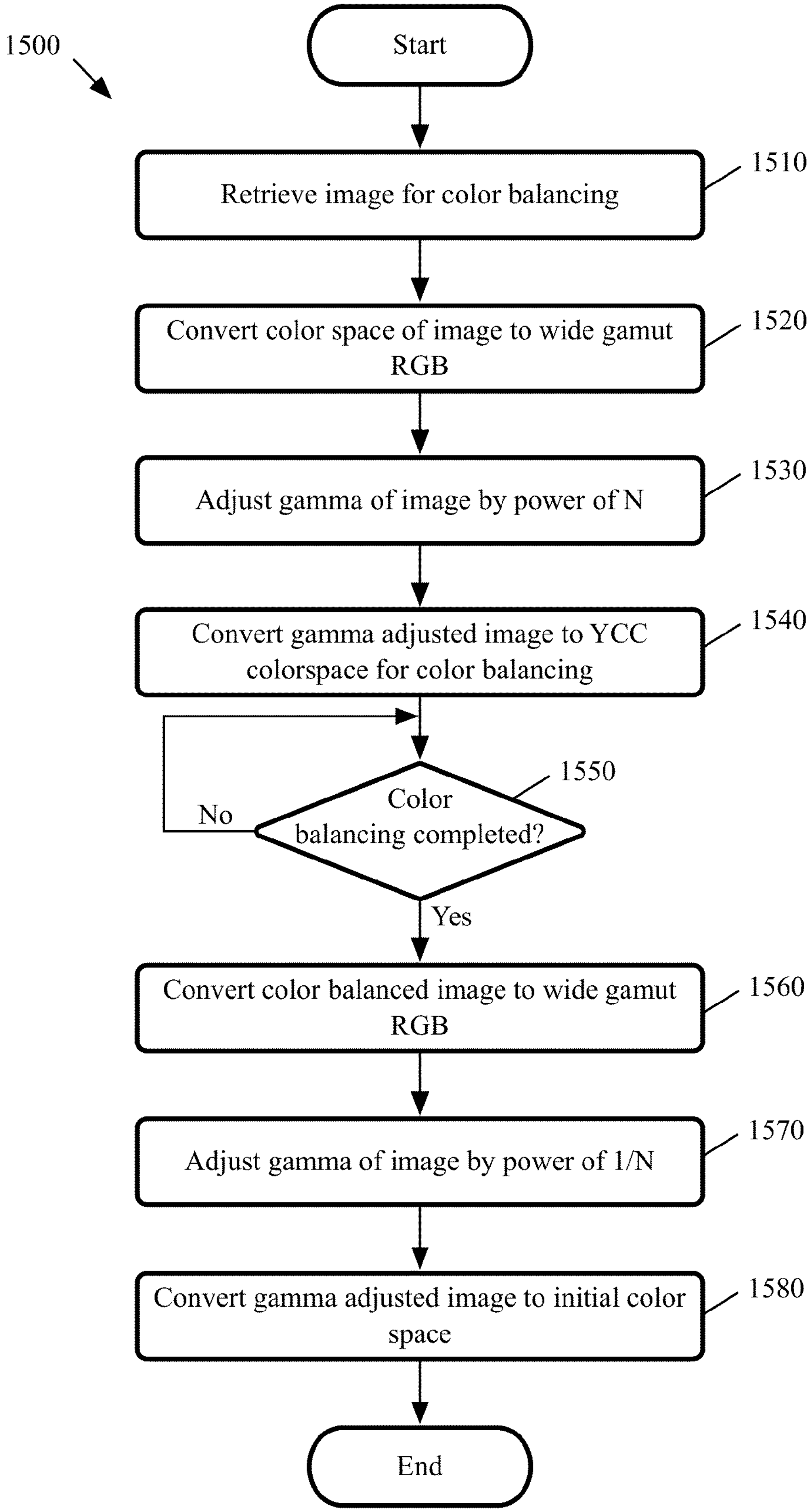
FIG. 15 conceptually illustrates a process of some embodiments for converting an image to a color space for color balancing.

An example operation of the color space manager 1400 will now be described by reference to FIG. 15, which conceptually illustrates a process 1500 of some embodiments for converting an image to a color space for color balancing. In some embodiments, the color space manager 1400 performs the process 1500 when the image is being editing by an image editing application that includes the color space manager 1400 and the image editing application receives input for activating a color balance tool or an instance of the color balance tool. The color space manager 1400 of some embodiments performs the process 1500 for a defined set of color balance operations (e.g., skin tone color balance operations and gray color balance operations).

The process 1500 begins by retrieving (at 1510) an image for color balancing. The color space manager 1400 of some embodiments retrieves the image from the image data storage 1440. In some embodiments, the color space manager 1400 retrieves the image from image editing application, which retrieved the image from the image data storage 1440.

Next, the process 1500 converts (at 1520) the color space of the image to a wide gamut RGB color space. In some embodiments, the wide gamut module 1420 converts the image's color space to the wide gamut color space. As mentioned above, images of some embodiments are stored in the image data storage 1440 in an sRGB format. In some such embodiments, the process 1500 converts the image from the sRGB color space to a wide gamut RGB color space. The process 1500 of some embodiments converts the image from the sRGB color space to the wide gamut RGB color space by applying a 3×3 transform to the image. The following is an equation that uses such a transform to convert the image from an sRGB color space to the wide gamut RGB color space:

$$\begin{bmatrix} R' \\ G' \\ B' \end{bmatrix} = \begin{bmatrix} 0.6154 & 0.3675 & 0.0170 \\ 0.1148 & 0.7979 & 0.0878 \\ 0.0115 & 0.0641 & 0.9244 \end{bmatrix} \times \begin{bmatrix} R \\ G \\ B \end{bmatrix}$$

The process 1500 then adjusts (at 1530) the gamma of the image by a power of N. In some embodiments, the process 1500 adjusts the gamma of the image by applying a gamma adjustment. The gamma adjustment module 1430 of some embodiments performs the gamma adjustment. In some such embodiments, the gamma adjustment module 1430 performs the gamma adjustment using the equation described above with γ set as a value less than 1 (e.g., ½, ⅓, ¼, etc.) and A set as 1. By adjusting the gamma of the image, the process 1500 modifies the wide gamut RGB color space of the image. As such, the color space of the image after the image's gamma is adjusted is referred to as a modified wide gamut RGB color space.

Next, the process 1500 converts (at 1540) the color space of the image from the modified wide gamut color space to a YCC color space. The color space converter 1410 of some embodiments converts the image's color space to the YCC color space. In some embodiments, a YCC color space is a color space with a luminance component and two chrominance components (e.g., a YCbCr color space, a YIQ color space, etc.).

The process 1500 of different embodiments converts the image's color space to different luminance and dual chrominance color spaces. For instance, the process 1500 of some embodiments converts the image representation from the modified wide gamut RGB color space to a YIQ color space. In some embodiments, the YIQ color space is referred to as a modified YIQ color space as the process 1500 converts from a modified wide gamut RGB color space.

After converting the image to the YCC color space, the process 1500 determines (at 1550) whether color balancing the image is completed. In some embodiments, the process 1500 determines that the color balancing of the image is completed when the image editing application that includes the color space manager 1400 receives input for disabling or deactivating a color balance tool or some or all instances of the color balance tool. When the process 1500 determines that color balancing the image is not completed, the process 1500 returns to 1550 to continue checking whether the color balancing of the image is completed. Otherwise, the process 1500 proceeds to 1560.

At 1560, the process 1500 converts the color space of the image from the YCC color space to a wide gamut RGB color space. The color space converter 1410 of some embodiments converts the image's color space to the wide gamut RGB color space. In some embodiments, the process 1500 converts the color space of the image to the modified wide gamut RGB color space to which the process 1500 converted the image at 1540.

Next, the process 1500 adjusts (at 1570) the gamma of the image by a power of 1/N. In some embodiments, the process 1500 adjusts the gamma of the image by applying a gamma adjustment. The gamma adjustment module 1430 of some embodiments performs the gamma adjustment. In some such embodiments, the gamma adjustment module 1430 performs the gamma adjustment using the equation described above with Y set as the inverse value used in operation 1570 (e.g., 2, 3, 4, etc.) and A set as 1.

Finally, the process 1500 converts (at 1580) the gamma adjusted image to the initial color space (e.g., an sRGB color space) in which the process 1500 retrieved the image at 1510. In some embodiments, the wide gamut module 1420 converts the image's color space to the initial color space. The process 1500 of some embodiments converts the image by applying the inverse of the transform shown above by reference to 1520. After converting the image to the image's initial color space, the process 1500 then ends.

While many of the features have been described as being performed by one module (e.g., the color space converter 1410, etc.), one of ordinary skill in the art will recognize that the functions described herein might be split up into multiple modules. Similarly, functions described as being performed by multiple different modules might be performed by a single module in some embodiments (e.g., the color space converter 1410 and the wide gamut module 1420).

II. Auto Color Balance

The section above describes examples and embodiments of a color balance tool with multiple different color balance modes. As mentioned above, in some embodiments, the image editing application includes a feature that automatically selects one of the modes of the color balance tool to use to color balance an image and automatically applies a color balance operation to the image using the selected mode.

Figure 16:
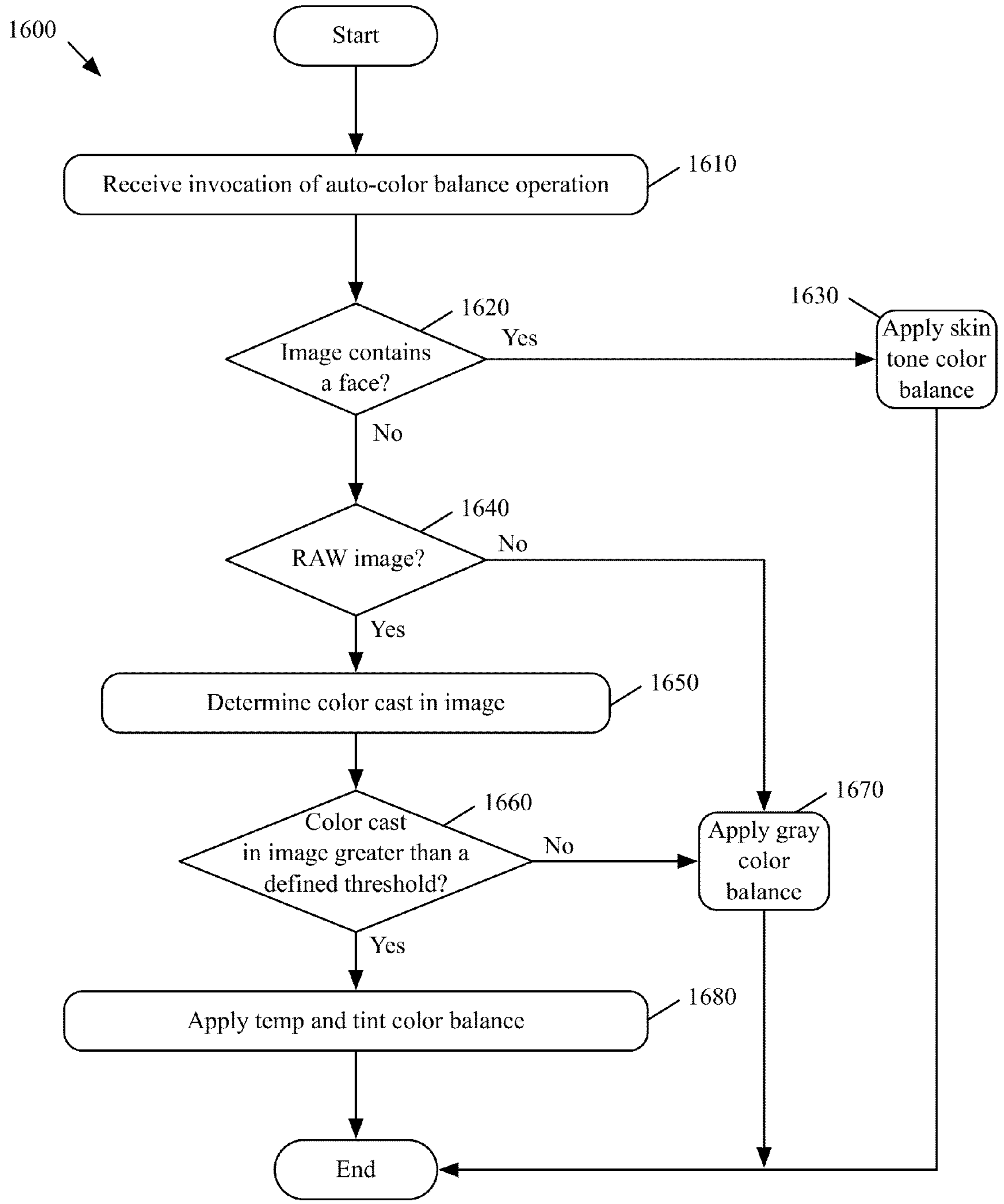
FIG. 16 conceptually illustrates a process of some embodiments for automatically color balancing an image.

FIG. 16 conceptually illustrates a process 1600 of some embodiments for automatically color balancing an image. The image editing application of some embodiments that provides a multi-mode color balance tool, such as the color balance tools described above by reference to FIGS. 4-13, performs the process 1600 when the color balance tool is activated.

The process 1600 starts by receiving (at 1610) an invocation of an auto-color balance feature of the color balance tool. In some embodiments, the process 1600 receives the invocation through a selection of a UI item. Additional and/or other methods of receiving the invocation are possible. For instance, the process 1600 of some embodiments receives the invocation through a hotkey, a keystroke, a series of keystrokes, a combination of keystrokes, an option selected from a pop-up menu or pull-down menu, or any other appropriate method to invoke the auto-color balance feature. In some embodiments, when the process 1600 receives the invocation of the auto-color balance features, the process 1600 removes any color balance operations that have been previously applied to the image before proceeding to 1620.

Next, the process 1600 determines (at 1620) whether the image contains a face. The process 1500 of different embodiments uses different techniques to detect whether the image contains a face. Examples of techniques includes binary pattern-classification, color segmentation, shape detection, Viola-Jones object detection, etc., or any combination of different techniques. When the process 1600 determines that the image contains a face, the process 1600 proceeds to 1630.

At 1630, the process 1600 applies a skin tone color balance operation to the image. In some embodiments, the process 1600 applies the skin tone color balance operation to the image by automatically selecting the skin tone color balance mode of the color balance tool and automatically applying a skin tone color balance operation using the skin tone color balance mode of the color balance tool. The process 1600 of some embodiments uses the process 5 described above by reference to FIG. 5 to apply the skin tone color balance operation to the image.

When the process 1600 determines that the image does not contain a face, the process 1600 determines (at 1640) whether the image is formatted according to a RAW file format. When the process 1600 determines that the image format is not a RAW format, the process 1600 proceeds to 1670.

When the process 1600 determines that the image format is a RAW format, the process 1600 determines (at 1650) a color of a color cast in the image. In some embodiments, the process 1600 uses any number of different techniques for determining the color of the color cast in the image. Examples of such techniques include techniques based on the gray world hypothesis, techniques based on the gray edge hypothesis, any technique for estimating an illuminant in an image, etc. The process 1600 of some embodiments determines the color of the color cast in the image by (1) using several different techniques that each determine a color of a color cast in the image and (2) selecting the determined color that is the most neutral color (i.e., the color closest to gray) as the determined color of the color cast in the image.

The process 1600 then determines (at 1660) whether the color of the color cast in the image is greater than a defined threshold amount. In some embodiments, the process 1600 determines that the color of the color cast is greater than a threshold amount by (1) calculating the magnitude of the shortest vector from the color of the color cast in a color space (e.g., a YIQ color space, an RGB color space, etc.) to a luminance axis of the color space (i.e., a vector that is orthogonal to the luminance axis) and (2) comparing the calculated magnitude to the defined threshold amount. When the process 1600 determines that the color cast in the image is not greater than the defined threshold amount, the process 1600 proceeds to 1670 to apply a gray color balance operation to the image.

In some embodiments, when the color cast in the image is not greater than the defined threshold amount, color balancing the image using the gray color balance mode produces a more pleasing result color balancing the image using the temperature and tint mode. In addition, in some such embodiments, color balancing the image using the gray color balance mode does not remove or reduce the color cast from the image to as great an extent as color balancing the image using the temperature and tint mode. As such, the process 1600 applies a gray color balance operation to the image when the color cast in the image is not greater than the defined threshold amount and applies a temperature and tint color balance operation to the image when the color cast in the image is greater than the defined threshold amount.

At 1670, the process 1600 applies a gray color balance operation to the image. In some embodiments, the process 1600 applies the gray color balance operation to the image by (1) automatically determining a color of a color cast in the image in a similar manner as operation 1650 and (2) automatically the colors in the image such that the color cast is removed from or reduced in the image. In instances where the process 1600 transitions to operation 1670 from operation 1660, the process 1600 uses the color of the color cast determined at operation 1650. In some embodiments, the process 1600 performs the process 2200, which is described below by reference to FIG. 22, to apply the gray color balance operation on the image.

When the process 1600 determines that the color cast in the image is greater than the defined threshold amount, the process 1600 applies (at 1680) a temperature and tint color balance operation to the image. To apply a temperature and tint color balance operation to the image, the process 1600 of some embodiments by (1) determining a temperature and/or tint color balance operation for reducing or removing from the image the color cast determined at operation 1650 and (2) applying the temperature and/or tint color balance operation to the image using the equation described above by reference to FIG. 8. Then, the process 1600 ends.

In some embodiments, after the image editing application selects one of the color balance operations (i.e., the skin tone color balance operation, the gray color balance operation, or the temperature and tint color balance operation) and applies the selected color balance operation to the image, the process 1600 also determines an automatic color balance operation for each of the two unselected color balance modes in a similar manner described in FIG. 16. When a user selects another color balance mode of a color balance tool after invoking the auto-color balance feature of the color balance tool, the image editing application applies the corresponding automatically determined color balance operation. This way, the user is able to override the image editing application's automatic selection and view the other color balance modes' automatically determined color balance operations applied to the image.

While the process 1600 in FIG. 16 illustrates automatically selecting a color balance mode to color balance an image based on a set of criteria (i.e., whether the image contains a face, whether the image is a RAW file, and whether the image contains a threshold amount of color cast), one of ordinary skill in the art will realize that any number of additional and/or different criteria may be used to automatically select a color balance mode to color balance the image. For instance, the process of some embodiments may select a color balance mode based on whether skin is detected in the image, whether the image was captured during a particular time during the day, the weather conditions under which the image was captured, the location at which the image was captured, etc.

Figure 17:
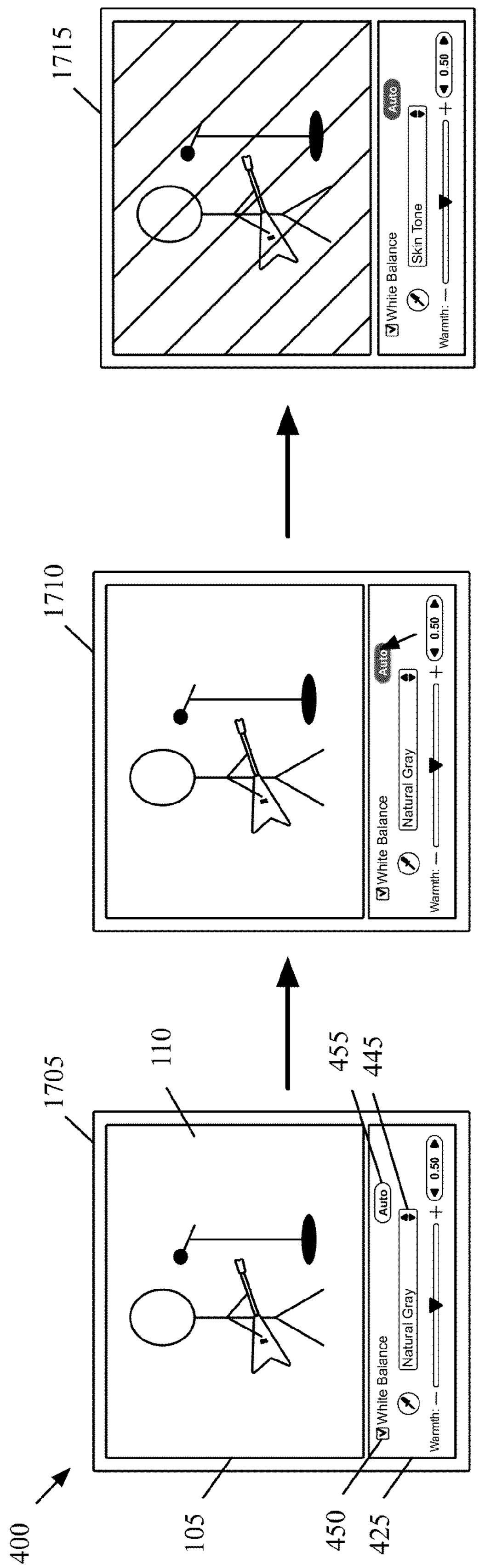
FIG. 17 conceptually illustrates an example automatic color balance of an image according to some embodiments of the invention.

FIG. 17 conceptually illustrates an example automatic color balance of an image according to some embodiments of the invention. Specifically, FIG. 17 illustrates the GUI 400 at three different stages 1705-1715 that show an automatic color balance operation performed on the image 110 with the color balance tool 425.

The first stage 1705 shows the GUI 400 before an automatic color balance operation is invoked for the image 110. As explained above, the image editing application of some embodiments automatically selects a default color balance mode of the color balance tool 425 when the color balance tool 425 is activated (e.g., by selecting the UI item 450). As shown, the imaged editing application has automatically selected the gray color balance mode of the color balance tool 425 as the default color balance mode.

The second stage 1710 of the GUI 400 illustrates that a user is invoking the auto color balance feature of the color balance tool 425. As shown, the user is selecting the selectable UI item 455 using a cursor (e.g., by clicking a mouse button, tapping a touchpad, or touching a touchscreen) in order to invoke the auto color balance feature. When the image editing application of some embodiments receives the selection of the UI item 455, the image editing application performs the process 1600 described above by reference to FIG. 16 and displays a highlighting of the UI item 455.

The third stage 1715 shows the GUI 400 after the image 110 has been automatically color balanced. In this example, the image editing application determined that the image 110 contains a face (i.e., the face of the musician). As such, the imaged editing application (1) automatically selected the skin tone color balance mode of the color balance tool 425 and (2) automatically applied a skin tone color balance operation to the image 110. As shown, diagonal lines are displayed over the image 110 to indicate that the skin tone color balance operation has been applied to the image 110.

Figure 18:
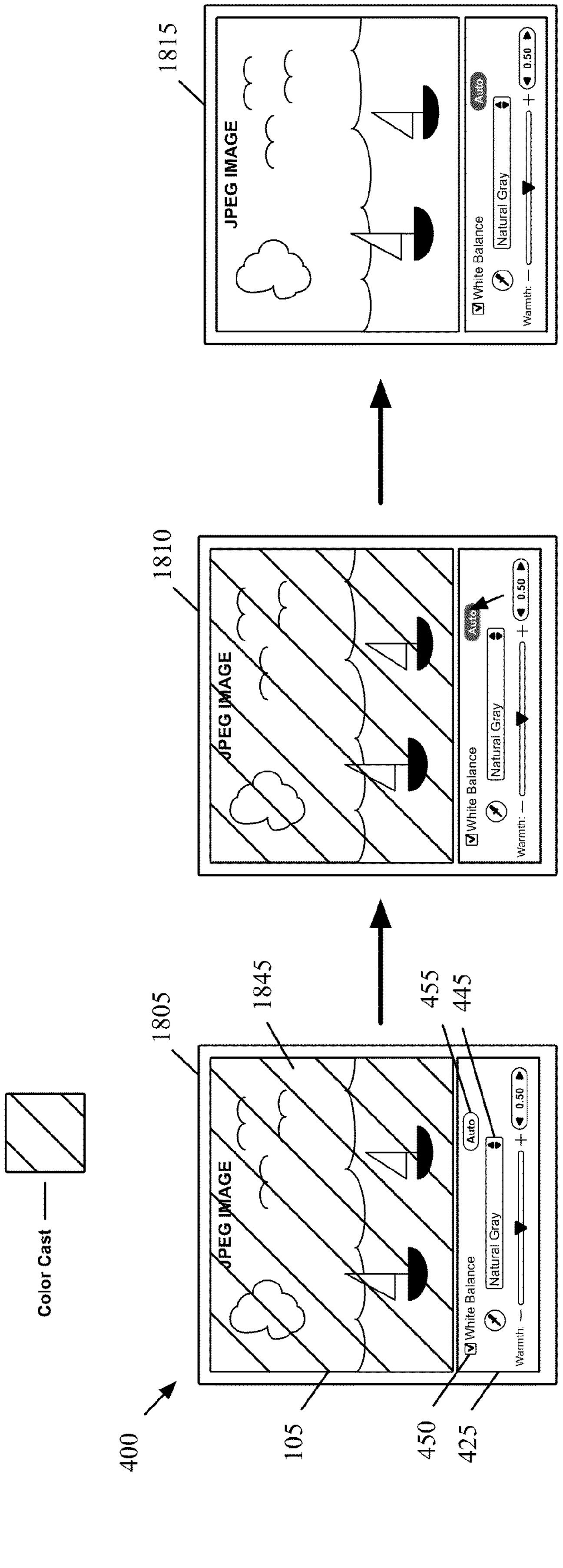
FIG. 18 conceptually illustrates another example automatic color balance of an image according to some embodiments of the invention.

FIG. 18 conceptually illustrates another example automatic color balance of an image according to some embodiments of the invention. In particular, FIG. 18 illustrates the GUI 400 at three different stages 1805-1815 that show an automatic color balance operation performed on an image 1845 with the color balance tool 425.

The first stage 1805 illustrates the GUI 400 before an automatic color balance operation is invoked for the image 1845. The image 1845 is similar to the image 245 described above by reference to FIG. 2. In this example, the image 1845 is formatted in a JPEG format, as indicated in the first stage 1805. In addition, diagonal lines are displayed over the image 1845 to indicate that the image 1845 contains a color cast.

As noted above, the image editing application of some embodiments automatically selects a default color balance mode of the color balance tool 425 when the color balance tool 425 is activated (e.g., by selecting the UI item 450). As shown in the first stage 1805, the imaged editing application has automatically selected the gray color balance mode of the color balance tool 425 as the default color balance mode.

The second stage 1810 of the GUI 400 shows that a user is invoking the auto color balance feature of the color balance tool 425. As shown, the user is selecting the selectable UI item 455 using a cursor (e.g., by clicking a mouse button, tapping a touchpad, or touching a touchscreen) in order to invoke the auto color balance feature. When the image editing application of some embodiments receives the selection of the UI item 455, the image editing application performs the process 1600 described above by reference to FIG. 16 and displays a highlighting of the UI item 455.

The third stage 1815 illustrates the GUI 400 after the image 1845 has been automatically color balanced. For this example, the image editing application determined that the image 1845 does not contain a face, but the image editing application determined that the image is not formatted according to a RAW file format. For this example, the image editing application selected the gray color balance mode as the default mode of the color balance tool 425. Accordingly, the imaged editing application used the selected gray color balance mode to automatically apply a gray color balance operation to the image 1845 that removes the color cast from the image 1845. In instances where color balance tool 425 is in a different mode (e.g., the skin tone color balance mode or the temperature and tint color balance mode), the imaged editing application would have (1) automatically selected the gray color balance mode of the color balance tool 425 and then (2) applied a gray color balance operation to the image 1845 that removes the color cast from the image 1845. In the third stage 1815, the diagonal lines are no longer displayed over the image 1845 to indicate that the gray color balance operation has been applied to the image 1845 and the color cast in the image 1845 has been removed.

Figure 19:
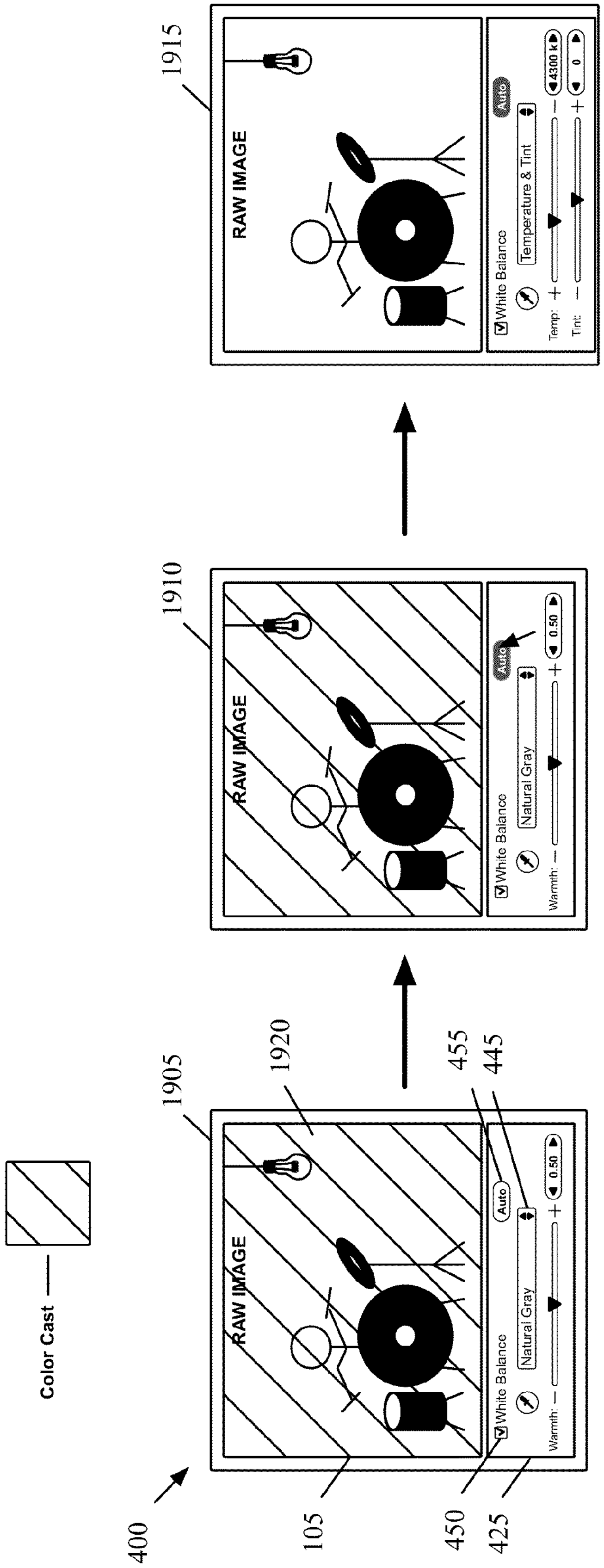
FIG. 19 conceptually illustrates another example automatic color balance of an image according to some embodiments of the invention.

FIG. 19 conceptually illustrates another example automatic color balance of an image according to some embodiments of the invention. Specifically, FIG. 19 illustrates the GUI 400 at three different stages 1905-1915 that show an automatic color balance operation performed on an image 1920 with the color balance tool 425.

The first stage 1905 illustrates the GUI 400 before an automatic color balance operation is invoked for the image 1920. The image 1920 illustrates a drummer playing the drums with an incandescent light on, which causes a yellow-like color cast in the image. In this example, the image 1920 is formatted in a RAW format, as indicated in the first stage 1905. Also, diagonal lines are displayed over the image 1920 to indicate that the image 1920 contains the yellow-like color cast.

As mentioned above, the image editing application of some embodiments automatically selects a default color balance mode of the color balance tool 425 when the color balance tool 425 is activated (e.g., by selecting the UI item 450). As shown in the first stage 1905, the imaged editing application has automatically selected the gray color balance mode of the color balance tool 425 as the default color balance mode.

The second stage 1910 of the GUI 400 shows that a user is invoking the auto color balance feature of the color balance tool 425. As shown, the user is selecting the selectable UI item 455 using a cursor (e.g., by clicking a mouse button, tapping a touchpad, or touching a touchscreen) in order to invoke the auto color balance feature. When the image editing application of some embodiments receives the selection of the UI item 455, the image editing application performs the process 1600 described above by reference to FIG. 16 and displays a highlighting of the UI item 455.

The third stage 1915 illustrates the GUI 400 after the image 1920 has been automatically color balanced. For this example, the image editing application determined that the image 1920 does not contain a face, that the image is formatted according to a RAW file format, and that the color of the color cast in the image is greater than a defined threshold. Thus, the imaged editing application (1) automatically selected the temperature and tint color balance mode of the color balance tool 425 and (2) automatically applied a temperature color balance operation to the image 1920 that removed the yellow-like color cast from the image 1920. As shown, the diagonal lines are no longer displayed over the image 1920 to indicate that the temperature color balance operation has been applied to the image 1920 and the color cast in the image 1920 has been removed.

As explained above, in some embodiments, when the color cast in the image is not greater than the defined threshold amount, color balancing the image using the gray color balance mode produces a more pleasing result color balancing the image using the temperature and tint mode. In addition, in some such embodiments, color balancing the image using the gray color balance mode does not remove or reduce the color cast from the image to as great an extent as color balancing the image using the temperature and tint mode.

Figure 20:
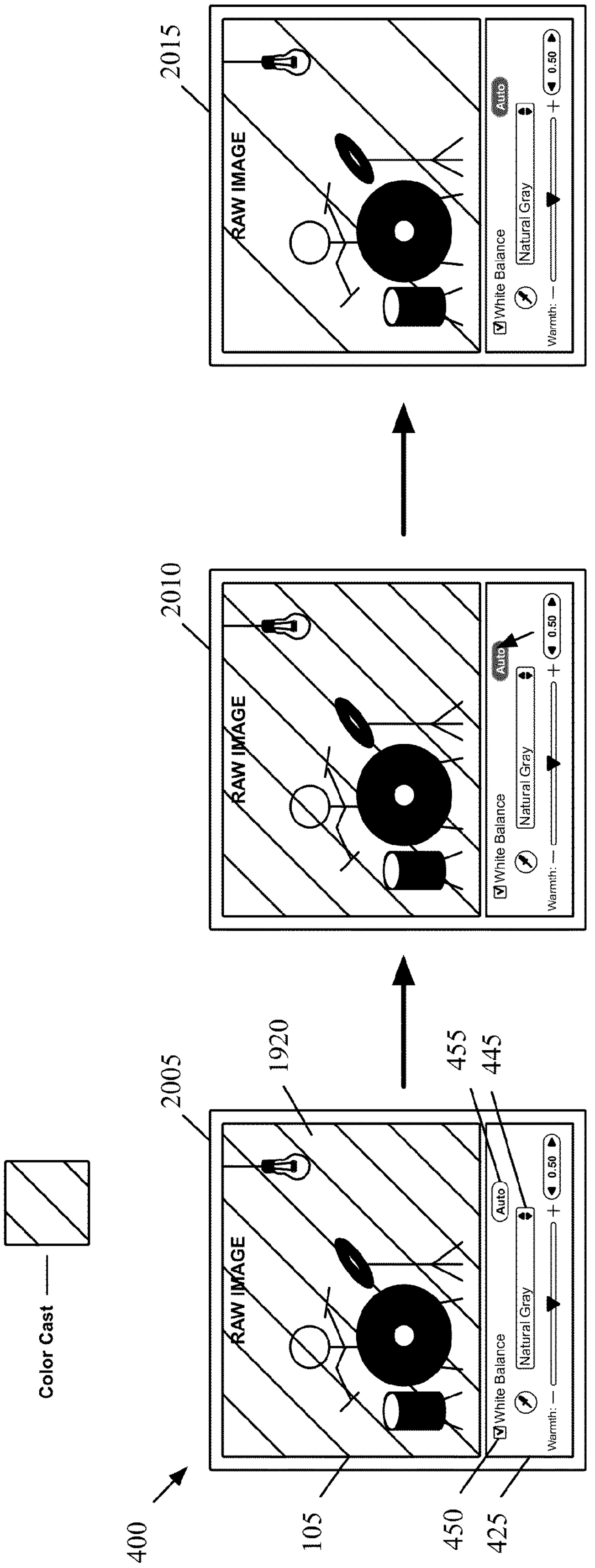
FIG. 20 conceptually illustrates another example automatic color balance of an image according to some embodiments of the invention.

FIG. 20 conceptually illustrates an example of automatically color balancing an image that contains a color cast that is greater than the defined threshold amount. Specifically, FIG. 20 illustrates the GUI 400 at three different stages 2005-2015 that show the image editing application of some embodiments automatically selecting a gray color balance mode of the color balance tool 425 to color balance the image 1920.

As shown, the first and second stage 2005 and 2010 are similar to the first and second stages 1905 and 1910. That is, the first stage 2005 shows the GUI 400 before an automatic color balance operation is invoked for the image 1920 and the gray color balance mode selected as the default mode of the color balance tool 425. The second stage 2010 of the GUI 400 illustrates that a user is invoking the auto color balance feature of the color balance tool 425.

The third stage 2015 illustrates the GUI 400 after the image 1920 has been automatically color balanced. In this example, the image editing application of some embodiments (1) automatically selected the gray color balance mode of the color balance tool 425 and (2) automatically applied a gray color balance operation to the image 1920 that reduced, but did not remove, the yellow-like color cast from the image 1920. As shown, fewer diagonal lines are displayed over the image 1920 to indicate that the gray color balance operation has been applied to the image 1920 but the color cast in the image 1920 has been reduced, but not removed.

Figure 21:
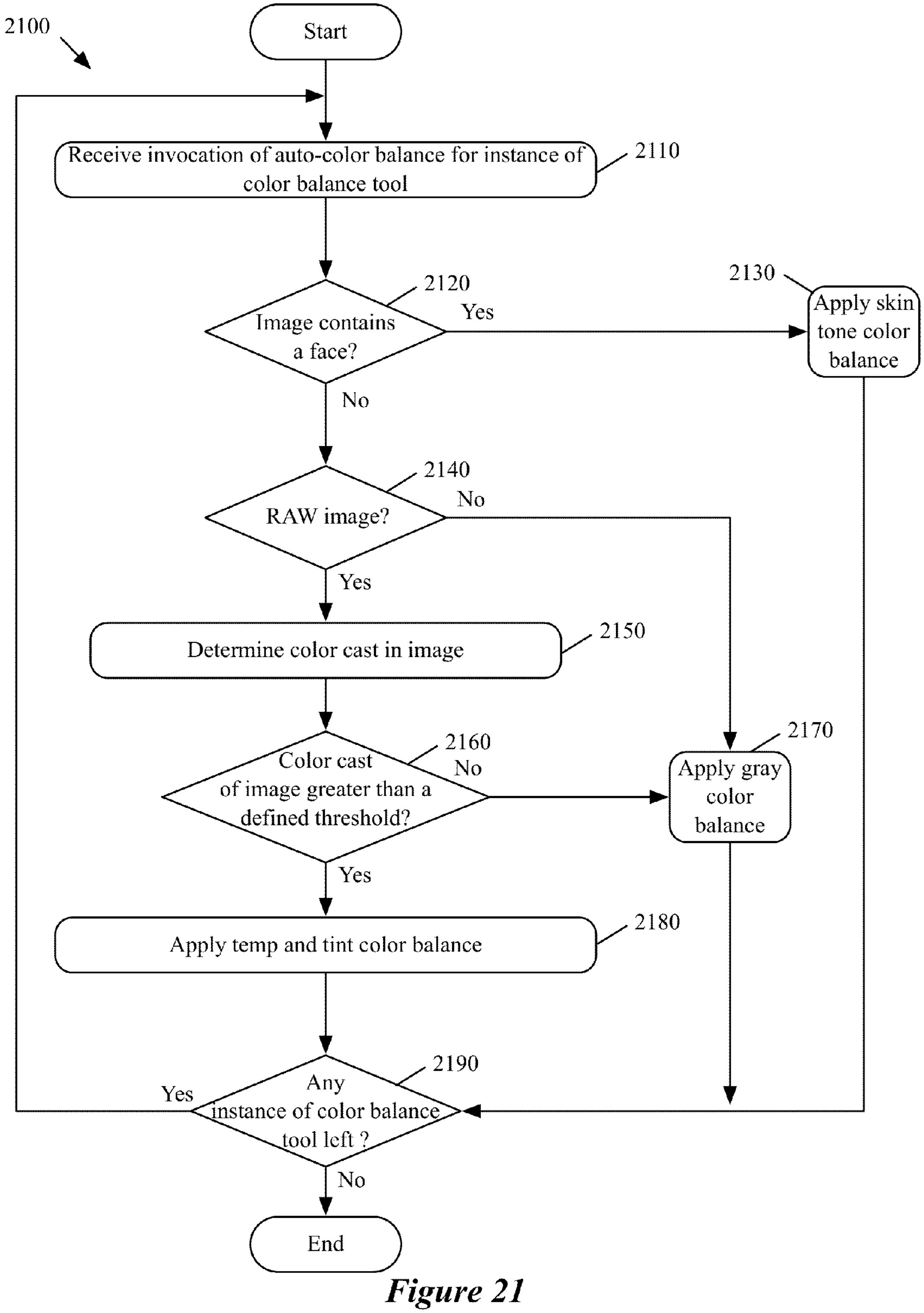
FIG. 21 conceptually illustrates a process of some embodiments for automatically applying color balance operations to an image using different instances of a color balance tool.

FIG. 21 conceptually illustrates a process 2100 of some embodiments for automatically applying color balance operations to an image using different instances of a color balance tool. The image editing application of some embodiments that allows a user to create multiple instances of a multi-mode color balance tool, such as the color balance tools described above by reference to FIGS. 4-13, performs the process 2100 when at least one instance of the color balance tool is activated.

Operations 2110-2180 are similar to operations 1605-1680 described above by reference to FIG. 16 except the process 2100 performs the operations 2110-2180 each time the process 2100 receives an invocation of the auto-color balance feature of an instance of a color balance tool. In addition, each of the operations 2130, 2170, and 2180 proceeds to 2190.

At 2190, the process 2100 determines whether any instance of the color balance tool is left to process. When the process 2100 determines that there is an instance of the color balance tool is left to process, the process 1300 returns to 2110 when the process 1300 receives an invocation of the auto-color balance feature of another instance of the color balance tool. Otherwise, the process 1300 ends.

The process illustrated in FIG. 21 shows the manual invocation of the auto-color balance feature of multiple instances of a color balance tool. In some embodiments, when the process 1300 processes the first invocation of the auto-color balance feature of an instance of the color balance tool, the process 1300 automatically auto-color balances the remaining instances of the color balance tool.

While the process 2100 in FIG. 21 illustrates automatically selecting a color balance mode to color balance an image based on a set of criteria (i.e., whether the image contains a face, whether the image is a RAW file, and whether the image contains a threshold amount of color cast), one of ordinary skill in the art will realize that any number of additional and/or different criteria may be used to automatically select a color balance mode to color balance the image. For instance, the process of some embodiments may select a color balance mode based on whether skin is detected in the image, whether the image was captured during a particular time during the day, the weather conditions under which the image was captured, the location at which the image was captured, etc.

III. Natural Gray Color Balance

Several of the figures described above illustrate a gray color balance mode of a color balance tool that is used to apply a gray color balance operation to an image. In some embodiments, the image editing application uses a gray color balance operation that color balances colors in the image based on the luminance of the colors. Such a gray color balance is referred to as a natural gray color balance.

Figure 22:
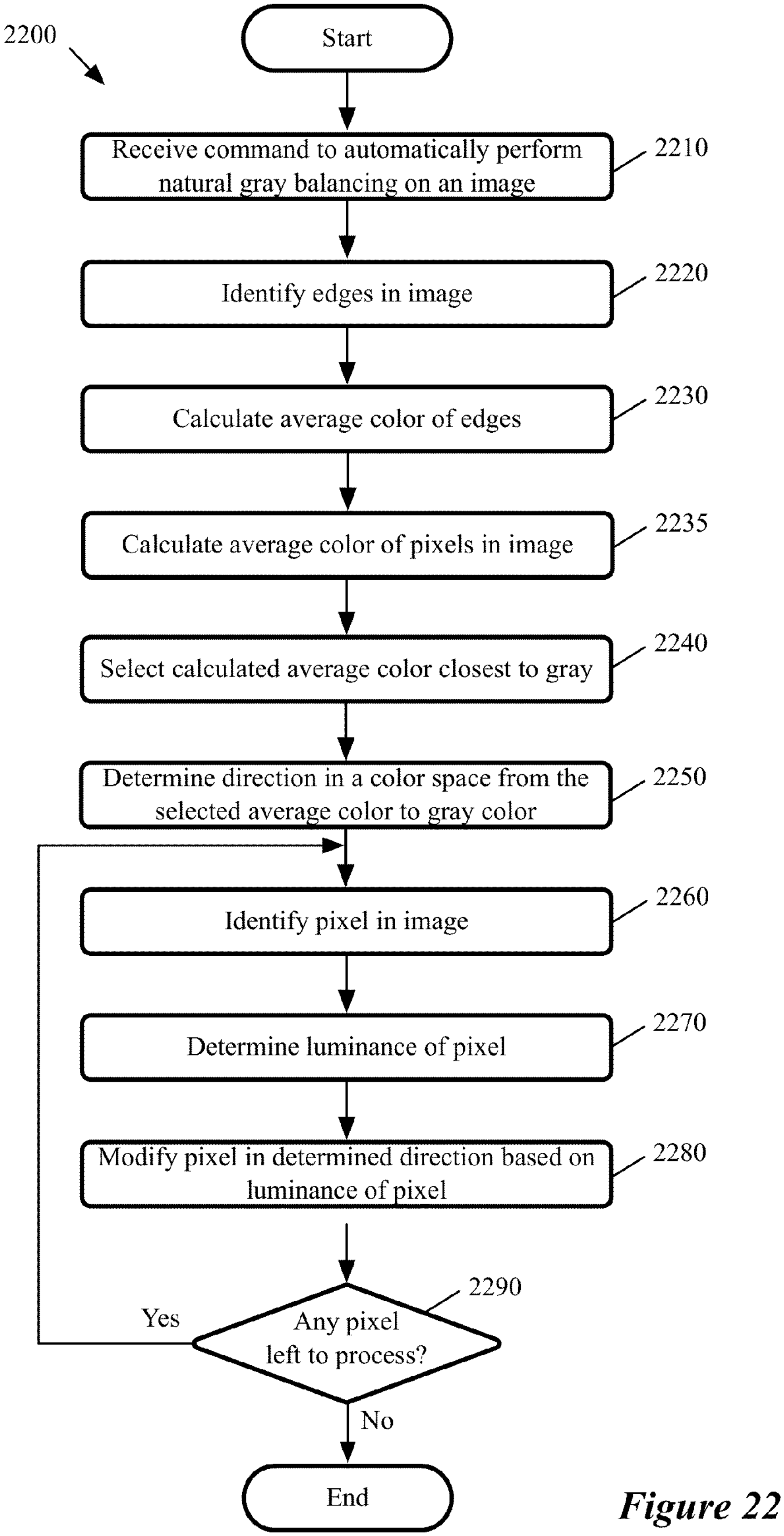
FIG. 22 conceptually illustrates a process of some embodiments for performing a gray color balance operation on an image.

FIG. 22 conceptually illustrates a process 2200 of some embodiments for performing a gray color balance operation on an image. In some embodiments, an image editing application that provides a color balance tool that includes a gray color balance mode (e.g., the color balance tools described above by reference to FIGS. 4-13) performs the process 2200 to apply a gray color balance operation to the image. The image editing application of some such embodiments performs the process 2200 to apply a gray color balance operation to an image at 1670 of the process 1600 described above by reference to FIG. 16.

Figure 23:
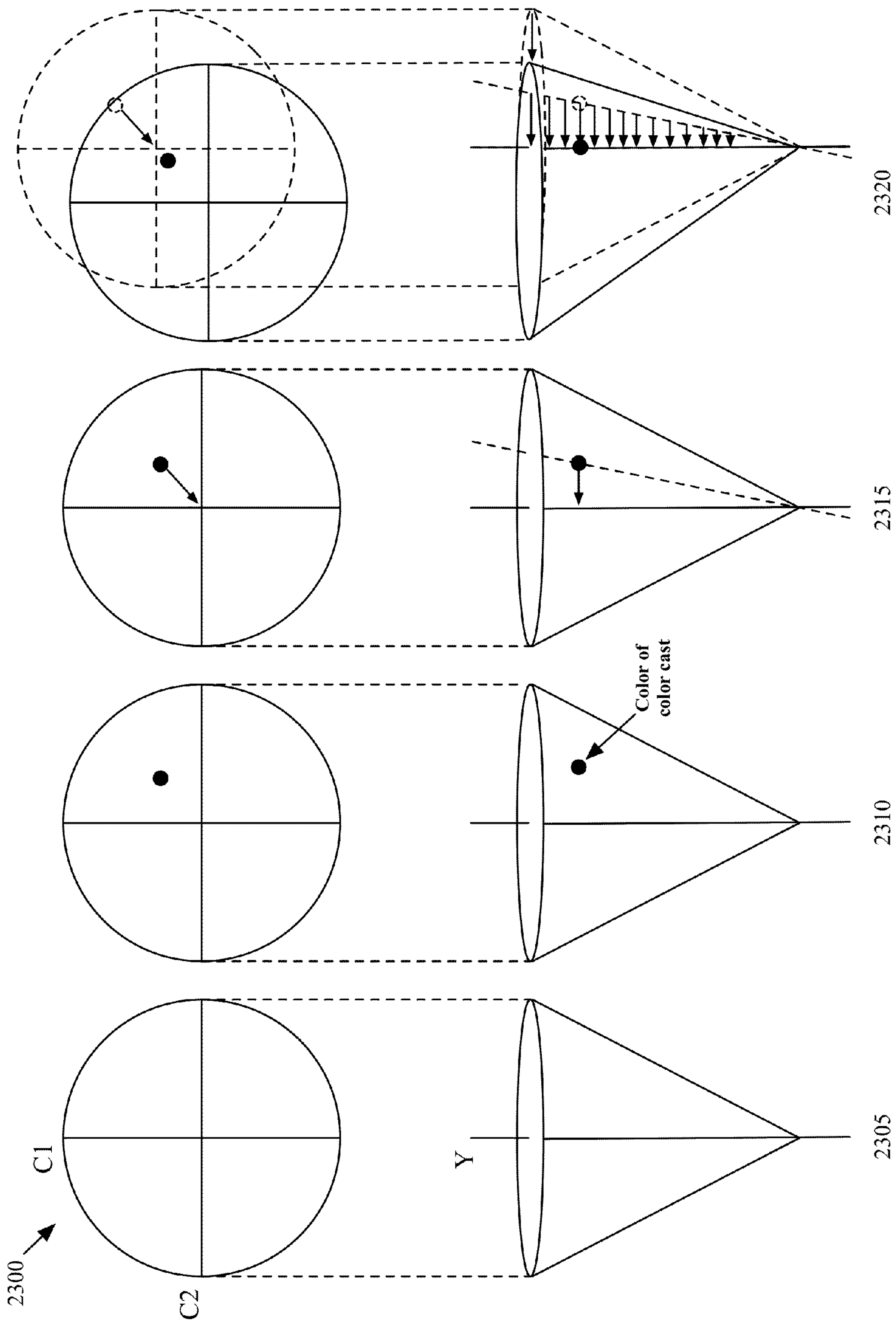
FIG. 23 conceptually illustrates color space representations of an image in an example gray color balance operation.

The process 2200 will be described by reference to FIG. 23, which conceptually illustrates color space representations of an image in a gray color balance operation. In particular, FIG. 23 illustrates a color space 2300 at four different stages 2305-2320 of an example natural gray color balance operation. The first stage 2305 illustrates a conceptual representation of color values (e.g., pixel values) of an image in the color space 2300 in which the image editing application of some embodiments performs natural gray color balance operations. As shown, the color space 2300 includes a luminance component (i.e., axis Y) and two chrominance components C1 and C2. The lower portion of the depicted color space 2300 shows a side view of the color space 2300 while the top portion shows a top view of the color space 2300. In some embodiments, the color space 2300 is a YIQ-based color space. Other types of luminance and dual-chrominance color spaces (e.g., YCbCr, YUV, etc.) may be used as the color space 2300 in other embodiments.

The process 2200 begins by receiving (at 2210) a command to automatically perform a natural gray color balance operation on the image. In some embodiments, the process 2200 receives the command through a selection of a UI item (e.g., a selectable UI item in the list 430). Additional and/or other methods of receiving the command are possible. For instance, the process 2200 of some embodiments receives the command through another process (e.g., the process 1600), a hotkey, a keystroke, a series of keystrokes, a combination of keystrokes, an option selected from a pop-up menu or pull-down menu, or any other appropriate method to receive the command.

Next, the process 2200 identifies (at 2220) edges in the image. The process 2200 of some embodiments uses any number of different edge detection techniques to identify edges in the image. Examples of edge detection techniques include Canny edge detection, search-based edge detection, zero-crossing based edge detection, phase congruency-based edge detection, a combination of different techniques, etc.

The process 2200 then calculates (at 2230) the average color of the identified edges. In some embodiments, the process 2200 converts the color values of the pixels in the identified edges to a defined color space (e.g., an RGB color space, a YIQ color space, etc.) before averaging the color values.

After calculating the average color of the identified edges, the process 2200 calculates (at 2235) the average color of pixels in the image. The process 2200 of some embodiments calculates the average color of all the pixels in the image while the process 2200 of other embodiments calculates the average color of a portion of the pixels in the image (e.g., X number of pixels with the highest luminance values, X number of pixels with the lowest luminance values, X number of pixels with the highest saturation, X number of pixels within a range of hue values, etc.).

Next, the process 2200 selects (at 2240) the calculated average color that is closest to a gray color (i.e., the calculated average color that is more neutral). In some embodiments, the process 2200 selects one of the calculated average colors by (1) calculating for each average color the magnitude of a vector from the color of the average color in a color space (e.g., a YIQ color space, an RGB color space, etc.) to a luminance axis of the color space (i.e., a vector that is orthogonal to the luminance axis) and (2) selecting average color with the lower magnitude vector.

The process 2200 then determines (at 2250) a direction in a color space (e.g., YCC color space, YIQ color space, YCbCr color space, etc.) from the color of the selected average color in the color space to a gray color in the color space. In some embodiments, the process 2200 determines the direction by identifying a vector that is orthogonal to the luminance axis in the color space and that starts from the color of the selected average color in the color space and ends at the luminance axis.

Referring to FIG. 23, the second stage 2310 of the color space 2300 illustrates a point in the color space 2300 that represents a color of a color cast in an image. The third stage 2315 of the color space 2300 illustrates a vector from the point to the luminance axis that is orthogonal to the luminance axis.

Next, the process 2200 identifies (at 2260) a pixel in the image to modify. Once a pixel in the image is identified, the process 2200 determines (at 2270) the luminance value of the pixel. The process 2200 of some embodiments determines the luminance value of the pixel by converting the pixel's values to a luminance and dual-chrominance color space and identifying the values of the pixel's luminance component in the color space.

The process 2200 then modifies (at 2280) the color values that represent the pixel in the color space in the determined direction in the color space based on the luminance value of the pixel. For example, in some embodiments, the process 2200 modifies pixels with high luminance component values a large amount in the determined direction in the color space and modifies pixels with low luminance component values a small amount in the determined direction in the color space. That is, the process 2200 modifies dark pixels (e.g., shadows and darks) in the image less than medium pixels (e.g., midtones) and modifies medium pixels less than bright pixels (e.g., highlights).

Referring to FIG. 23, the fourth stage 2320 of the color space 2300 illustrates modifying (e.g., shifting) pixel values in the direction of the vector illustrated in the third stage 2315 based on the luminance of the pixel values. As shown in the fourth stage 2320, pixels with low luminance values (e.g., pixels along the lower portion of the luminance axis) are modified less and pixels with high luminance values (e.g., pixels along the upper portion of the luminance axis) are modified more.

Finally, the process 2200 determines (at 2290) whether any pixel in the image is left to process. When the process 2200 determines that there is a pixel in the image left to process, the process 2200 returns to 2260 to continue processing any remaining pixels in the image. Otherwise, the process 2200 ends.

While the conceptual representations in FIG. 23 are shown as contiguous cones, one of ordinary skill in the art will realize that the pixel values of an image are actually a set of discrete pixel values that may occupy an arbitrary set of points in a color space. The subtraction of the color of the color cast by the image editing application of some embodiments is performed on each pixel value separately. In some embodiments, the pixel values of a particular pixel are the color values assigned to the pixel in a particular color space (e.g., a luminance value and two chrominance values).

Figure 24:
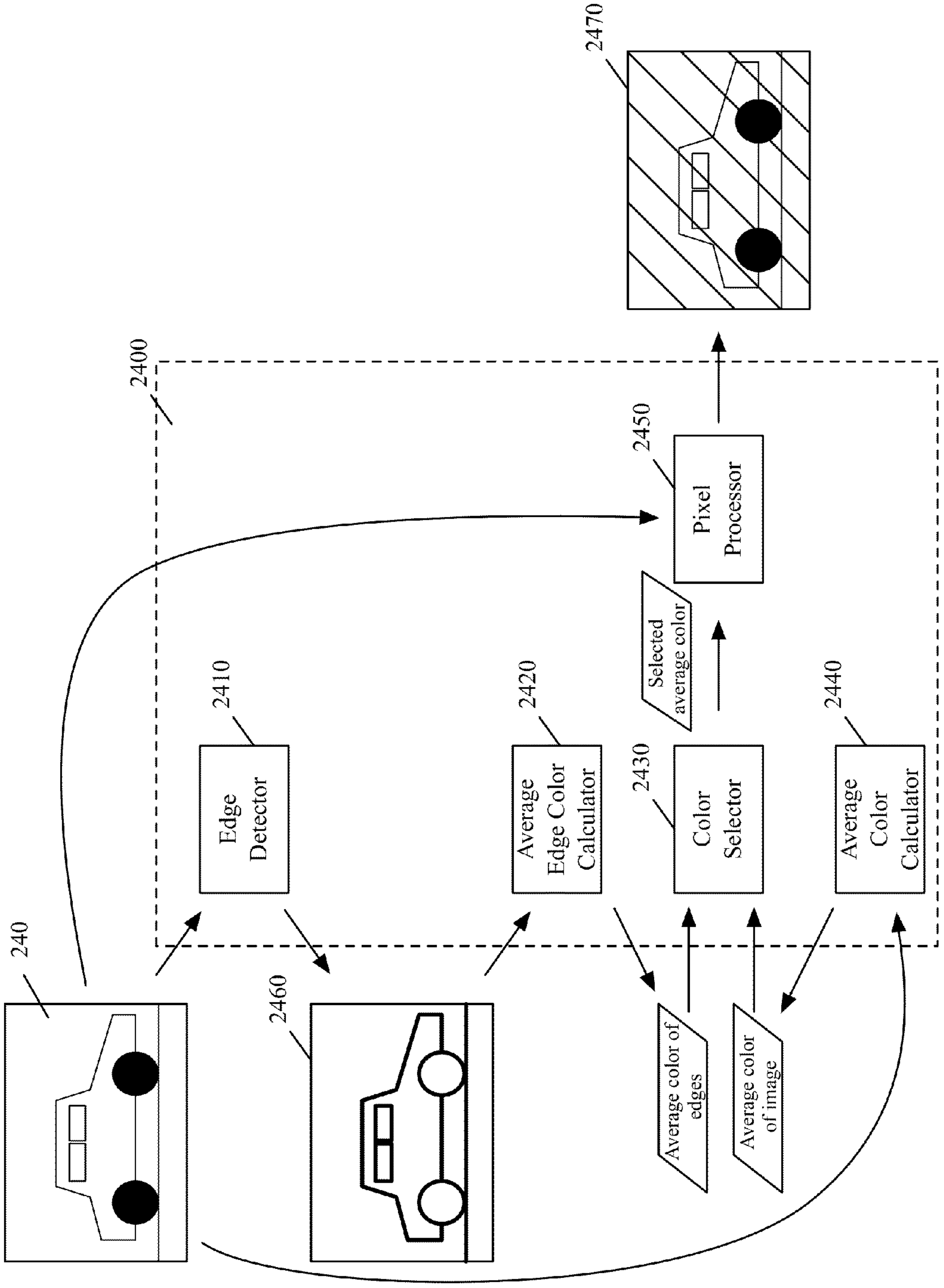
FIG. 24 conceptually illustrates the data flow of an example operation of a software architecture of a gray color balancer of some embodiments.

FIG. 24 conceptually illustrates the data flow of an example operation of a software architecture of a gray color balancer 2400 of some embodiments. In some embodiments, the gray color balancer 2400 performs the process 22 described above by reference to FIG. 24 to perform a gray color balance operation on an image. As shown, the gray color balancer 2400 includes an edge detector 2410, an average edge color calculator 2420, a color selector 2430, an average color calculator 2440, and a pixel processor 2450.

The example operation of the gray color balancer 2400 begins with the edge detector 2410 receiving the image 240 for processing. The edge detector 2410 is responsible for detecting edges in an image. The edge detector 2410 uses any number of different edge detection techniques to identify edges in the image. Examples of edge detection techniques, as mentioned above, include Canny edge detection, search-based edge detection, zero-crossing based edge detection, phase congruency-based edge detection, a combination of different techniques, etc. In this example, the edges of the image 240 detected by the edge detector 2410 are conceptually illustrated in image 2460. As shown, the border of the car, windows, wheels, and road are edges in the image 240 detected by the edge detector 2410.

As shown in FIG. 24, the image 2460 is passed from the edge detector 2410 to the average edge color calculator 2420. Here, the average edge color calculator 2420 calculates the average color of the pixels in the detected edges in the image 2460. In some embodiments, the average edge color calculator 2420 converts the color values of the pixels in the detected edges to a defined color space (e.g., an RGB color space, a YIQ color space, etc.) before averaging the color values. As shown, the averaged edge color calculator 2420 outputs data (e.g., a set of color values) that represents the average color of the detected edges in the image 2460.

Serially, or in parallel with determining the average color of the edges of the image 240, the gray color balancer 2400 calculates the average color of pixels in the image 240. As illustrated in FIG. 24, the average color calculator 2440 receives the image 240 to calculate the average color of pixels in the image 240. In some instances, the average color calculator 2440 of some embodiments calculates the average color of all the pixels in the image 240 while, in other instances, the average color calculator 2440 calculates the average color of a portion of the pixels in the image. As shown, the averaged color calculator 2440 outputs data (e.g., a set of color values) that represents the average color of the image 240.

Once the gray color balancer 2400 determines the average color of detected edges in the image 240 and the average color of pixels in the image 240, the color selector 2430 selects one of the determined average colors. In some embodiments, the color selector 2430 selects the determined average color that is closest to a gray color (i.e., the determined average color that is more neutral). The color selector 2430 of some embodiments selects one of the determined average colors by (1) calculating for each average color the magnitude of a vector from the color of the average color in a color space (e.g., a YIQ color space, an RGB color space, etc.) to a luminance axis of the color space (i.e., a vector that is orthogonal to the luminance axis) and (2) selecting average color with the lower magnitude vector.

The gray color balancer 2400 then passes the selected average color from the color selector 2430 to the pixel processor 2450 to modify pixels in the image 240 based on the selected average color. In some embodiments, the pixel processor 2450 determines a direction in a color space (e.g., YCC color space, YIQ color space, YCbCr color space, etc.) from the color of the selected average color in the color space to a gray color in the color space. To determine the direction, the pixel processor 2450 of some embodiments identifies a vector that is orthogonal to the luminance axis in the color space and that starts from the color of the selected average color in the color space and ends at the luminance axis.

For each pixel in the image 240, the pixel processor 2450 determines the luminance value of the pixel by converting the pixel's values to a luminance and dual-chrominance color space and identifying the values of the pixel's luminance component in the color space. Then, the pixel processor 2450 modifies the color values that represent the pixel in the color space in the determined direction in the color space based on the luminance value of the pixel. For example, in some embodiments, the pixel processor 2450 modifies pixels with high luminance component values a large amount in the determined direction in the color space and modifies pixels with low luminance component values a small amount in the determined direction in the color space.

After processing all the pixels in the image 240, the pixel processor 2450 outputs image 2470, which is a version of the image 240 to which the gray color balance operation has been applied in order removed from or reduced in the image 240 the selected average color. In this example, diagonal lines are displayed over the image 2470 to indicate the gray color balance operation has been applied to the image 2470.

While many of the features have been described as being performed by one module (e.g., the pixel processor 2450, etc.), one of ordinary skill in the art will recognize that the functions described herein might be split up into multiple modules. Similarly, functions described as being performed by multiple different modules might be performed by a single module in some embodiments (e.g., the average edge color calculator 2420 and the average color calculator 2440).

IV. Additional Features

The sections above describe various different examples and embodiments of a color balance tool. In some embodiments, the image editing application provides a color balance tool that includes several different features for color balancing images.

A. Manual Color Balance

Figure 25:
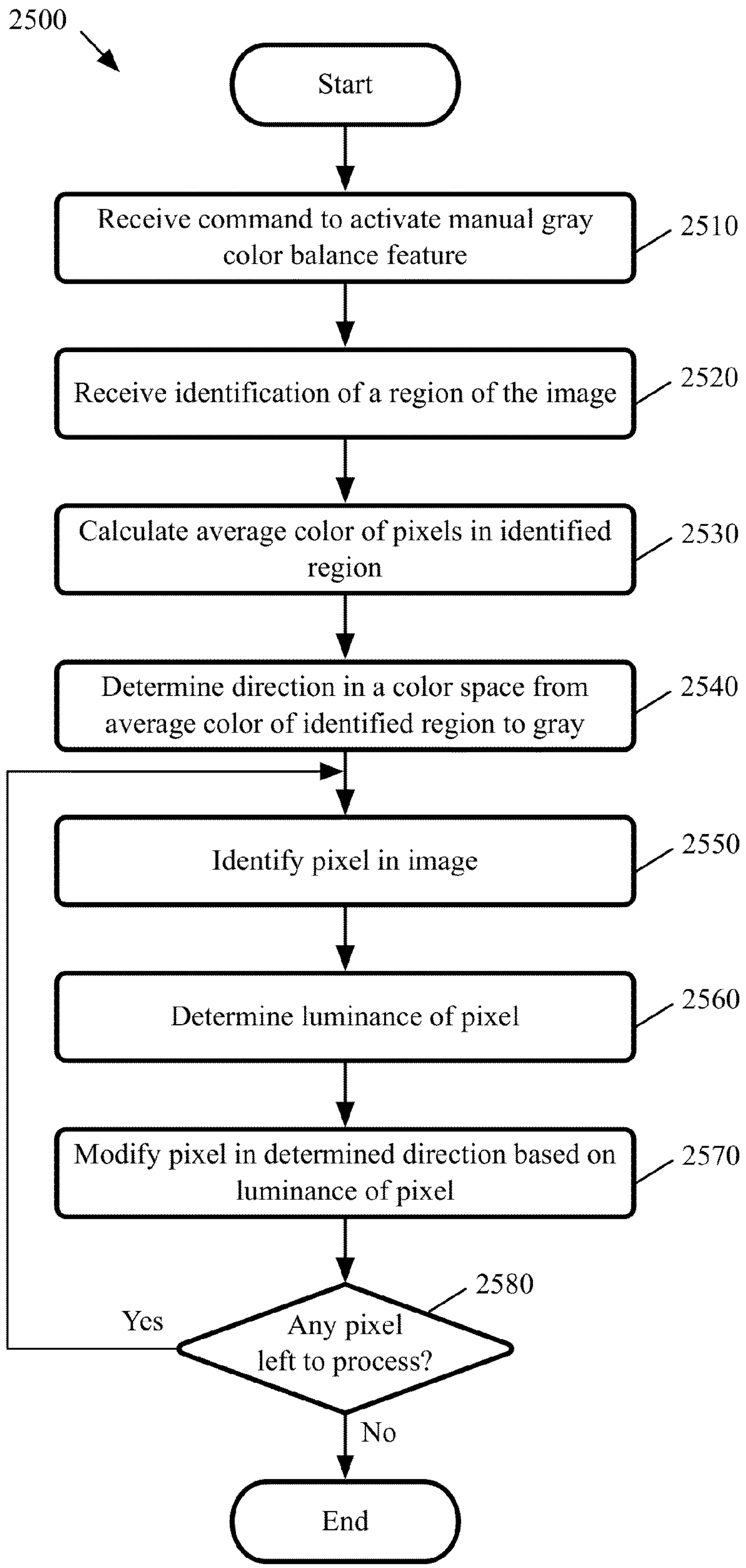
FIG. 25 conceptually illustrates a process of some embodiments for performing a manual gray color balance operation on an image.

FIG. 25 conceptually illustrates a process 2500 of some embodiments for performing a manual gray color balance operation on an image. In some embodiments, an image editing application that provides a color balance tool with a gray color balance mode (e.g., the color balance tool described by reference to FIGS. 3, 6, 9, 11, 12, 17-20, and 26) performs the process 2500.

The process 2500 starts by receiving (at 2510) a command to activate a manual gray color balance feature for color balancing an image. In some embodiments, the process 2500 receives the command through a selection of a UI item (e.g., the selectable UI item 460). Additional and/or other methods of receiving the command are possible. For instance, the process 2500 of some embodiments receives the command through a hotkey, a keystroke, a series of keystrokes, a combination of keystrokes, an option selected from a pop-up menu or pull-down menu, or any other appropriate method to receive the command.

Next, the process 2500 receives (at 2520) an identification of a region of the image. The process 2500 of some embodiments receives the identification through a sampling tool (e.g., an eyedropper tool). In some such embodiments, when the process 2500 receives an identification of a location in the image through the sampling tool, the process 2500 identifies a defined number of pixels (e.g., 10 pixels, 15 pixels, 25 pixels, etc.) about the identified location as the identified region of the image. In some embodiments, the process 2500 uses the identified location (e.g., a single pixel) as the identified region of the image.

The process 2500 then calculates (at 2530) the average color of the pixels in the identified region of the image. As such, the average color is derived from the colors of pixels sampled in the image. Thus, in some cases, the determined average color is not a color in the image (i.e., no pixel in the image has color values that match the color of the average color) while, in other cases, the determined average color is a color in the image. In some embodiments, the process 2500 converts the color values of the pixels in the identified region of the image to a defined color space (e.g., an RGB color space, a YIQ color space, etc.) before averaging the color values.

Next, the process 2500 determines (at 2540) a direction in a color space (e.g., YCC color space, YIQ color space, YCbCr color space, etc.) from the color of the calculated average color in the color space to a gray color in the color space. In some embodiments, the process 2500 determines the direction by identifying a vector that is orthogonal to the luminance axis in the color space and that starts from the color of the average color in the color space and ends at the luminance axis.

After determining the direction, the process 2500 identifies (at 2550) a pixel in the image to modify. Once a pixel in the image is identified, the process 2500 determines (at 2560) the luminance value of the pixel. The process 2500 of some embodiments determines the luminance value of the pixel by converting the pixel's values to a luminance and dual-chrominance color space and identifying the values of the pixel's luminance component in the color space.

The process 2500 then modifies (at 2570) the color values that represent the pixel in the color space in the determined direction in the color space based on the luminance value of the pixel. For example, in some embodiments, the process 2500 modifies pixels with high luminance component values a large amount in the determined direction in the color space and modifies pixels with low luminance component values a small amount in the determined direction in the color space. That is, the process 2500 modifies dark pixels (e.g., shadows and darks) in the image less than medium pixels (e.g., midtones) and modifies medium pixels less than bright pixels (e.g., highlights).

Finally, the process 2500 determines (at 2580) whether any pixel in the image is left to process. When the process 2500 determines that there is a pixel in the image left to process, the process 2500 returns to 2550 to continue processing any remaining pixels in the image. Otherwise, the process 2500 ends.

Although FIG. 25 illustrates a process that averages the colors of a set of sampled pixels in an image to determine the color of a color cast in the image, the process of some embodiments uses additional and/or different techniques for determining the color of the color cast in the image. For instance, in some embodiments, the color value of the most colorful pixel (e.g., the pixel with the largest aggregate R, G, and B values, the pixel with the largest saturation value, etc.) in the set of sampled pixels. As another example, the process of some embodiments derives the color of the color cast in the image from at least one pixel in the set of sampled pixels in the image (e.g., interpolating a color value a subset of the sampled pixels, etc.).

Figure 26:
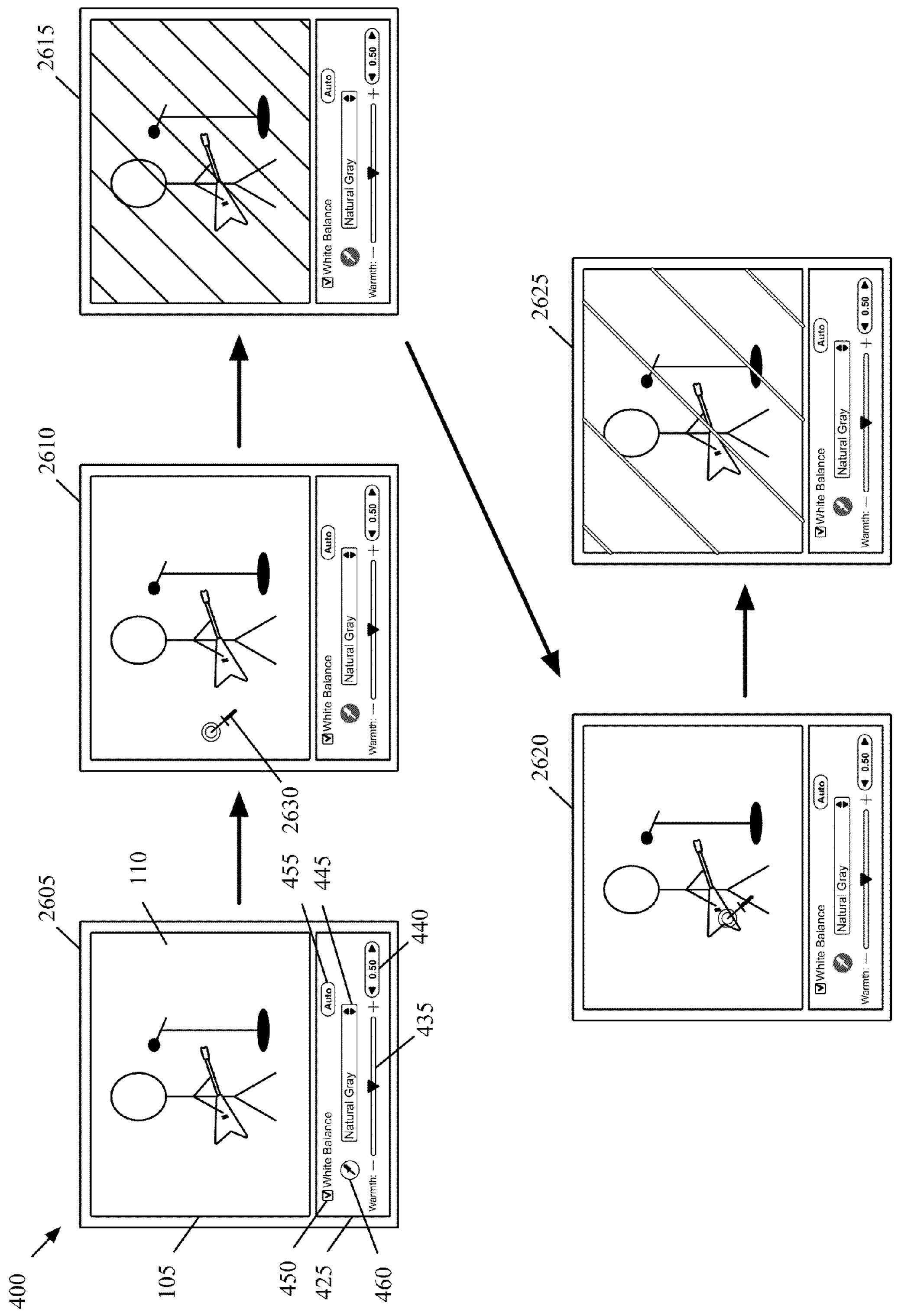
FIG. 26 conceptually illustrates a manual feature of a gray color balance mode of a color balance tool of some embodiments.

FIG. 26 conceptually illustrates a manual feature of a gray color balance mode of a color balance tool of some embodiments. Specifically, FIG. 26 illustrates the GUI 400 at five different stages 2605-2625 that show example manual gray color balance operations applied to the image 110.

The first stage 2605 illustrates the GUI 400 before a manual gray color balance feature is activated. As described above, the image editing application of some embodiments automatically selects a default color balance mode of the color balance tool 425 when the color balance tool 425 is activated (e.g., by selecting the UI item 450). As shown, the imaged editing application has automatically selected the gray color balance mode of the color balance tool 425 as the default color balance mode.

The second stage 2610 of the GUI 400 illustrates that a user has activated the manual gray color balance feature of the color balance tool 425's gray color balance mode. In this example, the user has selected the selectable UI item 460 using a cursor (e.g., by clicking a mouse button, tapping a touchpad, or touching a touchscreen) in order to activate the manual gray color balance feature. In some embodiments, when the image editing application receives the selection of the UI item 460, the image editing application performs the process 2500 described above by reference to FIG. 25 and displays a highlighting of the UI item 460.

As shown in the second stage 2610, the user is selecting a region of the image 110 using a sampling tool 2630 (e.g., by clicking a mouse button, tapping a touchpad, or touching a touchscreen) in order to perform a manual gray color balance operation on the image 110 based on the selected region. In this example, the user is selecting the region of the image 110 to the right of the musician, which the user wants to be gray. When the image editing application receives the selection of the region of the image 110, the image editing application performs a manual gray color balance operation on the image 110 based on the selected region of the image 110.

The third stage 2615 illustrates the GUI 400 after a manual gray color balance operation has been applied to the image 110. As noted above, in some embodiments, the image editing application performs the process 2500 in order to apply a manual gray color balance operation to the image 110. As shown, diagonal lines are displayed over the image 110 to indicate that the manual gray color balance operation has been applied to the image 110.

The fourth stage 2620 of the GUI 400 shows that the user is selecting a different region of the image 110 using the sampling tool 2630 (e.g., by clicking a mouse button, tapping a touchpad, or touching a touchscreen) in order to perform a different manual gray color balance operation on the image 110 based on the different selected region. In this example, the user is selecting the musician's guitar as the region that the user wants to be gray. When the image editing application receives the selection of the region of the image 110, the image editing application performs a different manual gray color balance operation on the image 110 based on the different selected region of the image 110.

The fifth stage 2615 illustrates the GUI 400 after a different manual gray color balance operation has been applied to the image 110. As noted above, in some embodiments, the image editing application performs the process 2500 in order to apply a manual gray color balance operation to the image 110. As shown, hollow diagonal lines are displayed over the image 110 to indicate that the different manual gray color balance operation has been applied to the image 110.

The above-described FIGS. 25 and 26 illustrate a manual feature for a gray color balance mode of a color balance tool of some embodiments. Alternatively, or in conjunction with a manual feature for a gray color balance mode, the image editing application of some embodiments provides a color balance tool with a manual feature for a skin tone color balance mode.

Figure 27:
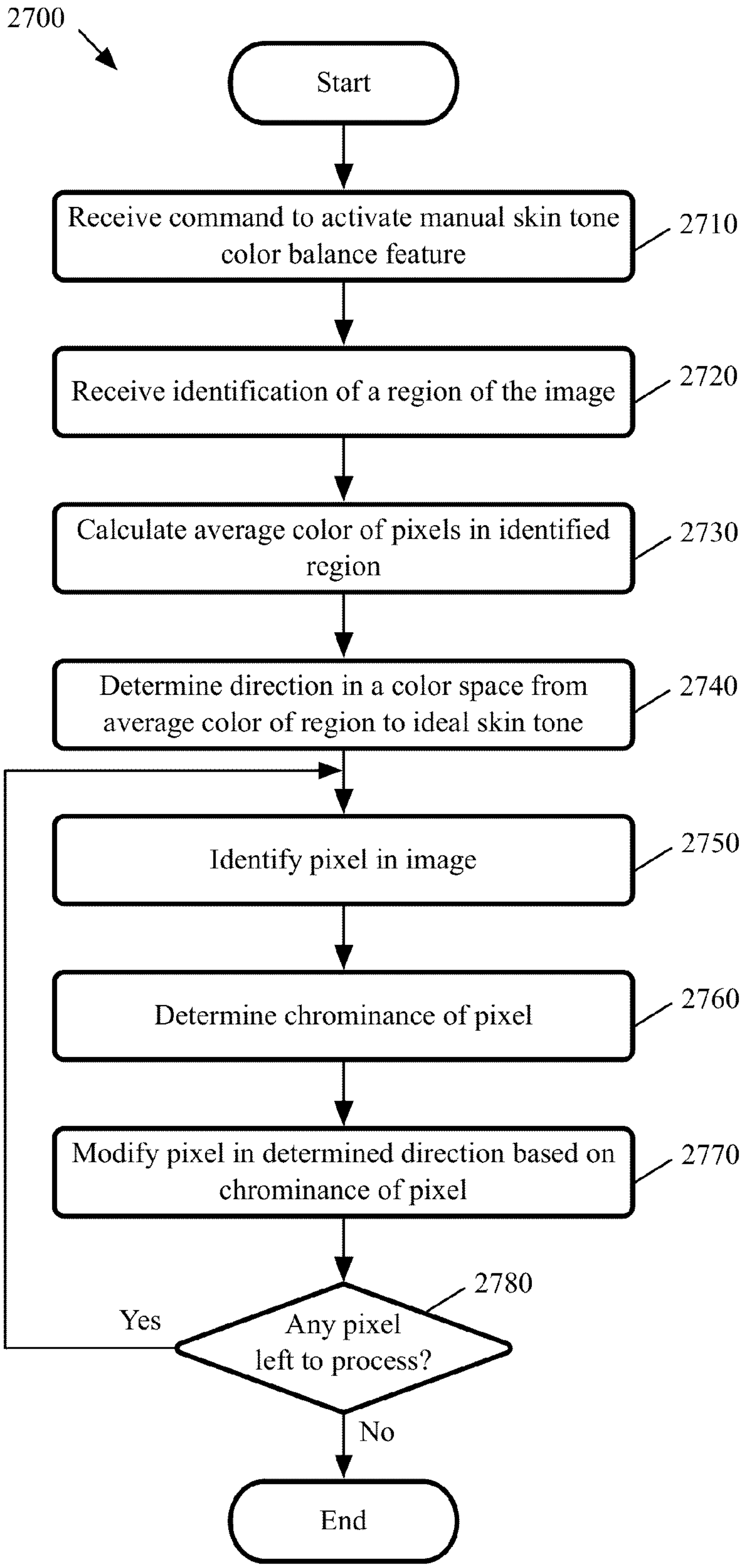
FIG. 27 conceptually illustrates a process of some embodiments for performing a manual skin tone color balance operation on an image.

FIG. 27 conceptually illustrates a process 2700 of some embodiments for performing a manual skin tone color balance operation on an image. In some embodiments, an image editing application that provides a color balance tool with a skin tone color balance mode (e.g., the color balance tool described by reference to FIGS. 4, 9, 11, 12, 17, 28, and 30) performs the process 2700.

The process 2700 begins by receiving (at 2710) a command to activate a manual skin tone color balance feature for color balancing an image. The process 2700 of some embodiments receives the command through a selection of a UI item (e.g., the selectable UI item 460). Additional and/or other methods of receiving the command are possible. For instance, in some embodiments, the process 2700 receives the command through a hotkey, a keystroke, a series of keystrokes, a combination of keystrokes, an option selected from a pop-up menu or pull-down menu, or any other appropriate method to receive the command.

Next, the process 2700 receives (at 2720) an identification of a region of the image. The process 2700 of some embodiments receives the identification through a sampling tool (e.g., an eyedropper tool). In some such embodiments, when the process 2700 receives an identification of a location in the image through the sampling tool, the process 2700 identifies a defined number of pixels (e.g., 10 pixels, 15 pixels, 25 pixels, etc.) about the identified location as the identified region of the image. In some embodiments, the process 2700 uses the identified location (e.g., a single pixel) as the identified region of the image.

The process 2700 then calculates (at 2730) the average color of the pixels in the identified region of the image. As such, the average color is derived from the colors of pixels sampled in the image. Thus, in some cases, the determined average color is not a color in the image (i.e., no pixel in the image has color values that match the color of the average color) while, in other cases, the determined average color is a color in the image. In some embodiments, the process 2700 converts the color values of the pixels in the identified region of the image to a defined color space (e.g., an RGB color space, a YIQ color space, etc.) before averaging the color values.

Next, the process 2700 determines (at 2740) a direction in a color space (e.g., YCC color space, YIQ color space, YCbCr color space, etc.) from the color of the calculated average color in the color space to an ideal skin tone color in the color space. In some embodiments, the ideal skin tone is defined as a static set of color values in the color space that represents the ideal skin tone. The ideal skin tone of some embodiments is a dynamic set of color values determined based on the determined color of the detected face in the image. In some embodiments, the process 2700 determines the direction by identifying a vector that is orthogonal to the luminance axis in the color space and that starts from the color of the average color in the color space and ends at the luminance axis.

After determining the direction, the process 2700 identifies (at 2750) a pixel in the image to modify. Once a pixel in the image is identified, the process 2700 determines (at 2760) the chrominance values of the pixel. The process 2700 of some embodiments determines the chrominance value of the pixel by converting the pixel's values to a luminance and dual-chrominance color space and identifying the values of the pixel's chrominance components in the color space.

The process 2700 then modifies (at 2770) the color values that represent the pixel in the color space in the determined direction in the color space based on the chrominance values of the pixel. For example, in some embodiments, the process 2700 modifies pixels with high chrominance values a large amount in the determined direction in the color space and modifies pixels with low chrominance values a small amount in the determined direction in the color space. That is, the process 2700 modifies high-saturated pixels (e.g., colorful pixels) in the image more than low-saturated pixels (e.g., neutral pixels).

Finally, the process 2700 determines (at 2780) whether any pixel in the image is left to process. When the process 2700 determines that there is a pixel in the image left to process, the process 2700 returns to 2750 to continue processing any remaining pixels in the image. Otherwise, the process 2700 ends.

Although FIG. 27 illustrates a process that averages the colors of a set of sampled pixels in an image to determine the color of a color cast in the image, the process of some embodiments uses additional and/or different techniques for determining the color of the color cast in the image. For instance, in some embodiments, the color value of the most colorful pixel (e.g., the pixel with the largest aggregate R, G, and B values, the pixel with the largest saturation value, etc.) in the set of sampled pixels. As another example, the process of some embodiments derives the color of the color cast in the image from at least one pixel in the set of sampled pixels in the image (e.g., interpolating a color value a subset of the sampled pixels, etc.).

Figure 28:
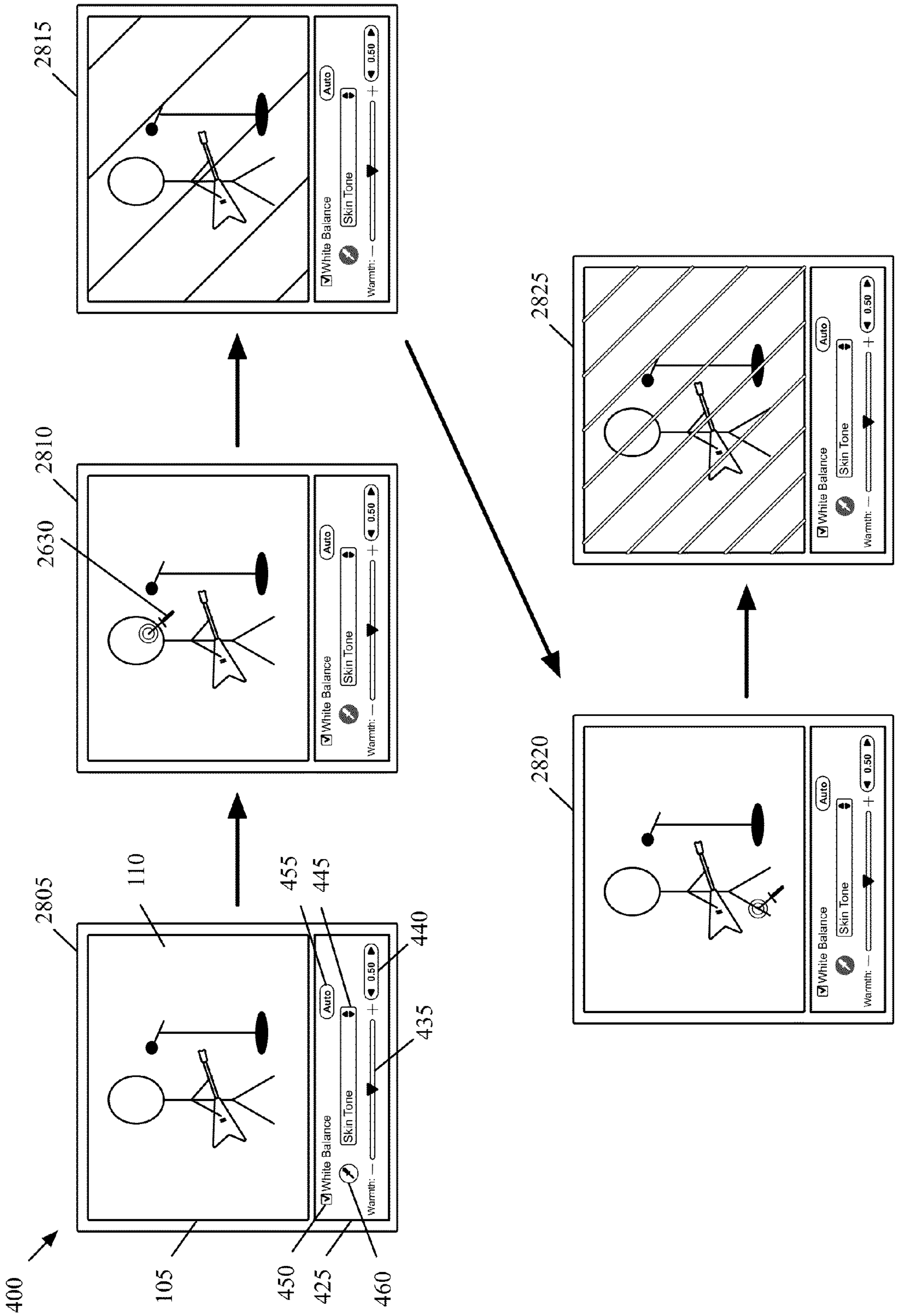
FIG. 28 conceptually illustrates a manual feature of a skin tone color balance mode of a color balance tool of some embodiments.

FIG. 28 conceptually illustrates a manual feature of a skin tone color balance mode of a color balance tool of some embodiments. In particular, FIG. 28 illustrates the GUI 400 at five different stages 2805-2825 that show example manual skin tone color balance operations applied to the image 110.

The first stage 2805 illustrates the GUI 400 before a manual skin tone color balance feature is activated. As described above, the image editing application of some embodiments automatically selects a default color balance mode of the color balance tool 425 when the color balance tool 425 is activated (e.g., by selecting the UI item 450). As shown, the imaged editing application has automatically selected the skin tone color balance mode of the color balance tool 425 as the default color balance mode.

The second stage 2810 of the GUI 400 illustrates that a user has activated the manual skin tone color balance feature of the color balance tool 425's skin tone color balance mode. In this example, the user has selected the selectable UI item 460 using a cursor (e.g., by clicking a mouse button, tapping a touchpad, or touching a touchscreen) in order to activate the manual skin tone color balance feature. In some embodiments, when the image editing application receives the selection of the UI item 460, the image editing application performs the process 2700 described above by reference to FIG. 27 and displays a highlighting of the UI item 460.

As shown in the second stage 2810, the user is selecting a region of the image 110 using the sampling tool 2630 (e.g., by clicking a mouse button, tapping a touchpad, or touching a touchscreen) in order to perform a manual skin tone color balance operation on the image 110 based on the selected region. In this example, the user is selecting the musician's face as a region in the image 110 that the user wants to be considered as skin. When the image editing application receives the selection of the region of the image 110, the image editing application performs a manual skin tone color balance operation on the image 110 based on the selected region of the image 110.

The third stage 2815 illustrates the GUI 400 after a manual skin tone color balance operation has been applied to the image 110. As mentioned above, in some embodiments, the image editing application performs the process 2700 in order to apply a manual skin tone color balance operation to the image 110. As shown, diagonal lines are displayed over the image 110 to indicate that the manual skin tone color balance operation has been applied to the image 110.

The fourth stage 2820 of the GUI 400 shows that the user is selecting a different region of the image 110 using the sampling tool 2830 (e.g., by clicking a mouse button, tapping a touchpad, or touching a touchscreen) in order to perform a different manual skin tone color balance operation on the image 110 based on the different selected region. In this example, the user is selecting the musician's leg as a region in the image 110 that the user wants to be considered as skin. When the image editing application receives the selection of the region of the image 110, the image editing application performs a different manual skin tone color balance operation on the image 110 based on the different selected region of the image 110.

The fifth stage 2815 illustrates the GUI 400 after a different manual skin tone color balance operation has been applied to the image 110. As noted above, in some embodiments, the image editing application performs the process 2700 in order to apply a manual skin tone color balance operation to the image 110. As shown, hollow diagonal lines are displayed over the image 110 to indicate that the different manual skin tone color balance operation has been applied to the image 110.

The above-described FIGS. 25-28 show manual color balance features for several color balance modes of a color balance tool. In some embodiments, the manual color balance feature is provided for each of the color balance modes of the color balance tool. Additionally, in some embodiments, the state of the manual color balance persists across the color balance modes. For example, when the user activates the manual color balance feature for one of the color balance modes and then switches to another color balance mode of the color balance tool, the image editing application removes the previous color balance mode's color balance operation and automatically applies uses the newly selected color balance mode to apply a color balance operation to the image based on the set of pixels sampled for the previous color balance mode. In this manner, the user can view the different effects of different color balance modes applied to the image using the same sampled set of pixels.

Furthermore, FIGS. 26 and 28 illustrate an eyedropper tool that is used to select a region of an image for a manual color balance operation. However, one of ordinary skill in the art will understand that the figures show just one technique for selecting a region of an image and that additional and/or other techniques may be used in other embodiments. For instance, the color balance tool of some embodiments provides a sampling tool that allows a user to draw a shape (e.g., a box, a circle, etc.) of a region in the image that is used for a manual color balance operation.

B. Local Color Balance

Another feature of a color balance tool provided by the image editing application of some embodiments is a local color balance feature. In some embodiments, the local color balance feature allows a user to specify various regions of an image to apply a color balance operation using a color balance mode of the color balance tool. This way, the user may control the areas of the image to which a color balance operation is applied.

Figure 29:
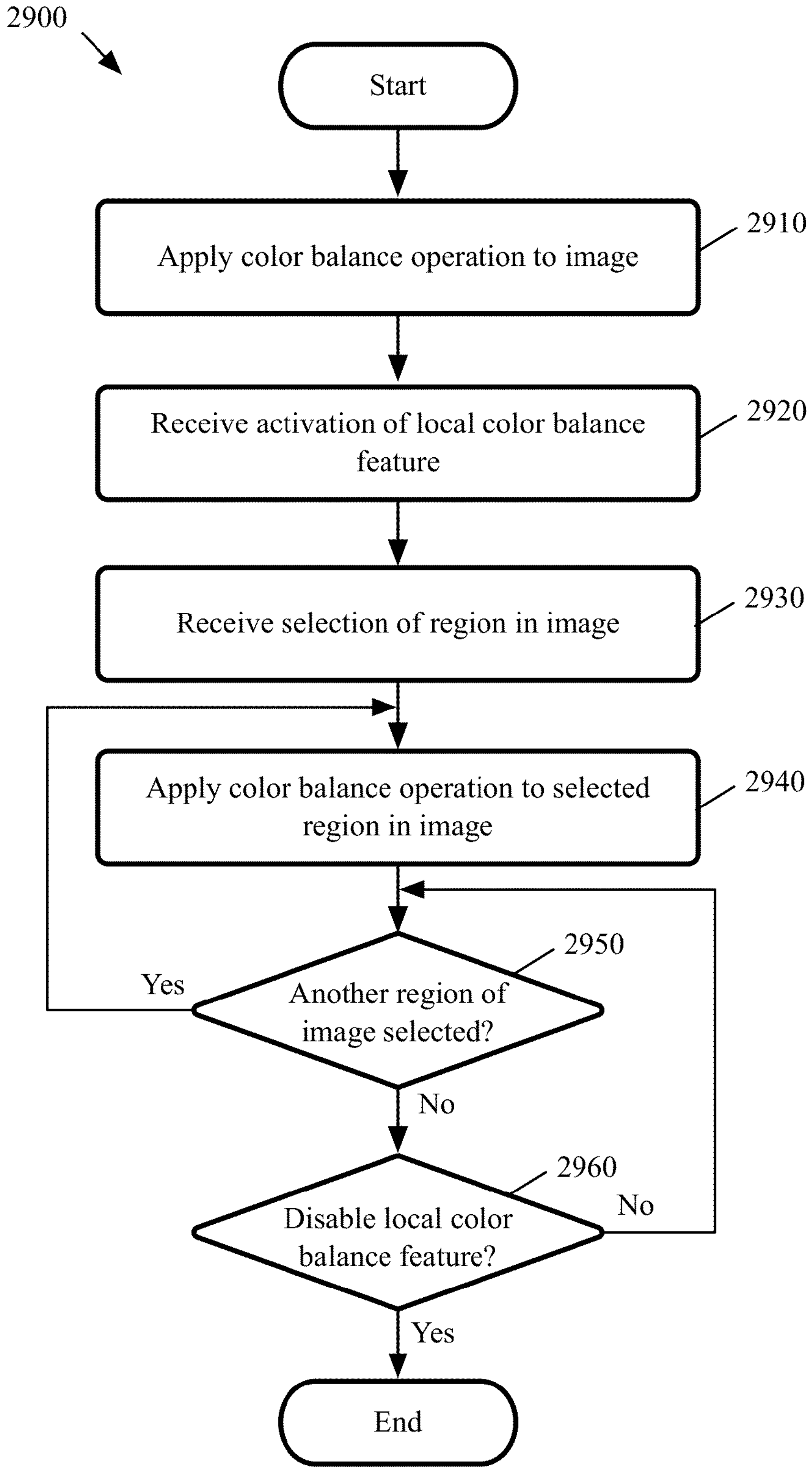
FIG. 29 conceptually illustrates a process of some embodiments for performing a local color balance operation on an image.

FIG. 29 conceptually illustrates a process 2900 of some embodiments for performing a local color balance operation on an image. In some embodiments, the image editing application that provides a color balance tool (e.g., the color balance tool described below by reference to FIG. 30) with a local color balance feature performs the process 2900.

The process 2900 begins by applying (at 2910) a color balance operation to the image. In some embodiments, the process 2900 applies the color balance operation to the image using any of the techniques described above for applying a skin tone color balance operation or a gray color balance operation (e.g., FIGS. 4-7, 9, 10, 16-18, 21-28) to an image.

Next, the process 2900 receives (at 2920) an activation of a local color balance feature of a color balance tool. In some embodiments, the process 2900 receives the activation through a selection of a UI item (e.g., UI item 3065). Additional and/or other methods of receiving the invocation are possible. For instance, the process 2900 of some embodiments receives the activation through a hotkey, a keystroke, a series of keystrokes, a combination of keystrokes, an option selected from a pop-up menu or pull-down menu, or any other appropriate method to invoke the auto-color balance feature. When the image editing application of some embodiments receives the activation of the local color balance feature, the image editing application removes the color balance operation from the image.

The process 2900 then receives (at 2930) a selection of a region of the image to apply the color balance operation. After receiving the selection of the region, the process 2900 applies (at 2940) the color balance operation to the selected region of the image. In some embodiments, the process 2900 applies the color balance operation to the selected region of the image by (1) generating a layer mask with only the selected region visible, (2) compositing the layer mask over a version of the image with the color balance operation applied, and (3) compositing the layer mask and the version of the image with the color balance operation applied over a version of the image without the color balance operation applied. In the resulting image, the color balance operation is applied to only the selected region of the image while the color balance operation is not applied to the unselected portions of the image.

Next, the process 2900 determines (at 2950) whether another region of the image is selected. When the process 2900 determines that another region of the image is selected, the process 2900 returns to 2940 to apply the color balance operation to the selected region. When the process 2900 determines that another region of the image is not selected, the process 2900 proceeds to 2960.

At 2960, the process 2900 determines whether the local color balance feature is disabled. In some embodiments, the process 2900 determines that the local color balance feature is disabled when the process 2900 receives a selection of a UI item (e.g., UI item 3090). Additional and/or other methods of disabling the local color balance feature are possible. For instance, the process 2900 of some embodiments receives the disabling of the local color balance feature through a hotkey, a keystroke, a series of keystrokes, a combination of keystrokes, an option selected from a pop-up menu or pull-down menu, or any other appropriate method to invoke the auto-color balance feature. If the process 2900 determines that the local color balance feature is not disabled, the process 2900 returns to 2950 to wait for another selection of a region of the image. Otherwise, the process 2900 ends.

Figure 30:
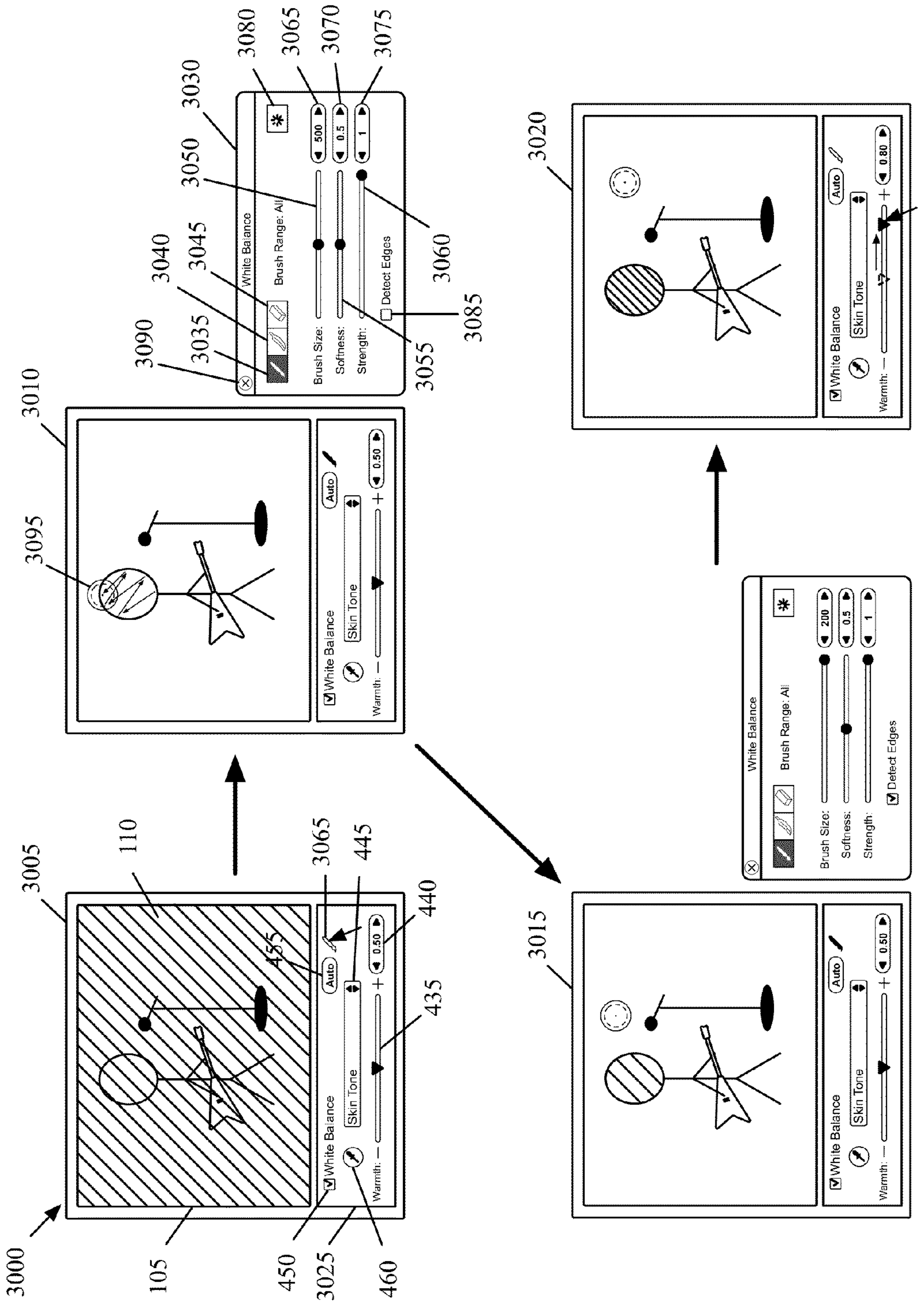
FIG. 30 conceptually illustrates a local color balance feature of a color balance tool of some embodiments.

FIG. 30 conceptually illustrates a local color balance feature of a color balance tool of some embodiments. Specifically, FIG. 30 illustrates a GUI 3000 at four different stages 3005-3020 that show a local color balance operation. The GUI 3000 is similar to the GUI 400 described above by reference to FIG. 4 except the GUI 3000 includes a color balance tool 3025 instead of the color balance tool 425. The color balance tool 3025 is similar to the color balance tool 425 described above by reference to FIG. 4, but the color balance tool 3025 also includes a selectable UI item 3065 for activating a local color balance feature of the color balance tool 3025.

The first stage 3005 shows the GUI 3000 after a skin tone color balance operation has been applied to the image 110 (e.g., using a manual feature of the color balance tool 3025's skin tone color balance mode, automatically upon a selection of the skin tone color balance mode of the color balance tool 3025, etc.). As shown, diagonal lines are displayed over the image 110 to indicate that the skin tone color balance operation has been applied to the image 110.

In addition, the first stage 3005 of the GUI 3000 illustrates a selection of the local color balance feature of the color balance tool 3025. As shown, a user is selecting the UI item 3065 using a cursor (e.g., by clicking a mouse button, tapping a touchpad, or touching a touchscreen) in order to activate the local color balance feature of the color balance tool 3025. In some embodiments, when the image editing application receives the selection of the UI item 3065, the image editing application automatically displays a local color balance tool 3030 and a region selector 3095 for the local color balance tool 3030, and displays a highlighting of the UI item 3065.

The region selector 3095 (e.g., brush 3095) is for selecting regions in an image. As shown, the region selector 3095 includes a shape (two concentric circles in this example) for visually indicating the region of the image that can be selected. In some embodiments, the region selector 3095 functions similar to a cursor. That is, the region selector 3095 is movable through cursor input and is an object in the GUI 3000 through which the image editing application of some embodiments receives selection input (e.g., mouse clicks, touchpad taps, touchscreen touches, etc.).

As shown, the local color balance tool 3030 includes selectable UI items 3035-3045, 3080, 3085, and 3090, slider controls 3050-3060, and selectable UI controls 3065-3075. The selectable UI item 3035 is for selecting a first mode (e.g., a brush mode) that allows the user to select regions in the image to apply a color balance operation using the region selection 3095. The selectable UI item 3040 is for selecting a second mode (e.g., a feather mode) that allows the user to select edges of selected regions in the image using the region selection 3095 in order to soften the color balance operation along the selected edges. The selectable UI item 3045 is for selecting a third mode (e.g., an erase mode) that allows the user to remove the color balance operation from selected regions in the image using the region selection 3095.

Each of the slider controls 3050-3060 is similar to the slider control 120 described above by reference to FIG. 1. That is, each of the slider controls includes a sliding region and a slider that is movable along an axis of the sliding region. The slider control 3050 is for adjusting the size of the region selector 3095. The slider control 3055 is for adjusting an amount of blur around the edge of a region selected of using the region selector 3095 to which a color balance operation is applied. The slider control 3055 is for adjusting an extent of the color balance operation that is applied to a region selected of using the region selector 3095.

Each of the selectable UI controls 3065-3075 is similar to the selectable UI control 440 described above by reference to FIG. 4. In other words, each of the selectable UI controls 3065-3075 is for displaying the value associated with the position of the slider along the sliding region of the corresponding slider control. Each of the UI controls 3065-3075 is also for adjusting the slider in defined amounts along the sliding region of the corresponding slider control. As shown, each of the UI controls 3065-3075 includes a set of selectable UI items (e.g., a left arrow button and a right arrow button) for decreasing and increasing the value associated with the corresponding slider. When the image editing application receives a selection of one of the selectable UI items of the one of the UI controls 3065-3075, the image editing application (1) adjusts the value associated with the slider of the corresponding slider control, (2) displays the adjusted value through the UI control, and (3) moves the slider to the position along the sliding region of the corresponding slider control that corresponds to the adjusted value.

The selectable UI item 3080 is for displaying various selectable options (not shown in this figure) for configuring, controlling, and/or enabling various functions of the local color balance tool 3030. The selectable UI item 3085 is for enabling and disabling a feature that limits the selection of regions in the image 110 using the region selector 305 to areas of the image 110 on a side of detected edges in the image 110. The selectable UI item 3090 is for disabling or deactivating the local color balance tool 3030.

The second stage 3010 also illustrates the GUI 3000 after the local color balance feature of the color balance tool 3025's skin tone color balance mode has been activated. When the image editing application of some embodiments receives an activation of the local color balance feature, the image editing application removes the skin tone color balance operation from the image 110 and displays the local color balance tool 3030. As shown, the diagonal lines are no longer displayed over the image 110 to indicate that the skin tone color balance operation applied to the image 110 in first stage 3005 has been removed. Additionally, the second stage 3010 of the GUI 3000 shows that the user has selected the face of the musician using the region selector 3095 (e.g., by clicking a mouse button, tapping a touchpad, or touching a touchscreen) to select a region in the image 110 to apply the skin tone color balance operation.

The third stage 3015 illustrates the GUI 3000 after the skin tone color balance operation has been applied to the region of the image 110. In some embodiments, then the image editing application receives the selection of the musician's face, the image editing application applies the skin tone color balance operation to only the musician's face, which is indicated by diagonal lines displayed only over the face of the musician in the image 110.

The fourth stage 3020 of the GUI 3000 after the user has deactivated the local color balance tool 3030. In this example, the user deactivated the local color balance tool 3030 by selection the UI item 3090 using a cursor (e.g., by clicking a mouse button, tapping a touchpad, or touching a touchscreen). When the image editing application receives the selection of the UI item 3090, the image editing application no longer displays the local color balance tool 3030.

In addition, the fourth stage 3020 illustrates the GUI 3000 after an adjustment has been made to the color balance operation applied to the image 110 in the third stage 3015. In the fourth stage 3020, the user has selected and moved the slider towards the left of the slider control 435 using the cursor (e.g., by clicking-and-holding a mouse button and dragging the mouse, tapping a touchpad and dragging across the touchpad, or touching the slider displayed on a touchscreen and dragging across the touchscreen) in order to adjust the skin tone color balance applied to the image 110 towards warmer colors. Additional diagonal lines are displayed over the musician's face in the image 110 to indicate this adjustment.

While FIG. 30 illustrates an example local skin tone color balance operation, one of ordinary skill in the art will understand that similar local color balance operations may be performed for other color balance modes of the color balance tool of some embodiments. For instance, in some embodiments, the image editing application provides a color balance tool that includes a gray color balance mode with a local color balance feature.

In addition, FIGS. 29 and 30 illustrates a local color balance feature that allows a user to select regions in an image to apply a color balance operation (e.g., brushing in a color balance operation). Alternatively, or in conjunction with such a local color balance feature, the image editing application of some embodiment provides a local color balance feature that allows the user to select regions in an image to not apply a color balance operation (e.g., brushing out a color balance operation). In some such embodiments, the mask used by the imaged editing application described above is inverted.

V. Image Editing and Organization Application

Figure 31:
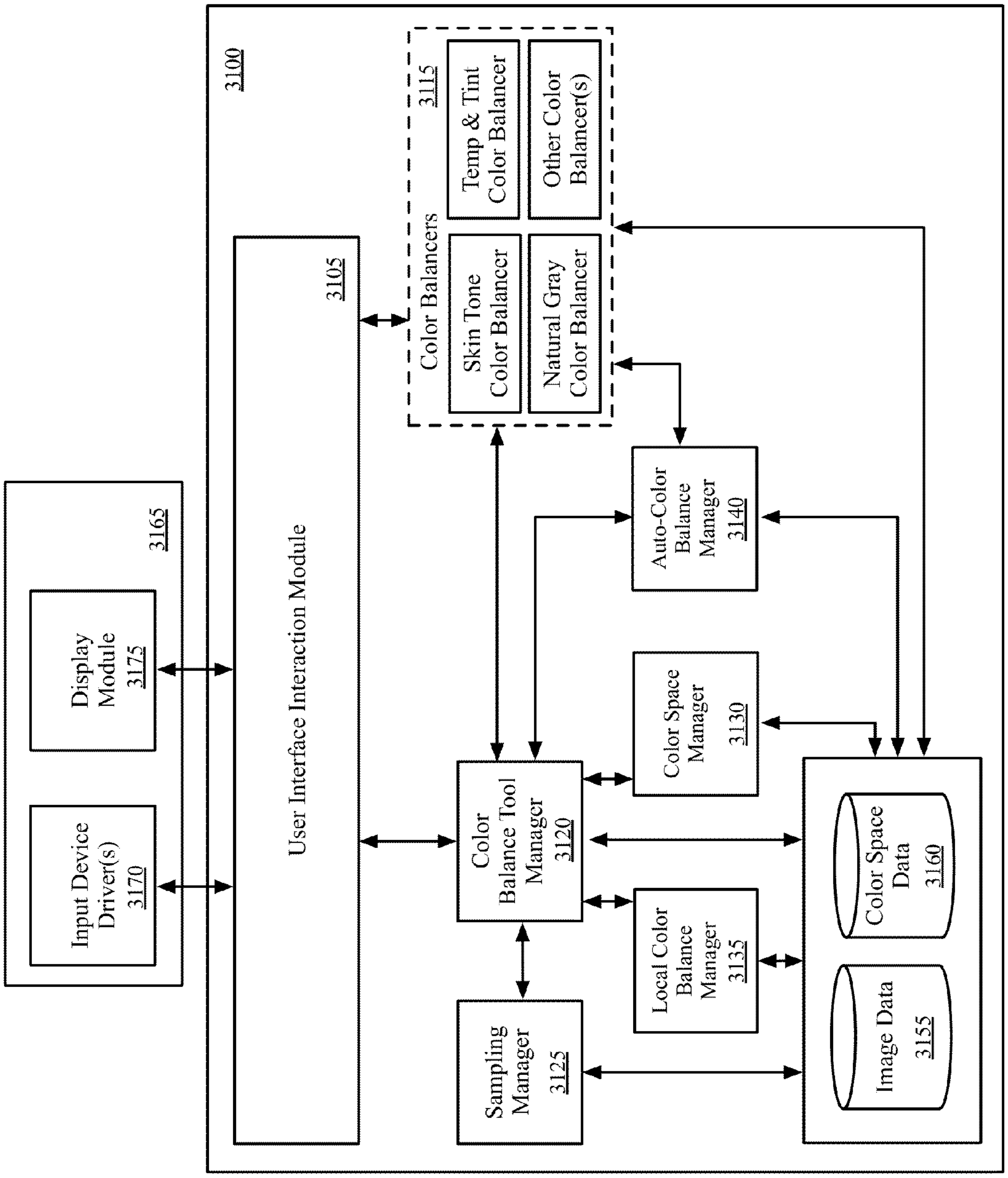
FIG. 31 conceptually illustrates a software architecture of an image editing and organizing application of some embodiments.

In some embodiments, the processes described above are implemented as software running on a particular machine, such as a computer, a handheld device, or a tablet computing device, or stored in a machine readable medium. FIG. 31 conceptually illustrates a software architecture of an image editing and organizing application 3100 of some embodiments. In some embodiments, the image editing and organizing application is a stand-alone application (e.g., Aperture®, provided by Apple Inc.) for editing (e.g., cropping, color balancing, adjusting colors, exposure, shadows, highlights, saturation, etc., applying effects, etc.) images, viewing (e.g., zooming, panning, creating slideshows, etc.) images, organizing (e.g., classifying, tagging, labeling, ranking, archiving, etc.) images, sharing images, etc.

The image editing and organizing application of some embodiments is integrated into another application (e.g., a compositing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided as a thick client. That is, the application is distributed from the server to the client machine and runs on the client machine.

As shown, the image editing and organizing application 3100 includes a user interface (UI) interaction module 3105, a set of color balancers 3115, a color balance tool manager 3120, a sampling manager 3125, a local color balance manager 3135, a color space manager 3130, and an auto-color balance manager 3140. The image editing and organizing application 3100 also includes image data storage 3155 and color space data storage 3160. In some embodiments, the color space data storage 3160 stores definitions of different color spaces (e.g., sRGB, wide gamut RGB, ProPhoto, YUV, YCbCr, YIQ, HSV, HSL, etc.) and other information related to the color spaces (e.g., a list of operations for converting images into a color space for color balancing). The image data storage 3155 stores image data (e.g., RAW image files, JPEG image files, versions of images represented in different color spaces, thumbnail versions of images, edited versions of images, etc.) that a user edits and organizes with the image editing and organizing application 3100. In some embodiments, the storages 3155 and 3160 are stored in one physical storage while, in other embodiments, the storages 3155 and 3160 are stored on separate physical storages. Still, in some embodiments, some or all of the storages 3155 and 3160 are implemented across several physical storages.

FIG. 31 also illustrates an operating system 3165 that includes input device driver(s) 3170 and display module 3175. In some embodiments, as illustrated, the input device drivers 3170 and display module 3175 are part of the operating system 3165 even when the image editing and organizing application is an application separate from the operating system 3165.

The input device drivers 3170 may include drivers for translating signals from a keyboard, mouse, touchpad, drawing tablet, touch screen, etc. A user interacts with one or more of these input devices, which send signals to their corresponding device driver. The device driver then translates the signals into user input data that is provided to the UI interaction module 3105.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 3175 translates the output of a user interface for a display device. That is, the display module 3175 receives signals (e.g., from the UI interaction module 3105) describing what should be displayed and translates these signals into pixel information that is sent to the display device. The display device may be an LCD, a plasma screen, a CRT monitor, a touch screen, etc.

The UI interaction module 3105 of the image editing and organizing application 3100 interprets the user input data received from the input device drivers 3170 and passes it to various modules, including the color balance tool manager 3120. The UI interaction module 3105 also manages the display of the UI and outputs this display information to the display module 3175. This UI display information may be based on information from the color balance tool manager 3120 or directly from input data (e.g., when a user moves an item in the UI that does not affect any of the other modules of the image editing and organizing application 3100).

The color balance tool manager 3120 manages the color balancing of images. The color balance tool manager 3120 may receive input from the UI interaction module 3105 for various color balance tool operations. For example, the color balance manager 3120 handles activation of a color balance tool, selection of a color balance mode for a color balance tool, application of a color balance operation to an image, adjustment of a color balance operation, etc. When color balancing an image, the color balance tool manager 3120 interacts with the color space manager 3130 and the color balancers 3115 in order to convert the image to a proper color space and apply the appropriate color balance operations to the image.

In addition, the color balance tool manager 3120 manages features of the color balance tool. For example, when the color balance tool manager 3120 receives input from the UI interaction module 3105 for a manual color balance operation, the color balance tool manager 3120 sends a request to the sampling manager 3125 for a color of a sampled portion of an image. When the color balance tool manager 3120 receives input from the UI interaction module 3105 for a local color balance operation, the color balance tool manager 3120 interacts with the local color balance manager 3135 to identify a region of the image and apply a color balance operation to the region. Additionally, when the color balance tool manager 3120 receives input from the UI interaction module 3105 for an auto-color balance operation, the color balance tool manager 3120 passes the command to the auto-color balance manager 3140 to auto-color balance an image.

The sampling manager 3125 determines a color based on a set of pixels sampled in an image. In some instances, the sampling manager 3125 determines the color based on only the set of pixels. In other instances, the sampling manager 3125 also uses other pixels in the image that were not sampled (e.g., pixels neighboring the sampled set of pixels) to determine the color.

The color space manager 3130 is responsible for converting images among different color spaces. When an image is to be color balanced, the color space manager 3130 converts the image to a wide gamut color space and when color balancing of the image is complete, the color space manager 3130 converts the image back to the image's initial color space. In some embodiments, the color space manager is implemented as the color space manager 1400 described above by reference to FIG. 14.

The local color balance manager 3135 handles local color balance operations. For example, the local color balance manager 3135 configures and controls the local color balance tool when the local color balance feature is activated for a color balance mode of a color balance tool. When a local color balance operation is applied to an image, the local color balance manager 3135 identifies the regions in the image to apply the color balance operation and the regions not to apply the color balance operation.

The set of color balancers 3115 receives the various color balance commands (e.g., through color balance tools in the UI) for color balancing images. As shown, the set of editing modules 3115 includes a skin tone color balancer, a natural gray color balancer, a temperature and tint color balancer, and other color balancers. The skin tone color balancer color balances an image based on a portion of the image that is determined to be skin and/or specified as being skin. The natural gray color balancer color balances an image based on a portion of the image that is determined should be gray or specified as such. The temperature and tine color balancer color balances an image by adjusting the temperature of the image (e.g., adjusting the image towards blue colors and/or orange colors) and/or the tint of the image (e.g., adjusting the image towards green colors and/or magenta colors). The other color balancers may include any number of different color balancers that utilize different techniques to color balance an image.

While many of the features have been described as being performed by one module (e.g., the color balance tool manager 3120, the local color balance manager 3135, etc.), one of ordinary skill in the art would recognize that the functions might be split up into multiple modules. Similarly, the functions described as being performed by multiple different modules might be performed by a single module in some embodiments (e.g., the auto-color balance manage 3140 might be part of the color balance tool manager 3120).

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 32:
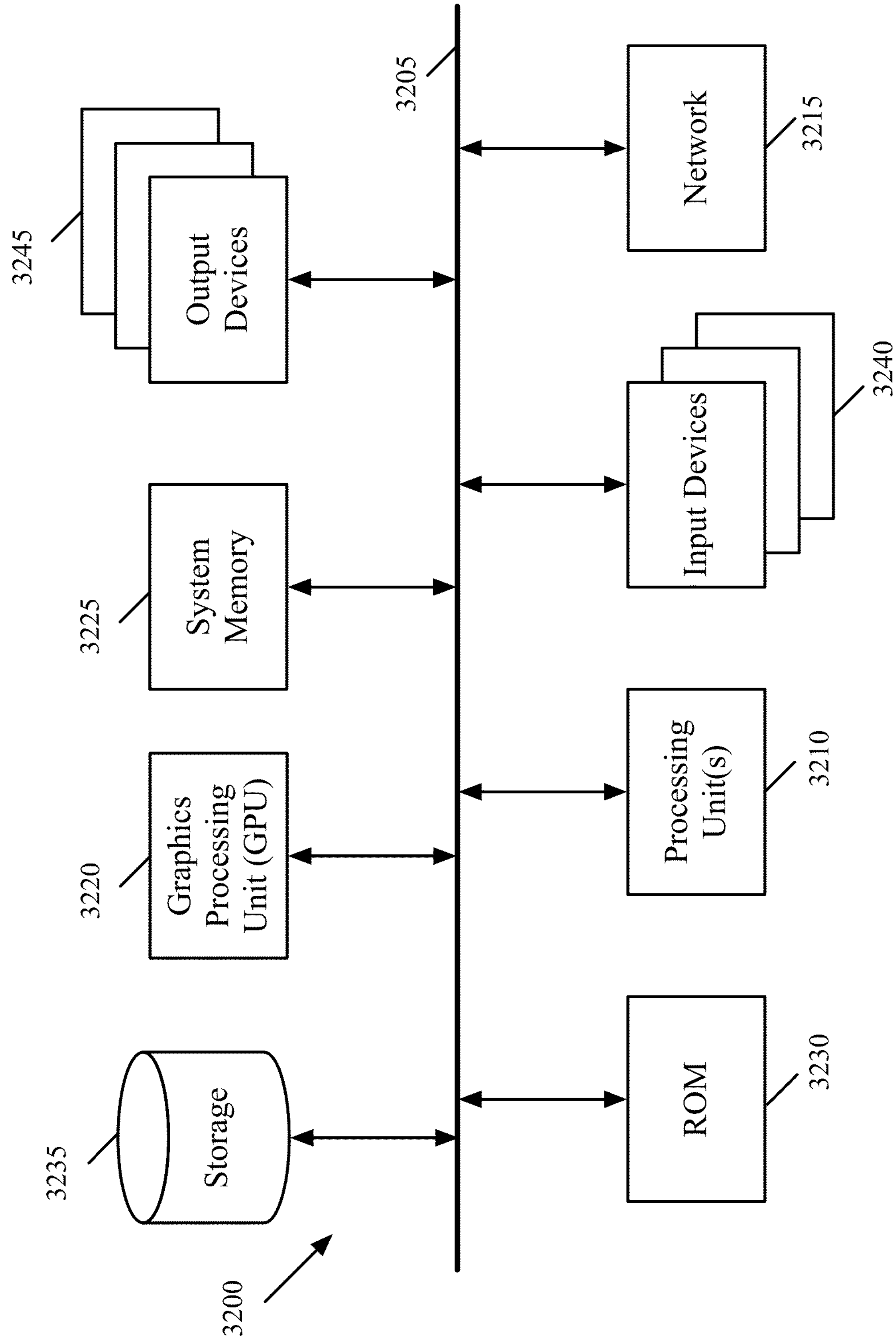
FIG. 32 conceptually illustrates an electronic device with which some embodiments of the invention are implemented.

FIG. 32 conceptually illustrates an electronic system 3200 with which some embodiments of the invention are implemented. The electronic system 3200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3200 includes a bus 3205, processing unit(s) 3210, a graphics processing unit (GPU) 3215, a system memory 3220, a network 3225, a read-only memory 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the read-only memory 3230, the GPU 3215, the system memory 3220, and the permanent storage device 3235.

From these various memory units, the processing unit(s) 3210 retrieves instructions to execute and data to process in order to execute the processes of the invention. The processing unit(s) may be a single processor or a multi-core processor in different embodiments. Some instructions are passed to and executed by the GPU 3215. The GPU 3215 can offload various computations or complement the image processing provided by the processing unit(s) 3210. In some embodiments, such functionality can be provided using CoreImage's kernel shading language.

The read-only-memory (ROM) 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive) as the permanent storage device 3235.

Other embodiments use a removable storage device (such as a floppy disk, flash memory device, etc., and its corresponding drive) as the permanent storage device. Like the permanent storage device 3235, the system memory 3220 is a read-and-write memory device. However, unlike storage device 3235, the system memory 3220 is a volatile read-and-write memory, such a random access memory. The system memory 3220 stores some of the instructions and data that the processor needs at runtime. In some embodiments, the invention's processes are stored in the system memory 3220, the permanent storage device 3235, and/or the read-only memory 3230. For example, the various memory units include instructions for processing multimedia clips in accordance with some embodiments. From these various memory units, the processing unit(s) 3210 retrieves instructions to execute and data to process in order to execute the processes of some embodiments.

The bus 3205 also connects to the input and output devices 3240 and 3245. The input devices 3240 enable the user to communicate information and select commands to the electronic system. The input devices 3240 include alphanumeric keyboards and pointing devices (also called "cursor control devices"), cameras (e.g., webcams), microphones or similar devices for receiving voice commands, etc. The output devices 3245 display images generated by the electronic system or otherwise output data. The output devices 3245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 32, bus 3205 also couples electronic system 3200 to a network 3225 through a network adapter (not shown). In this manner, the computer can be a part of a network of computers (such as a local area network ("LAN"), a wide area network ("WAN"), or an Intranet, or a network of networks, such as the Internet. Any or all components of electronic system 3200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 7, 10, 13, 15, 16, 21, 22, 25, 27, and 29) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

As another example, the figures illustrated in FIGS. 1-4, 6, 8, 9, 11, 21, 17-20, 26, 28, and 30) show various UI elements (e.g., selectable UI controls, selectable UI buttons, slider controls, editable text fields, etc.) for performing various functions. One of ordinary skill in the art will recognize that any of these UI elements may be a conceptual illustration of one or more UI elements. In addition, different embodiments implement the UI elements differently. For instance, some embodiments may implement a particular UI element as a UI button while other embodiments may implement the particular UI element as a menu selection command that can be selected through a pull-down, a drop-down, or a pop-up menu. Still other embodiments implement the particular UI element as a keyboard command that can be invoked through one or more keystrokes or a series of keystrokes (e.g., pressing and holding a key to activate the positive color masking tool and releasing the key to deactivate the positive color masking tool). Yet, other embodiments allow a user to access the functionality associated with the particular UI element through two or more of such UI implementations and/or other UI implementations. Thus, one of ordinary skill in the art would understand that the invention is not to be limited by the foregoing illustrative details, but rather is to be defined by the appended claims.

We claim:

1. A method of automatically color balancing an image, the method comprising:

receiving a selection of a user interface (UI) item to automatically color balance the image using a color balance tool comprising a plurality of color balance modes;

in response to the selection, analyzing the image based on first, second and third sets of criteria;

when the image satisfies the first, second or third set of criteria, automatically selecting a corresponding color balance mode from the plurality of color balance modes of the color balance tool, wherein each color balance mode corresponds to one of the first, second, and third sets of criteria; and upon selecting the corresponding color balance mode, using the color balance mode to automatically apply a set of color balance operations to the image.

2. The method of claim 1, wherein the first set of criteria comprises whether the image is determined to include skin tones.

3. The method of claim 1, wherein the second set of criteria comprises whether the image is formatted according to a defined file format.

4. The method of claim 1, wherein the third set of criteria comprises whether the image contains an amount of color cast that exceeds a threshold amount.

5. The method of claim 1, wherein the plurality of color balance modes of the color balance tool includes a skin tone color balance mode.

6. The method of claim 1, wherein the plurality of color balance modes of the color balance tool includes a gray color balance mode.

7. The method of claim 1, wherein the plurality of color balance modes of the color balance tool includes a temperature and tint color balance mode.

8. A non-transitory computer readable medium storing a computer program which when executed by at least one processing unit automatically color balances an image, the computer program comprising sets of instructions for:

determining whether the image satisfies a first, second, or third sets of criteria;

when the image satisfies the first, second or third set of criteria, automatically selecting a corresponding mode of a color balance tool for performing color balance operations on the image, wherein each mode of the color balance tool corresponds to one of the first, second, and third sets of criteria; and based on the selected corresponding color balance mode, automatically applying the corresponding color balance operations to the image.

9. The non-transitory computer readable medium of claim 8, wherein the set of instructions for determining whether the image satisfies the first set of criteria comprises a set of instructions for detecting whether the image includes a face.

10. The non-transitory computer readable medium of claim 9, wherein the set of instructions for automatically selecting the corresponding mode of the color balance tool comprises a set of instructions for automatically selecting a skin tone color balance mode of the color balance tool when the image satisfies the first set of criteria.

11. The non-transitory computer readable medium of claim 8, wherein the set of instructions for automatically selecting the corresponding mode of the color balance tool comprises a set of instructions for automatically selecting a gray color balance mode of the color balance tool when the image satisfies the second set of criteria.

12. The non-transitory computer readable medium of claim 8, wherein the set of instructions for automatically selecting the corresponding mode of the color balance tool comprises a set of instructions for automatically selecting a temperature and tint color balance mode of the color balance tool when the image satisfies the third set of criteria.

13. The non-transitory computer readable medium of claim 8, wherein the set of instructions for determining whether the image satisfies the second set of criteria comprises a set of instructions for:

detecting whether the image includes a face; and determining whether the image is formatted in a particular format.

14. The non-transitory computer readable medium of claim 13, wherein the image satisfies the second set of criteria when:

the image is determined to not be formatted in the particular format; and the image is determined to not include a face.

15. The non-transitory computer readable medium of claim 13, wherein the set of instructions for determining whether the image satisfies the third set of criteria comprises a set of instructions for:

detecting whether the image includes a face;

determining whether the image is formatted in a particular format; and determining whether the image contains an amount of color cast that exceeds a defined threshold amount.

16. The non-transitory computer readable medium of claim 15, wherein the third set of criteria is satisfied when:

the image is determined to not include a face;

the image is determined to be formatted in the particular format; and the image is determined to contain the amount of color cast that exceeds the defined threshold amount.

17. A method of providing an image editing application, the method comprising:

providing a display area for displaying an image;

providing a plurality of color balance operators; and providing a user interface (UI) control that when activated causes the image editing application to automatically (1) analyze the image, (2) select a color balance operator based on the analysis, and (3) use the selected color balance operator to perform a color balance operation on the image, wherein the analysis comprises determining whether the image satisfies a first, second, or third set of criteria and selecting a corresponding color balance operator based on the satisfied set of criteria.

18. The method of claim 17, wherein the UI control comprises a selectable button, wherein the UI control is activated when the image editing application receives a selection of the button.

19. The method of claim 17, wherein the UI control is activated when the image editing application receives a hotkey input.

20. The method of claim 17, wherein when the UI control is activated further causes the image editing application to automatically determine a color balance operation for each unselected color balance operator in the plurality of color balance operators.

21. The method of claim 20 further comprising:

when the UI control is activated, receiving input to switch from the automatically selected color balance operator to another color balance operator in the plurality of color balance operators; and in response to the input, performing on the image the automatically determined color balance operation that corresponds to the other color balance operator.

22. The method of claim 21 further comprising, in response to the input, removing from the image the color balance operation that was performed on the image using the selected color balance operator before performing on the image the automatically determined color balance operation that corresponds to the other color balance operator.

23. The method of claim 17 further comprising, when the UI control is activated, receiving input to adjust the color balance operation performed on the image.

24. The method of claim 23, wherein UI control comprises a slider control for adjusting the color balance operation, wherein the input is received through the slider control.

25. The method of claim 23, wherein UI control comprises a set of selectable UI items for adjusting the color balance operation, wherein the input is received through the set of selectable UI items.

* * * * *